United States Patent [19]

Kato et al.

[11] Patent Number: 5,498,503

[45] Date of Patent: Mar. 12, 1996

[54] ELECTROPHOTOGRAPHIC LIGHT-SENSITIVE MATERIAL

[75] Inventors: Eiichi Kato; Kazuo Ishii, both of Shizuoka, Japan

[73] Assignee: Fuji Photo Film Co., Ltd., Kanagawa, Japan

[21] Appl. No.: 119,220

[22] Filed: Sep. 28, 1993

[30] Foreign Application Priority Data

| Apr. 15, 1991 | [JP] | Japan | 3-108238 |
| Apr. 17, 1991 | [JP] | Japan | 3-110852 |
| Jun. 7, 1991 | [JP] | Japan | 3-162322 |
| Jul. 22, 1991 | [JP] | Japan | 3-204556 |
| Jul. 31, 1991 | [JP] | Japan | 3-213048 |
| Nov. 20, 1991 | [JP] | Japan | 3-329620 |
| Feb. 13, 1992 | [JP] | Japan | 4-058854 |
| Mar. 19, 1992 | [JP] | Japan | 4-092403 |

[51] Int. Cl.$^6$ ............................................. G03G 5/05
[52] U.S. Cl. .................................................... 430/96
[58] Field of Search ................................. 430/96, 95

[56] References Cited

U.S. PATENT DOCUMENTS

| 4,871,638 | 10/1989 | Kato et al. . |
| 4,952,475 | 8/1990 | Kato et al. . |
| 4,954,407 | 9/1990 | Kato et al. . |
| 4,968,572 | 11/1990 | Kato et al. . |
| 5,009,975 | 4/1991 | Kato et al. . |
| 5,073,467 | 12/1991 | Kato et al. . |
| 5,104,760 | 4/1992 | Kato et al. . |
| 5,124,221 | 6/1992 | Kato . |
| 5,134,051 | 7/1992 | Kato et al. . |
| 5,135,830 | 8/1992 | Kato . |
| 5,154,997 | 10/1992 | Kato et al. . |
| 5,227,272 | 7/1993 | Kato . |

*Primary Examiner*—Christopher D. Rodee
*Attorney, Agent, or Firm*—Sughrue, Mion, Zinn, Macpeak & Seas

[57] ABSTRACT

An electrophotographic light-sensitive material which has improved electrostatic characteristics and image forming performance and is excellent particularly in reproducibility of highly accurate image using a liquid developer and image forming performance upon a scanning exposure system using a laser beam of a low power.

The electrophotographic light-sensitive material contains, as a binder resin, at least one resin (A) which has a weight average molecular weight of from $1\times10^3$ to $2\times10^4$ and contains not less than 30% by weight of a polymer component of the formula (I) and from 0.5 to 15% by weight of a specified polar group-containing polymer component and at least one resin (B) which is an AB block copolymer having a weight average molecular weight of from $3\times10^4$ to $1\times10^6$ and comprising an A block containing a specified polar group-containing polymer component and a B block containing a polymer component of the formula (I).

Formula (I)

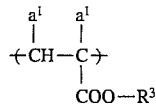

wherein $a^1$ and $a^2$: hydrogen, halogen, a cyano group, a hydrocarbon group, —COOR$^4$ or —COOR$^4$ bonded via a hydrocarbon group (R$^4$: hydrocarbon group), and R$^3$: a hydrocarbon group.

11 Claims, No Drawings

ELECTROPHOTOGRAPHIC LIGHT-SENSITIVE MATERIAL

TECHNICAL FIELD

The present invention relates to an electrophotographic light-sensitive material, and more particularly to an electrophotographic light-sensitive material which is excellent in electrostatic characteristics and moisture resistance.

TECHNICAL BACKGROUND

An electrophotographic light-sensitive material may have various structures depending upon the characteristics required or an electrophotographic process to be employed.

Typical electrophotographic light-sensitive materials widely employed comprise support having provided thereon at least one photoconductive layer and, if necessary, an insulating layer on the surface thereof.

The electrophotographic light-sensitive material comprising a support and at least one photoconductive layer formed thereon is used for the image formation by an ordinary electrophotographic process including electrostatic charging, imagewise exposure, development, and, if desired, transfer.

Furthermore, a process using an electrophotographic light-sensitive material as an offset master plate precursor for direct plate making is widely practiced. In particular, a direct electrophotographic lithographic plate has recently become important as a system for printing in the order of from several hundreds to several thousands prints having a high image quality.

Under these circumstances, binder resins which are used for forming the photoconductive layer of an electrophotographic light-sensitive material are required to be excellent in the film-forming properties by themselves and the capability of dispersing photoconductive powder therein. Also, the photoconductive layer formed using the binder resin is required to have satisfactory adhesion to a base material or support. Further, the photoconductive layer formed by using the binder resin is required to have various excellent electrostatic characteristics such as high charging capacity, small dark decay, large light decay, and less fatigue due to prior light-exposure and also have an excellent image forming properties, and the photoconductive layer stably maintains these electrostatic properties in spite of the fluctuation in humidity at the time of image formation.

Further, extensive studies have been made for lithographic printing plate precursors using an electrophotographic light-sensitive material, and for such a purpose, binder resins for a photoconductive layer which satisfy both the electrostatic characteristics as an electrophotographic light-sensitive material and printing properties as a printing plate precursor are required.

It has been found that the chemical structure of binder resin used in a photoconductive layer which contains at least an inorganic photoconductive substance, a spectral sensitizing dye and a binder resin has a great influence upon the electrostatic characteristics as well as smoothness of the photoconductive layer. Among the electrostatic characteristics, dark charge retention rate (D.R.R.) and photosensitivity are particularly affected.

Techniques for improvements in smoothness and electrostatic characteristics of a photoconductive layer by using a resin having a low molecular weight and containing an acidic group in a polymer component constituting the polymer main chain or at one terminal of the polymer main chain are described, for example, in JP-A-63-217354 (the term "JP-A" as used herein means an "unexamined published Japanese Patent Application"), JP-A- 1-70761, JP-A-2- 64547, JP-A-2-93540 and JP-A-3-181948.

Further, techniques for improving a mechanical strength of a photoconductive layer by using the above described low molecular weight resin together with a medium to high molecular weight resin are described, for example, in JP-A- 64-564, JP-A-63-220149, JP-A-63-220148, JP-A-1-280761, JP-A-l-116643, JP-A-l-169455, JP-A-2- 69758, JP-A-2- 167551, JP-A-1-211766, JP-A-2-34859, JP-A- 2-68561, JP-A-2-135455, JP-A-2-34860, JP-A-2-96766, JP-A- 2-40660, JP-A-2-53064, JP-A-2-103056, JP-A-2-56558, JP-A-3-29954, JP-A-3-75753, JP-A-3-77954, JP-A-3- 42665, JP-A-3-92861, JP-A-3-92862, JP-A-3-53257, JP-A- 3-92863, JP-A-3-206464, and JP-A-3-225344.

PROBLEMS TO BE SOLVED BY THE INVENTION

However, it has been found that, even in a case of using these resins or a combination of these resins, it is yet insufficient to keep the stable performance in the case of greatly fluctuating the ambient conditions from high-temperature and high-humidity to low-temperature and low-humidity. In particular, in a scanning exposure system using a semiconductor laser beam, the exposure time becomes longer and also there is a restriction on the exposure intensity as compared to a conventional overall simultaneous exposure system using a visible light, and hence a higher performance has been required for the electrostatic characteristics, in particular, the dark charge retention characteristics and photosensitivity.

Further, when the scanning exposure system using a semiconductor laser beam is applied to hitherto known light-sensitive materials for electrophotographic lithographic printing plate precursors, various problems may occur in that the difference between $E_{1/2}$ and $E_{1/10}$ is particularly large and the contrast of the duplicated image is decreased. Moreover, it is difficult to reduce the remaining potential after exposure, which results in severe fog formation in duplicated image, and when employed as offset masters, edge marks of originals pasted up appear on the prints, in addition to the insufficient electrostatic characteristics described above.

Moreover, it has been desired to develop a technique which can faithfully reproduce highly accurate images of continuous gradation as well as images composed of lines and dots using a liquid developer. However, the above-described known techniques are still insufficient to fulfill such a requirement. Specifically, in the known technique, the improved electrostatic characteristics which are achieved by means of the low molecular weight resin may be sometimes deteriorated by using it together with the medium to high molecular weight resin. In fact, it has been found that an electrophotographic light-sensitive material having a photoconductive layer wherein the above described known resins are used in combination may cause a problem on reproducibility of the above described highly accurate image (particularly, an image of continuous gradation) or on image forming performance in case of using a scanning exposure system with a laser beam of low power.

The present invention has been made for solving the problems of conventional electrophotographic light-sensitive materials as described above.

An object of the present invention is to provide an electrophotographic light-sensitive material having stable and excellent electrostatic characteristics and giving clear good images even when the ambient conditions during the formation of duplicated images are fluctuated to low-temperature and low-humidity or to high-temperature and high-humidity.

Another object of the present invention is to provide a CPC electrophotographic light-sensitive material having excellent electrostatic characteristics and showing less environmental dependency.

A further object of the present invention is to provide an electrophotographic light-sensitive material effective for a scanning exposure system using a semiconductor laser beam.

A still further object of the present invention is to provide an electrophotographic lithographic printing plate precursor having excellent electrostatic characteristics (in particular, dark charge retention characteristics and photosensitivity), capable of reproducing a faithfully duplicated image to the original (in particular, a highly accurate image of continuous gradation), forming neither overall background stains nor dotted background stains of prints, and showing excellent printing durability.

Other objects of the present invention will become apparent from the following description.

DISCLOSURE OF THE INVENTION

It has been found that the above described objects of the present invention are accomplished by an electrophotographic light-sensitive material having a photoconductive layer containing at least an inorganic photoconductive substance, a spectral sensitizing dye and a binder resin, wherein the binder resin comprises at least one resin (A) shown below and at least one resin (B) shown below.
Resin (A):
A resin having a weight average molecular weight of from $1 \times 10^3$ to $2 \times 10^4$ and containing not less than 30% by weight of a polymer component corresponding to a repeating unit represented by the general formula (I) described below and from 0.5 to 15% by weight of a polymer component containing at least one polar group selected from $-PO_3H_2$, $-SO_3H$, $-COOH$,

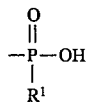

(wherein $R^1$ represents a hydrocarbon group or $-OR^2$ (wherein $R^2$ represents a hydrocarbon group)) and a cyclic acid anhydride-containing group.

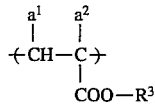

(wherein $a^1$ and $a^2$ each represents a hydrogen atom, a halogen atom, a cyano group, a hydrocarbon group, $-COOR^4$ or $-COOR^4$ bonded via a hydrocarbon group (wherein $R^4$ represents a hydrocarbon group); and $R^3$ represents a hydrocarbon group). Resin (B):
An AB block copolymer having a weight average molecular weight of from $3 \times 10^4$ to $1 \times 10^6$ and containing an A block comprising a polymer component containing at least one polar group selected from the specific polar groups as described in the resin (A) above and a B block comprising a polymer component represented by the general formula (I) as described in the resin (A) above, wherein the A block contains the polymer component containing the polar group in an amount of from 0.05 to 10% by weight based on the copolymer and the B block contains the polymer component represented by the general formula (I) in an amount not less than 30% by weight based on the copolymer.

In short, the binder resin which can be used in the present invention comprises at least a low molecular weight polymer containing a polymer component represented by the general formula (I) described above and a polymer component containing the specified polar group described above (resin (A)) and an AB block copolymer comprising an A block comprising a polymer component containing the specified polar group described above and a B block comprising a polymer component represented by the general formula (I) described above (resin (B)).

As a result of various investigations, it has been found that in the known technique wherein the low molecular weight resin containing a polar group is used together with the medium to high molecular weight resin, the improved electrostatic characteristics achieved by the low molecular weight resin are sometimes deteriorated by the medium to high molecular weight resin used together as described above. Further, it has become apparent that an appropriate action of medium to high molecular weight resin on the interaction between the photoconductive substance, spectral sensitizing dye and low molecular weight resin in the photoconductive layer is an unexpectedly important factor.

It has been found that the above described objects can be effectively achieved by using the AB block copolymer comprising an A block containing the polar group and a B block containing no polar group according to the present invention as a medium to high molecular weight resin to be used together with the low molecular weight resin (A) containing the polar group.

It is presumed that the electrostatic characteristics are stably maintained at a high level as a result of synergistic effect of the resin (A) and resin (B) according to the present invention wherein particles of inorganic photoconductive substance are sufficiently dispersed without the occurrence of aggregation, a spectral sensitizing dye and a chemical sensitizer are sufficiently adsorbed on the surface of particles of inorganic photoconductive substance, and the binder resin is sufficiently adsorbed to excessive active sites on the surface of the inorganic photoconductive substance to compensate the traps.

More specifically, the low molecular weight resin (A) containing the specific polar group has the important function in that the resin is sufficiently adsorbed on the surface of particles of the inorganic photoconductive substance to disperse uniformly and to restrain the occurrence of aggregation due to its short polymer chain and in that adsorption of the spectral sensitizing dye on the inorganic photoconductive substance is not disturbed.

Further, by using the medium to high molecular weight AB block copolymer comprising an A block containing the specific polar group and a B block which does not contain the specific polar group, mechanical strength of the photoconductive layer is remarkably increased. This is believed to be based on that the A block portion of the resin has a weak interaction with the particles of photoconductive substance compared with the resin (A) and that the polymer chains of the B block portions of the resins intertwine each other.

Moreover, according to the present invention the electrostatic characteristics are more improved in comparison with a case wherein a known medium to high molecular weight resin is employed. This is believed to be based on that the resin (B) acts to control the disturbance of adsorption of spectral sensitizing dye on the surface of particles of photoconductive substance due to the polar group present in the A block portion which interacts with the particles of photoconductive substance.

As a result, it is presumed that the resin (B) appropriately effects on controlling the disturbance of adsorption of spectral sensitizing dye on the surface of particles of photoconductive substance and the electrophotographic interactions and increasing the strength of the photoconductive layer in a system wherein the particles of photoconductive substance, spectral sensitizing dye and resin (A) are coexistent with the resin (B), while details thereof are not clear.

This effect is especially remarkable in a case wherein polymethine dyes or phthalocyanine series pigments which are particularly effective as spectral sensitizing dyes for the region of near infrared to infrared light are used.

When the electrophotographic light-sensitive material according to the present invention containing photoconductive zinc oxide as the inorganic photoconductive substance is applied to a conventional direct printing plate precursor, extremely good water retentivity as well as the excellent image forming performance can be obtained. More specifically, when the light-sensitive material according to the present invention is subjected to an electrophotographic process to form an duplicated image, oil-desensitization of non-image portions by chemical treatment with a conventional oil-desensitizing solution to prepare a printing plate, and printing by an offset printing system, it exhibits excellent characteristics as a printing plate.

When the electrophotographic light-sensitive material according to the present invention is subjected to the oil-desensitizing treatment, the non-image portions are rendered sufficiently hydrophilic to increase water retentivity which results in remarkable increase in a number of prints obtained. It is believed that these results are obtained by the fact that the condition is formed under which a chemical reaction for rendering the surface of zinc oxide hydrophilic upon the oil-desensitizing treatment is able to proceed easily and effectively. Specifically, zinc oxide particles are uniformly and sufficiently dispersed in the resin (A) and resin (B) used as a binder resin and the state of binder resin present on or adjacent to the surface of zinc oxide particles is proper to conduct an oil-desensitizing reaction with the oil-desensitizing solution rapidly and effectively.

Now, the resin (A) which can be used as the binder resin for the photoconductive layer of the electrophotographic light-sensitive material according to the present invention will be described in more detail below.

The weight average molecular weight of the resin (A) is from $1 \times 10^3$ to $2 \times 10^4$ and preferably from $3 \times 10^3$ to $1 \times 10^4$. The glass transition point of the resin (A) is preferably from $-30°$ C. to $110°$ C. and more preferably from $-10°$ C. to $90°$ C.

If the weight average molecular weight of the resin (A) is less than $1 \times 10^3$ the film-forming property of the resin is lowered, thereby a sufficient film strength cannot be maintained, while if the weight average molecular weight of the resin (A) is higher than $2 \times 10^4$ the effect of the present invention for obtaining stable duplicated images is reduced since fluctuations of dark decay retention rate and photosensitivity of the photoconductive layer, in particular, that containing a spectral sensitizing dye for sensitization in the range of from near-infrared to infrared become somewhat large under severe conditions of high temperature and high humidity or low temperature and low humidity.

The content of the polymer component corresponding to the repeating unit represented by the general formula (I) present in the resin (A) is not less than 30% by weight, preferably from 50 to 99% by weight, and the content of the polymer component containing the specific polar group present in the resin (A) is from 0.5 to 15% by weight, preferably from 1 to 10% by weight.

If the content of the polar group-containing component in the resin (A) is less than 0.5% by weight, the initial potential is low and thus satisfactory image density is hardly obtained. On the other hand, if the content of the polar group-containing component is larger than 15% by weight, various undesirable problems may occur, for example, the dispersibility is reduced, and further when the light-sensitive material is used as an offset master plate, the occurrence of background stains may increase.

The repeating unit represented by the general formula (I) above which is contained in the resin (A) in an amount of not less than 30% by weight will be described in greater detail below.

In the general formula (I), $a^1$ and $a^2$ each preferably represents a hydrogen atom, a halogen atom (e.g., chlorine, and bromine), a cyano group, an alkyl group having from 1 to 4 carbon atoms (e.g., methyl, ethyl, propyl and butyl), —COOR$^4$ or —COOR$^4$ bonded via a hydrocarbon group (wherein R$^4$ represents an alkyl, alkenyl, aralkyl, alicyclic or aryl group which may be substituted, and specifically includes those as described for R$^3$ hereinafter). Preferably $a^1$ represents a hydrogen atom and $a^2$ represents a methyl group.

The hydrocarbon group in the above described —COOR$^4$ group bonded via a hydrocarbon group includes, for example, a methylene group, an ethylene group, and a propylene group.

R$^3$ preferably represents a hydrocarbon group having not more than 18 carbon atoms, which may be substituted. The substituent for the hydrocarbon group may be any substituent other than the polar groups contained in the polar group-containing polymer component described above. Suitable examples of the substituent include a halogen atom (e.g., fluorine, chlorine, and bromine), —OR$^5$, —COOR$^5$, and —OCOR$^5$ (wherein R$^5$ represents an alkyl group having from 1 to 22 carbon atoms, e.g., methyl, ethyl, propyl, butyl, hexyl, octyl, decyl, dodecyl, hexadecyl, and octadecyl). Preferred examples of the hydrocarbon group include an alkyl group having from 1 to 18 carbon atoms which may be substituted (e.g., methyl, ethyl, propyl, butyl, pentyl, hexyl, heptyl, octyl, decyl, dodecyl, hexadecyl, octadecyl, 2-chloroethyl, 2-bromoethyl, 2-cyanoethyl, 2-hydroxyethyl, 2-methoxycarbonylethyl, 2-methoxyethyl, 2-ethoxyethyl, 3-hydroxypropyl and 3-bromopropyl), an alkenyl group having from 2 to 18 carbon atoms which may be substituted ( e. g., vinyl, allyl, 2-methyl-l-propenyl, 2-butenyl, 2-pentenyl, 3-methyl-2-pentenyl, 1-pentenyl, 1-hexenyl, 2-hexenyl, and 4-methyl-2-hexenyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl and dimethoxybenzyl), an alicyclic group having from 5 to 8 carbon atoms which may be substituted (e.g., cyclopentyl, cyclohexyl, 2-cyclohexylethyl, and 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl).

More preferably, the polymer component corresponding to the repeating unit represented by the general formula (I) is a methacrylate component having the specific aryl group represented by the general formula (Ia) and/or (Ib) described below. The low molecular weight resin containing the specific aryl group-containing methacrylate polymer component described above is sometimes referred to as a resin (A') hereinafter.

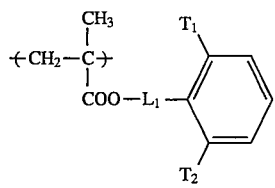

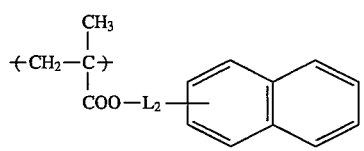

wherein $T_1$ and $T_2$ each represents a hydrogen atom, a halogen atom, a hydrocarbon group having from 1 to 10 carbon atoms, $-COR_a$ or $-COOR_a$, wherein $R_a$ represents a hydrocarbon group having from 1 to 10 carbon atoms; and $L_1$ and $L_2$ each represents a mere bond or a linking group containing from 1 to 4 linking atoms, which connects —COO— and the benzene ring.

In the resin (A'), the content of the methacrylate polymer component corresponding to the repeating unit represented by the general formula (Ia) and/or (Ib) is suitably not less than 30% by weight, preferably from 50 to 97% by weight, and the content of polymer component containing the specified polar group is suitably from 0.5 to 15% by weight, preferably from 1 to 10% by weight.

In case of using the resin (A'), the electrophotographic characteristics, particularly, $V_{10}$, D.R.R. and $E_{1/10}$ of the electrophotographic material can be furthermore improved.

In the general formula (Ia), $T_1$ and $T_2$ each preferably represents a hydrogen atom, a chlorine atom, a bromine atom, and as a hydrocarbon group having from 1 to 10 carbon atoms, an alkyl group having from 1 to 4 carbon atoms (e.g., methyl, ethyl, propyl, and butyl), an aralkyl group having from 7 to 9 carbon atoms (e.g., benzyl, phenethyl, 3-phenylpropyl, chlorobenzyl, dichlorobenzyl, bromobenzyl, methylbenzyl, methoxybenzyl, and chloromethylbenzyl), an aryl group (e.g., phenyl, tolyl, xylyl, bromophenyl, methoxyphenyl, chlorophenyl, and dichlorophenyl), $-COR_a$ or $-COOR_a$ (wherein $R_a$ preferably represents any of the above-recited hydrocarbon groups described as preferred hydrocarbon groups having from 1 to 10 carbon atoms).

In the general formulae (Ia) and (Ib), $L_1$ and $L_2$ each represents a mere bond or a linking group containing from 1 to 4 linking atoms which connects between —COO— and the benzene ring, e.g., $-(CH_2)_{n_1}$ (wherein $n_1$ represents an integer of from 1 to 3), $-CH_2OCO-$, $-CH_2CH_2OCO-$, $-(CH_2)_{m_1}$ (wherein $m_1$ represents an integer of 1 or 2), and $-CH_2CH_2O-$, and preferably represents a mere bond or a linking group containing from 1 to 2 linking atoms.

Specific examples of the polymer component corresponding to the repeating unit represented by the general formula (Ia) or (Ib) which can be used in the resin (A) according to the present invention are set forth below, but the present invention should not be construed as being limited thereto. In the following formulae (a-1) to (a-17), n represents an integer of from 1 to 4; m represents an integer of from 0 to 3; p represents an integer of from 1 to 3; $R_{10}$ to $R_{13}$ each represents $-C_nH_{2n+1}$ or $-(CH_2)_mC_6H_5$ (wherein n and m each has the same meaning as defined above); and $X_1$ and $X_2$, which may be the same or different, each represents a hydrogen atom, —Cl, —Br or —I.

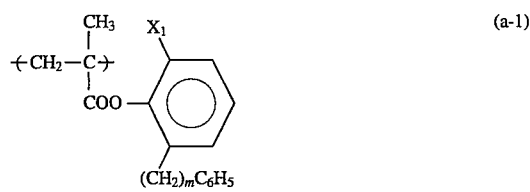

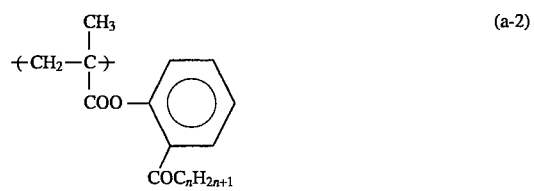

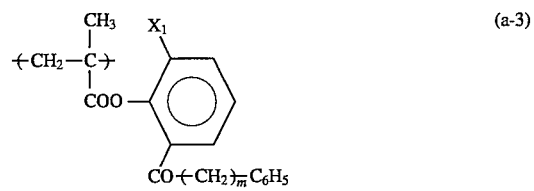

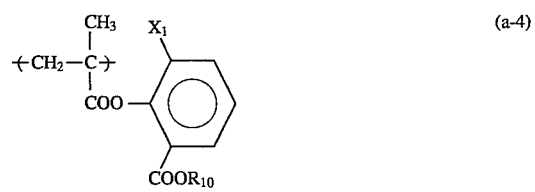

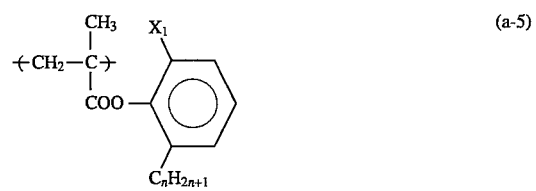

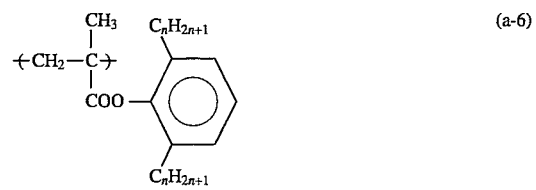

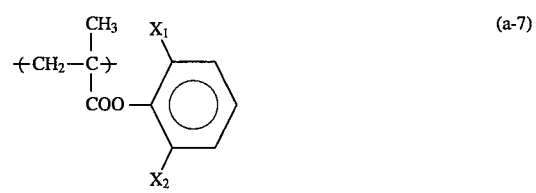

-continued

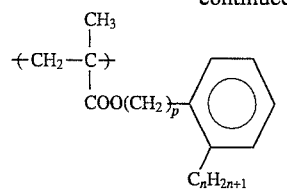 (a-8)

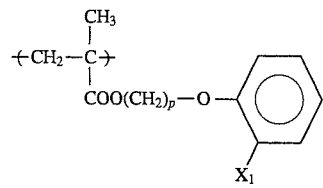 (a-9)

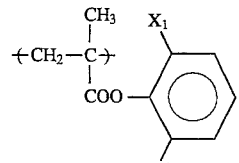 (a-10)

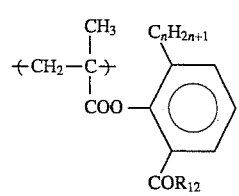 (a-11)

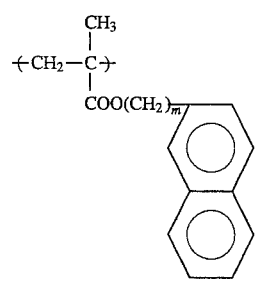 (a-12)

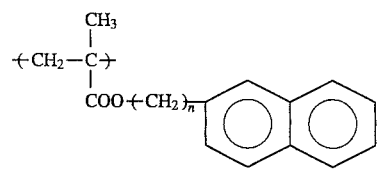 (a-13)

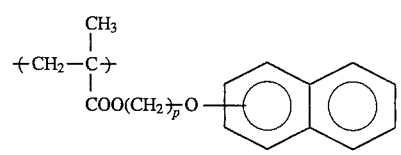 (a-14)

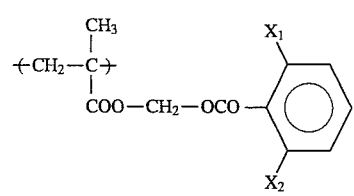 (a-15)

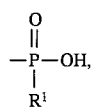 (a-16)

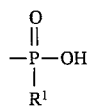 (a-17)

Now, the polymer component having the specified polar group present in the resin (A) will be described in detail below.

The polymer component having the specified polar group can exist either in the polymer chain of the resin (A), at one terminal of the polymer chain or both of them.

The polar group included in the polar group-containing polymer component is selected from —$PO_3H_2$, —$SO_3H$, —COOH, $$-\underset{R^1}{\underset{|}{P}}(=O)-OH,$$

and a cyclic acid anhydride-containing group, as described above.

In the group $$-\underset{R^1}{\underset{|}{P}}(=O)-OH$$

above, $R^1$ represents a hydrocarbon group or —$OR^2$ (wherein $R^2$ represents a hydrocarbon group). The hydrocarbon group represented by $R^1$ or $R^2$ preferably includes an aliphatic group having from 1 to 22 carbon atoms which may be substituted (e.g., methyl, ethyl, propyl, butyl, hexyl, octyl, decyl, dodecyl, octadecyl, 2-chloroethyl, 2-methoxyethyl, 3-ethoxypropyl, allyl, crotonyl, butenyl, cyclohexyl, benzyl, phenethyl, 3-phenylpropyl, methylbenzyl, chlorobenzyl, fluorobenzyl, and methoxybenzyl) and an aryl group which may be substituted (e.g., phenyl, tolyl, ethylphenyl, propylphenyl, chlorophenyl, fluorophenyl, bromophenyl, chloromethylphenyl, dichlorophenyl, methoxyphenyl, cyanophenyl, acetamidophenyl, acetylphenyl, and butoxyphenyl).

The cyclic acid anhydride-containing group is a group containing at least one cyclic acid anhydride. The cyclic acid anhydride to be contained includes an aliphatic dicarboxylic acid anhydride and an aromatic dicarboxylic acid anhydride.

Specific examples of the aliphatic dicarboxylic acid anhydrides include succinic anhydride ring, glutaconic anhydride ring, maleic anhydride ring cyclopentane- 1,2-dicarboxylic acid anhydride ring cyclohexane- 1,2-dicarboxylic acid anhydride ring cyclohexene- 1,2-dicarboxylic acid anhydride ring, and 2,3-bi-cyclo[2,2,2]octanedicarboxylic acid anhydride. These rings may be substituted with, for example, a halogen atom such as a chlorine atom and a bromine atom, and an alkyl group such as a methyl group, an ethyl group, a butyl group and a hexyl group.

Specific examples of the aromatic dicarboxylic acid anhydrides include phthalic anhydride ring, naphthalenedicarboxylic acid anhydride ring, pyridinedicarboxylic acid anhydride ring and thiophenedicarboxylic acid anhydride ring. These rings may be substituted with, for example, a halogen atom (e.g., chlorine and bromine), an alkyl group (e.g., methyl, ethyl, propyl, and butyl), a hydroxyl group, a cyano group, a nitro group, and an alkoxycarbonyl group (e.g., methoxy and ethoxy as the alkoxy group).

In a case wherein the polar group is present in the polymer chain of the resin (A), the polar group may be bonded to the polymer main chain either directly or via an appropriate linking group. The linking group can be any group for connecting the polar group to the polymer main chain. Specific examples of suitable linking group include

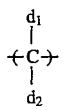

(wherein $d_1$ and $d_2$, which may be the same or different, each represents a hydrogen atom, a halogen atom (e.g., chlorine, and bromine), a hydroxyl group, a cyano group, an alkyl group (e.g., methyl, ethyl, 2-chloroethyl, 2-hydroxyethyl, propyl, butyl, and hexyl), an aralkyl group (e.g., benzyl, and phenethyl), or a phenyl group),

(wherein $d_3$ and $d_4$ each has the same meaning as defined for $d_1$ or $d_2$ above), —$C_6H_{10}$, —$C_6H_4$—, —O—, —S—,

(wherein $d_5$ represents a hydrogen atom or a hydrocarbon group (preferably having from 1 to 12 carbon atoms (e.g., methyl, ethyl, propyl, butyl, hexyl, octyl, decyl, dodecyl, 2-methoxyethyl, 2-chloroethyl, 2-cyanoethyl, benzyl, methylbenzyl, phenethyl, phenyl, tolyl, chlorophenyl, methoxyphenyl, and butylphenyl)), —CO—, —COO—, —OCO—, —CON($d_5$)—, —$SO_2N(d_5)$—, —$SO_2$—, —NHCONH—, —NHCOO—, —$NHSO_2$—, —CONHCOO—, —CONHCONH—, a heterocyclic ring (preferably a 5-membered or 6-membered ring containing at least one of an oxygen atom, a sulfur atom and a nitrogen atom as a hetero atom or a condensed ring thereof (e.g., thiophene, pyridine, furan, imidazole, piperidine, and morpholine rings)),

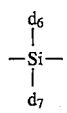

(wherein $d_6$ and $d_7$ which may be the same or different, each represents a hydrocarbon group or —$Od_8$ (wherein $d_8$ represents a hydrocarbon group)), and a combination thereof. Suitable examples of the hydrocarbon groups include those described for $d_5$.

The polymer component containing the polar group may be any of specified polar group-containing vinyl compounds copolymerizable with, for example, monomer corresponding to the repeating unit represented by the general formula (I) (including that represented by the general formula (Ia) or (Ib)). Examples of such vinyl compounds are described, e.g., in Kobunshi Gakkai (ed.), *Kobunshi Data Handbook Kisohen* (*Polymer Date Handbook Basis*), Baifukan (1986). Specific examples of these vinyl monomers include acrylic acid, α- and/or β-substituted acrylic acids (e.g., α-acetoxy, α-acetoxymethyl, α-(2-amino)-ethyl, α-chloro, α-bromo, α-fluoro, α-tributylsilyl, α-cyano, β-chloro, β-bromo, α-chloro-β-methoxy, and α,β-dichloro compounds), methacrylic acid, itaconic acid, itaconic half esters, itaconic half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic half esters, maleic half amides, vinylbenzenecarboxylic acid, vinylbenzenesulfonic acid, vinylsulfonic acid, vinylphosphonic acid, dicarboxylic acid vinyl or allyl half esters, and ester or amide derivatives of these carboxylic acids or sulfonic acids containing the specific polar group in the substituent thereof.

Specific examples of the polar group-containing polymer components are set forth below, but the present invention should not be construed as being limited thereto. In the following formulae, $e_1$ represents —H or —$CH_3$; $e_2$ represents —H, —$CH_3$ or —$CH_2COOCH_3$; $R_{14}$ represents an alkyl group having from 1 to 4 carbon atoms; $R_{15}$ represents an alkyl group having from 1 to 6 carbon atoms, a benzyl group or a phenyl group; c represents an integer of from 1 to 3; d represents an integer of from 2 to 11; e represents an integer of from 1 to 11; f represents an integer of from 2 to 4; and g represents an integer of from 2 to 10.

(b-1)

(b-2)

(b-3)

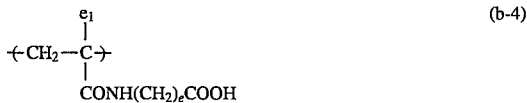

(b-4)

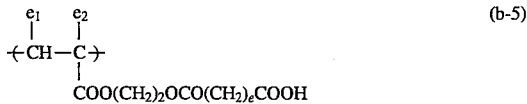

(b-5)

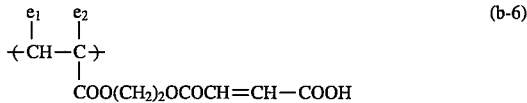

(b-6)

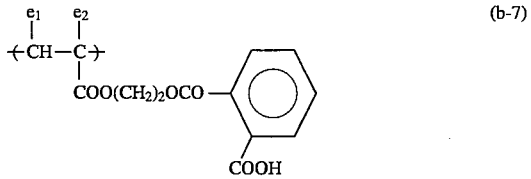

(b-7)

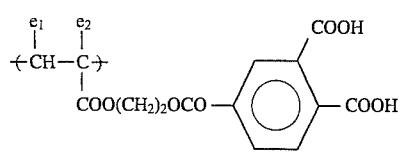 (b-8)
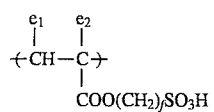 (b-9)
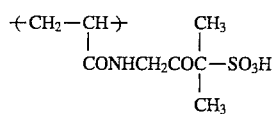 (b-10)
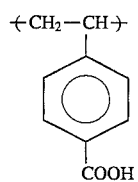 (b-11)
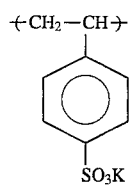 (b-12)
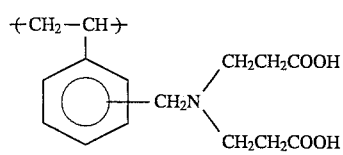 (b-13)
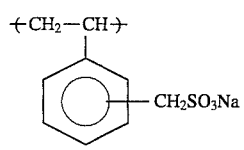 (b-14)
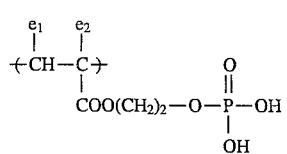 (b-15)
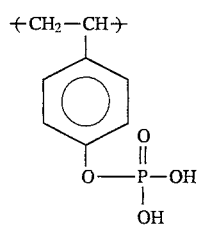 (b-16)
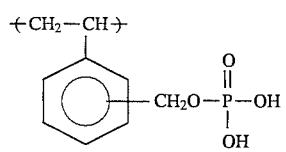 (b-17)
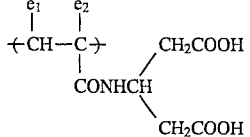 (b-18)
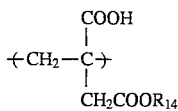 (b-19)
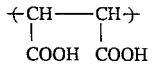 (b-20)
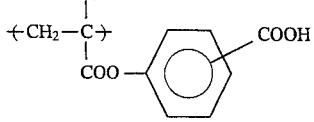 (b-21)
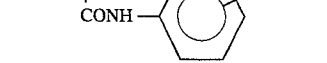 (b-22)
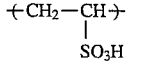 (b-23)
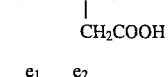 (b-24)
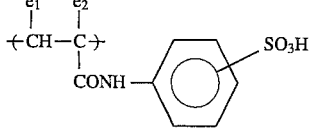 (b-25)
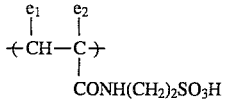 (b-26)
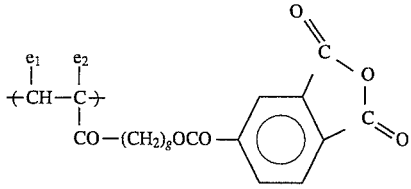 (b-27)
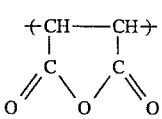 (b-28)
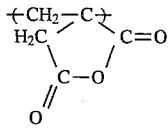 (b-29)
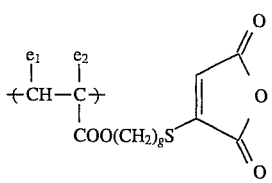 (b-30)

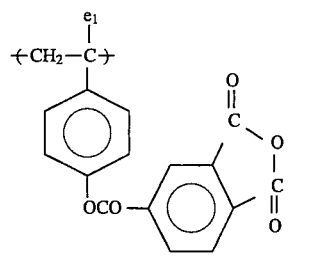 (b-31)
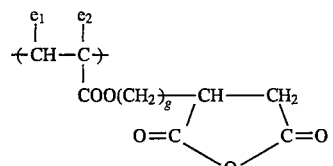 (b-32)
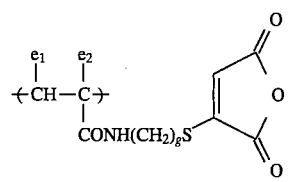 (b-33)
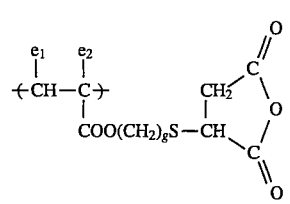 (b-34)
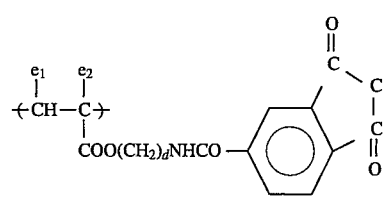 (b-35)
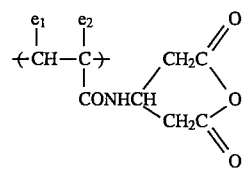 (b-36)
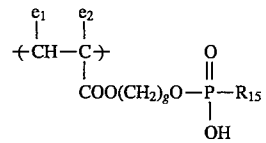 (b-37)
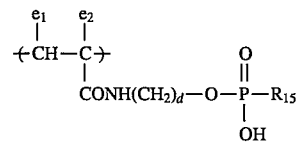 (b-38)
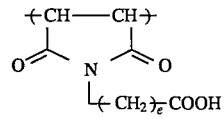 (b-39)
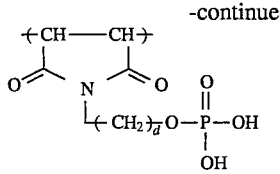 (b-40)
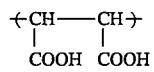 (b-41)
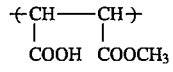 (b-42)
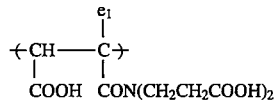 (b-43)
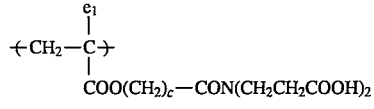 (b-44)
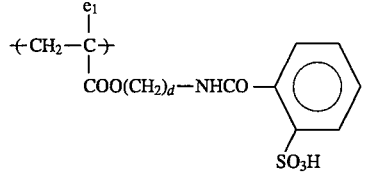 (b-45)
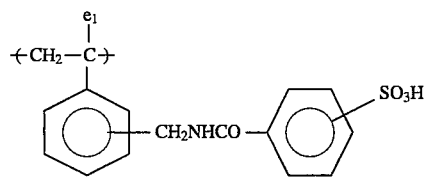 (b-46)
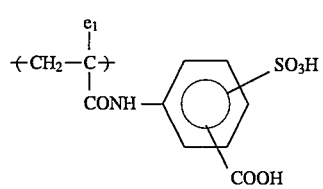 (b-47)
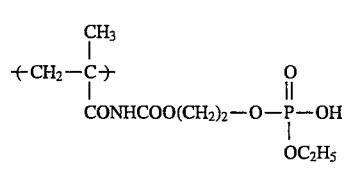 (b-48)
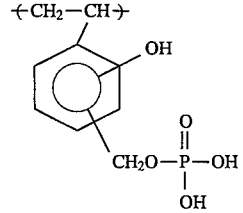 (b-49)
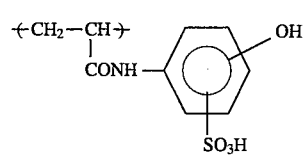 (b-50)

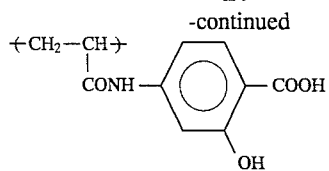

(b-51)

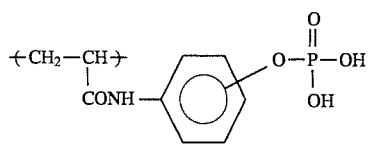

(b-52)

In such a case, the polar group is included in a component (repeating unit) for forming the polymer chain of the resin (A) and the polar groups can be present in the resin (A) regularly (in a case of a block polymer) or irregularly (in case of a random polymer).

In a case wherein the polar group is present at one terminal of the polymer chain of the resin (A), the polar group may be bonded to the terminal of the polymer main chain either directly or via an appropriate linking group. Suitable examples of the linking groups include those illustrated for the cases wherein the polar groups are present in the polymer chain hereinbefore described.

When the polar group is present at one terminal of polymer main chain of the resin (A) as described above, other polar groups are not necessary to exist in the polymer chain. However, the resin (A) having the specified polar groups in the polymer chain in addition to the polar group bonded to the terminal of the main chain is preferable since the electrostatic characteristics are further improved. The polar groups present may be the same or different.

In the resin (A), the ratio of the polar group present in the polymer chain to the polar group bonded to the terminal of the polymer main chain may be varied depending on the kinds and amounts of other binder resins, a spectral sensitizing dye, a-chemical sensitizer and other additives which constitute the photoconductive layer according to the present invention, and can be appropriately controlled. What is important is that the total amount of the polar group-containing component present in the resin (A) is from 0.5 to 15% by weight.

The resin (A) (including resin (A')) according to the present invention may further comprise repeating units corresponding to other copolymerizable monomers as polymer components in addition to the repeating unit of the general formula (I), (Ia) and/or (Ib) and the repeating unit containing the polar group optionally present.

Examples of such monomers include, in addition to methacrylic acid esters, acrylic acid esters and crotonic acid esters containing substituents other than those described for the general formula (I), α-olefins, vinyl or allyl esters of carboxylic acids (including, e.g., acetic acid, propionic acid, butyric acid, valetic acid, benzoic acid, -and naphthalenecarboxylic acid, as examples of the carboxylic acids), acrylonitrile, methacrylonitrile, vinyl ethers, iraconic acid esters (e.g., dimethyl ester and diethyl ester), acrylamides, methacrylamides, styrenes (e.g., styrene, vinyltoluene, chlorostyrene, hydroxystyrene, N,N-dimethylaminomethylstyrene, methoxycarbonylstyrene, methanesulfonyloxystyrene, and vinylnaphthalene), vinylsulfone-containing compounds, vinylketone-containing compounds, and heterocyclic vinyl compounds (e.g., vinylpyrrolidone, vinylpyridine, vinylimidazole, vinylthiophene, vinylimidazoline, vinylpyrazoles, vinyldioxane, vinylquinoline, vinyltetrazole, and vinyloxazine). It is preferred that the content of the polymer components corresponding to such other monomers does not exceed 30% by weight of the resin (A).

The resin (A) having the specified polar groups at random in the polymer chain thereof can be easily synthesized according to a conventionally known method, for example, a radical polymerization method or an ion polymerization method using a monomer corresponding to the repeating unit represented by the general formula (I), a monomer corresponding to the repeating unit containing the specified polar group and, if desired, other monomers by appropriately selecting the polymerization condition so as to obtain the resin having the desired molecular weight. A radical polymerization method is preferred because purification of the monomers and solvent to be used is unnecessary and a very low polymerization temperature such as 0° C. or below is not required. Specifically, a polymerization initiator used includes an azobis type initiator and a peroxide compound each of which is conventionally known. In order to synthesize the resin having the low molecular weight according to the present invention, a known method, for example, increase in the amount of initiator used or regulation of a high polymerization temperature may be utilized. In general, the amount of initiator used is in a range of from 0.1 to 20 parts by weight based on the total amount of the monomers employed, and the polymerization temperature is regulated in a range of from 30° C. to 200° C. Moreover, a method using a chain transfer agent together may be employed. Specifically, a chain transfer agent, for example, a mercapto compound, or a halogenated compound is used in a range of from 0.01 to 10 parts by weight based on the total amount of the monomers employed to adjust the desired weight average molecular weight.

The resin (A) having the specified polar groups as a block in the polymer chain thereof used in the present invention can be produced by a conventionally known polymerization reaction method. More specifically, it can be produced according to a method for producing the AB block copolymer described hereinafter with respect to the resin (B).

The resin (A) according to the present invention, in which the specific polar group is bonded to only one terminal of the polymer main chain, can easily be prepared by an ion polymerization process, in which a various kind of reagents is reacted at the terminal of a living polymer obtained by conventionally known anion polymerization or cation polymerization; a radical polymerization process, in which radical polymerization is performed in the presence of a polymerization initiator and/or a chain transfer agent which contains the specific polar group in the molecule thereof; or a process, in which a polymer having a reactive group (for example, an amino group, a halogen atom, an epoxy group, and an acid halide group) at the terminal obtained by the above-described ion polymerization or radical polymerization is subjected to a polymer reaction to convert the terminal reactive group into the specific polar group.

More specifically, reference can be made to, e.g., P. Dreyfuss and R. P. Quirk, *Encycl. Polym. Sci. Eng.*, 7, 551 (1987), Yoshiki Nakajo and Yuya Yamashita, *Senryo to Yakuhin (Dyes and Chemicals).*, 30, 232 (1985), Akira Ueda and Susumu Nagai, *Kagaku to Koqyo (Science and Industry)*, 60, 57 (1986) and literature references cited therein.

Specific examples of chain transfer agents which can be used include mercapto compounds containing the polar group or the reactive group capable of being converted into the polar group (e.g., thioglycolic acid, thiomalic acid, thiosalicylic acid, 2-mercaptopropionic acid, 3-mercaptopropionic acid, 3-mercaptobutyric acid, N-(2-mercaptopropionyl)glycine, 2-mercaptonicotinic acid, 3-[N-(2-mercaptoethyl)carbamoyl]propionic acid, 3-[ N-(2-mercaptoethyl)amino]propionic acid, N-(3- mercaptopropionyl)alanine, 2-mercaptoethanesulfonic acid, 3-mercaptopropanesulfonic acid, 4-mecaptobutanesulfonic acid, 2-mercaptoethanol, 3-mercapto-1,2-propanediol, 1-mercapto- 2-propanol, 3-mercapto-2-butanol, mercaptophenol, 2-mercaptoethylamine, 2-mercaptoimidazole, 2-mercapto- 3-pyridinol, 4- (2-mercaptoethyloxycarbonyl)-phthalic acid anhydride, 2-mercaptoethylphosphonic acid anhydride, and monomethyl 2-mercaptoethylphosphonate), and alkyl iodide compounds containing the polar group or the polar group-forming reactive group (e.g., iodoacetic acid, iodopropionic acid, 2-iodoethanol, 2-iodoethanesulfonic acid, and 3-iodopropanesulfonic acid).

Specific examples of the polymerization initiators containing the polar group or the reactive group include 4,4'-azobis(4-cyanovaleric acid), 4,4'-azobis(4-cyanovaleric acid chloride), 2,2'-azobis(2-cyanopropanol), 2,2'-azobis(2-cyanopentanol), 2,2'-azobis[2-methyl-N-( 2-hydroxyethyl)propionamide], 2,2'-azobis{2-methyl-N-[ 1,1-bis(hydroxymethyl)-2-hydroxyethyl]propionamide), 2,2'-azobis{2-[1-(2-hydroxyethyl)-2-imidazolin-2-yl]-propane), 2,2'-azobis[2-(2-imidazolin-2-yl)propane], and 2,2'-azobis [2-(4,5,6,7-tetrahydro-1H-1,3-diazepin-2-yl)propane].

The chain transfer agent or polymerization initiator is usually used in an amount of from 0.5 to 15 parts by weight, preferably from 2 to 10 parts by weight, per 100 parts by weight of the total monomers used.

Further, the resin (A) having the specific polar group at the terminal of the polymer main chain can be produced by a photopolymerization method using a dithiocarbamate group-containing compound or xanthate group-containing compound containing as a substituent the specific polar group, as a photo-initiator. Specifically, it can be easily prepared according to a method described in the references cited for the production of the resin (B) hereinafter.

Examples of the dithiocarbamate group or xanthate group containing compound include those represented by the general formula (PI) or (PII) described below.

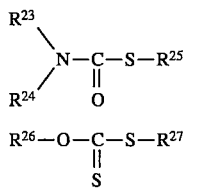

Formula (PI)

$$R^{26}-O-C-S-R^{27}$$
$$\underset{S}{\overset{\|}{\phantom{C}}}$$

Formula (PII)

wherein $R^{23}$, $R^{24}$, $R^{25}$, $R^{26}$ and $R^{27}$ each represents a hydrocarbon group and at least one of $R^{23}$ $R^{24}$ and $R^{25}$ or at least one of $R^{26}$ and $R^{27}$ contains at least one of the above described specific polar groups as a substituent. Specific examples of the hydrocarbon group include those described for $R^3$ in the general formula (I) described above.

Now, the resin (B) which can be used as the binder resin for the photoconductive layer of the electrophotographic light-sensitive material according to the present invention will be described in more detail below.

The resin (B) is an AB block copolymer comprising an A block which comprises a polymer component containing the specific polar group and a B block which comprises a polymer component corresponding to the repeating unit represented by the general formula (I) and does not contain a polymer component containing the specific polar group described above.

The AB block copolymer according to the present invention includes a block copolymer wherein the A block and the B block are bonded each other (Embodiment (1)), a block copolymer of Embodiment (1) wherein the specific polar group is bonded at one terminal of the A block polymer chain and the B block is bonded at the other terminal of the A block polymer chain (Embodiment (2)), and a block copolymer wherein the B blocks are bonded at both terminals of the A block polymer chain (Embodiment (3)). These AB block copolymers are schematically illustrated as follows.

| Embodiment (1) | (A Block)-b-(B Block) |
| Embodiment (2) | (Polar Group)-(A Block)-b-(B Block) |
| Embodiment (3) | (B Block)-b-(A Block)-b-(B Block) | wherein —b— represents a bond connecting two blocks present on both sides.

The resin (B) is characterized by containing from 0.05 to 10% by weight of polymer component containing the specific polar group and not less than 30% by weight of polymer component represented by the general formula (I) based on the resin (B) as described above.

If the content of the polar group-containing component in the resin (B) is less than 0.05% by weight, the initial potential is low and thus satisfactory image density can not be obtained. On the other hand, if the content of the polar group-containing component is larger than 10% by weight, various undesirable problems may occur, for example, the dispersibility is reduced, the film smoothness and the electrophotographic characteristics under high temperature and high humidity condition are reduced, and further when the light-sensitive material is used as an offset master plate, the occurrence of background stains increases.

It is also preferred that the total amount of the specific polar group-containing polymer component contained in the resin (B) is from 10 to 50% by weight based on the total amount of the specific polar group-containing polymer component present in the resin (A).

If the total amount of the specific polar group-containing component in the resin (B) is less than 10% by weight of that in the resin (A), the electrophotographic characteristics (particularly, dark decay retention rate and photosensitivity) and film strength tend to decrease. On the other hand, if it is larger than 50% by weight, a sufficiently uniform dispersion may not be obtained, thereby the electrophotographic characteristics decrease and water retentivity decline when used as an offset master plate.

The weight average molecular weight of the resin (B) is from $3\times10^4$ to $1\times10^6$, and preferably from $5\times10^4$ to $5\times10^5$. If the weight average molecular weight of the resin (B) is less than $3\times10^4$, the film-forming property of the resin is lowered, thereby a sufficient film strength cannot be maintained, while if the weight average molecular weight of the resin (B) is higher than $1\times10^6$, the effect of the resin (B) of the present invention is reduced, whereby the electrophotographic characteristics thereof become almost the same as those of conventionally known resins.

The glass transition point of the resin (B) is preferably from $-10°$ C. to $100°$ C., and more preferably from $0°$ C. to $90°$ C.

Specific examples of the polymer component containing the specific polar group which constitutes the A block of the AB block copolymer (resin (B)) according to the present invention include those for the polymer component containing the specific polar group present in the resin (A) described above.

Two or more kinds of the polymer components containing the specific polar group may be employed in the A block. In such a case, two or more kinds of the polar group-containing components may be contained in the A block in the form of a random copolymer or a block copolymer.

The A block may contain other polymer components than the polar group-containing polymer components. Preferred examples of such other polymer components include those corresponding to the repeating unit represented by the following general formula (II):

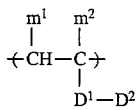
Formula (II)

wherein $D^1$ represents —COO—, —OCO—, —(CH$_2$)$_k$OCO—, —(CH$_2$)$_k$COO—, —O—, —SO$_2$—, —CO—,

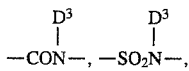

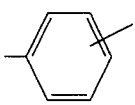

—CONHCOO—, —CONHCONH— or
(wherein k represents an integer of from 1 to 3; and $D^3$ represents a hydrogen atom or a hydrocarbon group); $D^2$ represents a hydrocarbon group; and $m^1$ and $m^2$ which may be the same or different, each has the same meaning as $a^1$ or $a^2$ in the general formula (I).

Preferred examples of the hydrocarbon group represented by $D^3$ include an alkyl group having from 1 to 18 carbon atoms which may be substituted (e.g., methyl, ethyl, propyl, butyl, pentyl, hexyl, heptyl, octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms which may be substituted (e.g., 2-methyl-1-propenyl, 2-butenyl, 2-pentenyl, 3-methyl,2-pentenyl, 1-pentenyl, 1-hexenyl, 2-hexenyl, and 4-methyl-2-hexenyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), an alicyclic group having from 5 to 8 carbon atoms which may be substituted (e.g., cyclohexyl, 2-cyclohexylethyl, and 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl) .

When $D^1$ represents

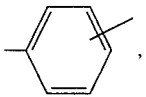, the benzene ring may be substituted. Suitable examples of the substituents include a halogen atom (e.g., chlorine, and bromine), an alkyl group (e.g., methyl, ethyl, propyl, butyl, chloromethyl, and methoxymethyl), and an alkoxy group (e.g., methoxy, ethoxy, propoxy, and butoxy).

Preferred examples of the hydrocarbon group represented by $D^2$ include an alkyl group having from 1 to 22 carbon atoms which may be substituted (e.g., methyl, ethyl, propyl, butyl, pentyl, hexyl, heptyl, octyl, decyl, dodecyl, tridecyl, tetradecyl, hexadecyl, octadecyl, 2-chloroethyl, 2-bromoethyl, 2-cyanoethyl, 2-methoxycarbonylethyl, 2-methoxyethyl, and 3-bromopropyl), an alkenyl group having from 4 to 18 carbon atoms which may be substituted (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), an aralkyl group having from 7 to 12 carbon atoms which may be substituted (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), an alicyclic group having from 5 to 8 carbon atoms which may be substituted (e.g., cyclohexyl, 2-cyclohexylethyl, and 2-cyclopentylethyl), and an aromatic group having from 6 to 12 carbon atoms which may be substituted (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propioamidophenyl, and dodecyloylamidophenyl).

More preferably, in the general formula (II), $D^1$ represents —COO—, —OCO—, —CH$_2$OCO—, —CH$_2$COO—, —O—, —CONH—, —SO$_2$NH— or

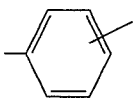

Moreover, the A block may further contain other polymer components corresponding to mohomers copolymerizable with monomers corresponding to the polymer components represented by the general formula (II). Examples of such monomers include acrylonitrile, methacrylonitrile, and heterocyclic vinyl compounds (e.g., vinylpyridine, vinylimidazole, vinylpyrrolidone, vinylthiophene, vinylpyrazole, vinyldioxane, and vinyloxazine). However, such other monomers are preferably employed in an amount of not more than 20 parts by weight per 100 parts by weight of the total polymer components constituting the A block.

The polymer component which constitutes the B block of the AB block copolymer (resin (B)) will be described in greater detail below.

The B block contains at least the polymer component corresponding to the repeating unit represented by the general formula (I) described above. The content of the polymer component corresponding to the general formula (I) in the B block is preferably not less than 30% by weight, more preferably not less than 50% by weight.

The polymer component corresponding to the general formula (I) is the same as that described in detail with respect to the resin (A) hereinbefore. As other polymer components, the B block may contain the above described polymer components represented by the general formula (II) and above described other polymer components corresponding to monomers copolymerizable with monomers corresponding to the polymer components represented by the general formula (II) which may be present in the A block described above. However, the B block does not contain any specified polar group-containing polymer component used in the A block.

Preferred examples of polymer components constituting the B block include those represented by the general formula (I) wherein both $a^1$ and $a^2$ are hydrogen atoms and the hydrocarbon group represented by $R^3$ is an alkyl group having from 1 to 6 carbon atoms which may be substituted (e.g., methyl, ethyl, propyl, butyl, pentyl, hexyl, 2-chloroethyl, 2-cyanoethyl, 2-methoxyethyl, 2-thienylethyl, and 2,3-dichloropropyl), and those represented by the general formula (II) wherein both $m^1$ and $m^2$ are hydrogen atoms and the hydrocarbon group represented by $D^2$ is selected from the alkyl group described for $R^3$ above.

The AB block copolymer (resin (B)) used in the present invention can be produced by a conventionally known polymerization reaction method. More specifically, it can be produced by the method comprising previously protecting the specific polar group of a monomer corresponding to the polymer component having the specific polar group to form a functional group, synthesizing an AB block copolymer by a so-called known living polymerization reaction, for example, an ion polymerization reaction with an organic metal compound (e.g., alkyl lithiums, lithium diisopropylamide, and alkyl-magnesium halides) or a hydrogen iodide/ iodine system, a photopolymerization reaction using a porphyrin metal complex as a catalyst, or a group transfer polymerization reaction, and then conducting a protection-removing reaction of the functional group which had been formed by protecting the polar group by a hydrolysis reaction, a hydrogenolysis reaction, an oxidative decomposition reaction, or a photodecomposition reaction to form the polar group. One example thereof is shown by the following reaction scheme (1):

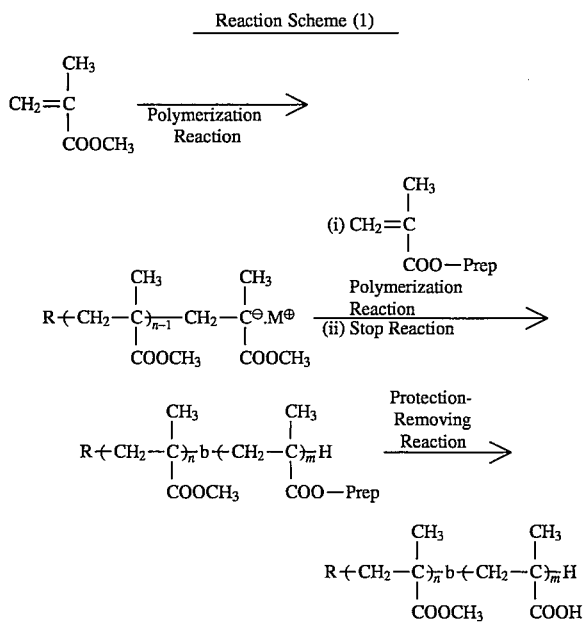

R: Alkyl group, porphyrin ring residue, etc.
Prep: Protective group (e.g., $-C(C_6H_5)_3$, $-Si(C_3H_7)_3$, etc.)
$-b-$: A bond connecting blocks Specifically, the AB block copolymer can be easily synthesized according to the synthesis methods described, e.g., in P. Lutz, P. Masson et al, *Polym. Bull.*, 12, 79 (1984), B. C. Anderson, G. D. Andrews et al, *Macromolecules*, 14, 1601 (1981), K. Hatada, K. Ute et al, *Polym. J.*, 17, 977 (1985), ibid., 18, 1037 (1986), Koichi Ute and Koichi Hatada, *Kobunshi Kako (Polymer Processing)*, 36, 366 (1987), Toshinobu Higashimura and Mitsuo Sawamoto, *Kobunshi Ronbun Shu (Polymer Treatises)*, 46, 189 (1989), M. Kuroki and T. Aida, *J. Am. Chem. Soc.*, 109, 4737 (1989), Teizo Aida and Shohei Inoue, *Yuki Gosei Kagaku (Organic Synthesis Chemistry)*, 43, 300 (1985), and D. Y. Sogah, W. R. Hertler et al, *Macromolecules*, 20, 1473 (1987).

Also, the protection of the specific polar group by a protective group and the release of the protective group (a reaction for removing a protective group) can be easily conducted by utilizing conventionally known knowledges. More specifically, they can be performed by appropriately selecting methods described, e.g., in Yoshio Iwakura and Keisuke Kurita, *Hannosei Kobunshi (Reactive Polymer)*, Kodansha (1977), T. W. Greene, *Protective Groups in Organic Synthesis*, John Wiley & Sons (1981), and J. F. W. McOmie, *Protective Groups in Organic Chemistry*, Plenum Press, (1973), as well as the methods as described in the above references.

Further, the AB block copolymer can be also synthesized by performing a polymerization reaction under light irradiation using a monomer having an unprotected polar group and also using a dithiocarbamate group-containing compound and/or xanthate group-containing compound as an initiator. For example, the block copolymer can be synthesized according to the synthesis methods described, e.g., in Takayuki Otsu, *Kobunshi (Polymer)*, 37, 248 (1988), Shunichi Himori and Ryuichi Otsu, *Polym. Rep. Jap.* 37, 3508 (1988), JP-A-64-111, JP-A- 64-26619, Nobuyuki Higashi et al, *Polymer Preprints Japan*, 36, (6), 1511 (1987), and M. Niwa, N. Higashi et al, *J. Macromol. Sci. Chem.*, A24, (5), 567 (1987).

Moreover, the AB block copolymer can be synthesized by a method wherein an azobis compound containing either the A block portion or the B block portion is synthesized and using the resulting polymer azobis initiator as an initiator, a radical polymerization reaction is conducted with monomers for forming another block. Specifically, the AB block copolymer can be synthesized by the methods described, for example, in Akira Ueda and Susumu Nagai, *Kobunshi Ronbun Shu*, 44, 469(1987), and Akira Ueda, *Osakashiritsu Kogyo Kenkyusho Hokoku*, 84, (1989).

In case of utilizing the above described synthesis method, a weight average molecular weight of the polymer azobis initiator is preferably not more than $2 \times 10^4$ in view of the easy synthesis of polymer azobis initiator and the regular polymerization reaction for the formation of block. On the other hand, it is preferred that the polymer chain of B block is longer than that of A block in the resin (B) according to the present invention. As a result, a polymer azobis initiator containing the A block portion is preferably employed when the AB block copolymer is synthesized according to the method. For example, the AB block copolymer is synthesized according to the following reaction scheme (2):

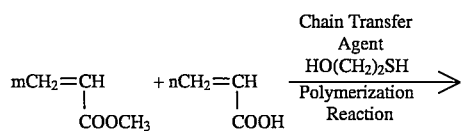

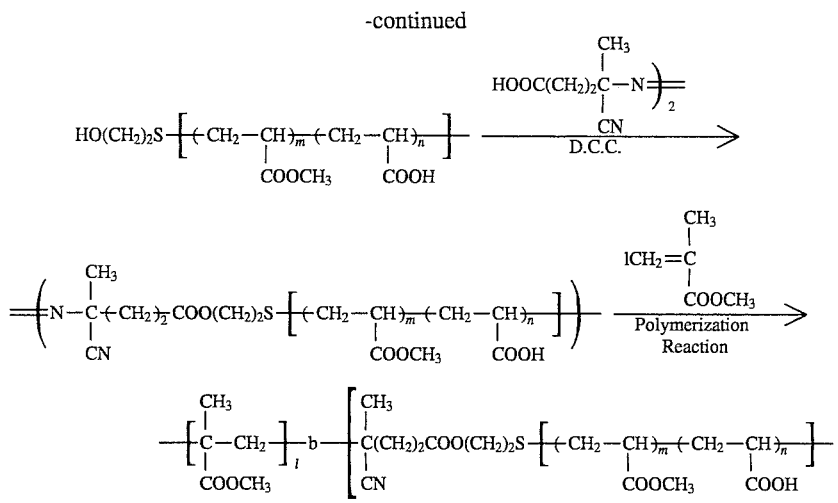

The resin (B) can have the specific polar group bonded either directly or via an appropriate linking group to one terminal of the polymer chain of the A block comprising the polar group-containing polymer component as described above. In such a case, the polar group bonded to the terminal may be the same as or different from the polar group present in the polymer component constituting the A block. Suitable examples of the linking groups include those illustrated for the cases wherein the polar groups are present in the polymer chain of the resin (A) described hereinbefore.

The AB block copolymer having the specific polar group at the terminal of its polymer chain can be produced by a conventionally known polymerization reaction method. More specifically, it can be produced by a method comprising previously protecting the specific polar group of a monomer corresponding to the polymer component having the specific polar group to form a functional group, synthesizing an AB block copolymer by a so-called known living polymerization reaction, for example, an ion polymerization reaction with an organic metal compound (e.g., alkyl lithiums, lithium diisopropylamide, and alkylmagnesium halides) or a hydrogen iodide/iodine system, a photopolymerization reaction using a porphyrin metal complex as a catalyst, or a group transfer polymerization reaction, introducing directly the specific polar group or introducing at first a functional group capable of connecting the specific polar group, then chemically bonding the specific polar group, at the stop reaction, and then conducting a protection-removing reaction of the functional group formed by protecting the polar group in the polymer by a hydrolysis reaction, hydrogenolysis reaction, an oxidative decomposition reaction, or a photodecomposition reaction to form the polar group. One of the examples is shown by the following reaction scheme (3):

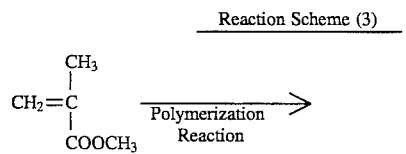

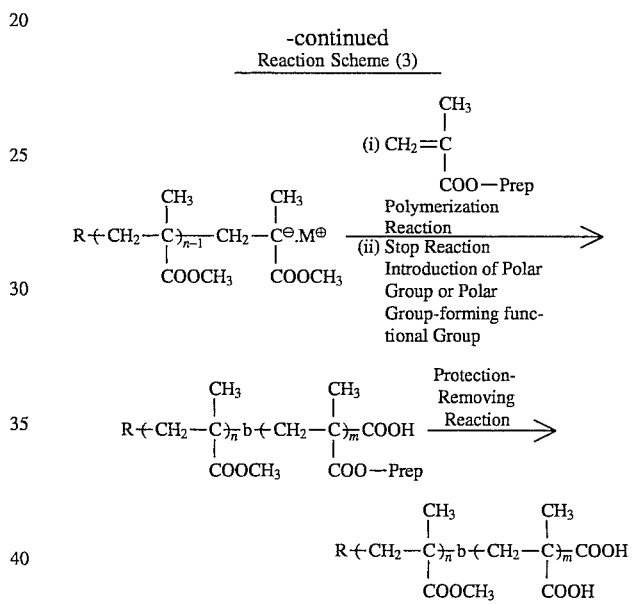

R: Alkyl group, porphyrin ring residue, etc.
Prep: Protective group (e.g., $-C(C_6H_5)_3$, $-Si(C_3H_7)_3$, etc.)
$-b-$: A bond connecting blocks Specifically, the AB block copolymer can be easily synthesized according to the synthesis methods described, e.g., in P. Lutz, P. Masson et al, *Polym. Bull.*, 12, 79 (1984), B. C. Anderson, G. D. Andrews et al, *Macromolecules*, 14, 1601 (1981), K. Hatada, K. Ute et al, *Polym. J.*, 17, 977 (1985), ibid., 18, 1037 (1986), Koichi Ute and Koichi Hatada, *Kobunshi Kako (Polymer Processing)*, 36, 366 (1987), Toshinobu Higashimura and Mitsuo Sawamoto, *Kobunshi Ronbun Shu (Polymer Treaties)*, 46, 189 (1987), M. Kuroki and T. Aida, *J. Am. Chem. Soc.*, 109, 4737 (1989), Teizo Aida and Shohei Inoue, *Yuki Gosei Kagaku (Organic Synthesis Chemistry)*, 43, 300 (1985), and D. Y. Sogah, W. R. Hertler et al, *Macromolecules*, 20, 1473 (1987).

Furthermore, the AB block copolymer can also be synthesized by performing a polymerization reaction under light irradiating using a monomer having an unprotected polar group and also using a dithiocarbamate group-containing compound and/or xanthate group-containing compound which also contains the specific polar group as a substituent as an initiator. For example, the block copolymer can be synthesized according to the synthesis methods described in Takayuki Otsu, *Kobunshi (Polymer)*, 37, 248 (1988), Shunichi Himori and Ryuichi Ohtsu, *Polym. Rep. Jap.* 37, 3508

(1988), JP-A-64-111, JP-A-64-26619, Nobuyuki Higashi et al, *Polymer Preprints Japan,* 36, (6), 1511 (1987), and M. Niwa, N. Higashi et al, *J. Macromol. Sci. Chem.,* A24, (5), 567 (1987).

Also, the protection of the specific polar group by a protective group and the release of the protective group (a reaction for removing a protective group) described above can be easily conducted by utilizing conventionally known knowledges. More specifically, they can be performed by appropriately selecting methods described, e.g., in Yoshio Iwakura and Keisuke Kurita, *Hannosei Kobunshi (Reactive polymer),* Kodansha (1977), T.W. Greene, *Protective Groups in Orqanic Synthesis,* John Wiley & Sons (1981), and J.F.W. McOmie, *Protective Groups in Orqanic Chemistry,* Plenum Press, (1973), as well as the methods as described in the above references.

Of the resin (B), the block copolymer wherein the B blocks are bonded to the both terminals of the A block (hereinafter sometimes referred to as a BAB block copolymer) is described below.

The B blocks bonded to the both terminals of the A block may be structurally the same or different and each contains the polymer component represented by the general formula (I) and does not contain the specific polar group-containing component present in the A block. The lengths of the polymer chains may be the same or different.

The BAB block copolymer used in the present invention can be produced by a conventionally known polymerization reaction method. More specifically, it can be produced by the method comprising previously protecting the specific polar group of a monomer corresponding to the polymer component having the specific polar group to form a functional group, synthesizing an AB block copolymer by a so-called known living polymerization reaction, for example, an ion polymerization reaction with an organic metal compound (e.g., alkyl lithiums, lithium diisopropylamide, and alkylmagnesium halides) or a hydrogen iodide/iodine system, a photopolymerization reaction using a porphyrin metal complex as a catalyst, or a group transfer polgmerization reaction, and then conducting a protection-removing reaction of the functional group which had been formed by protecting the polar.group by a hydrolysis reaction, a hydrogenolysis reaction, an oxidative decomposition reaction, or a photodecomposition reaction to form the polar group. One example thereof is shown by the following reaction scheme (4):

Reaction Scheme (4)

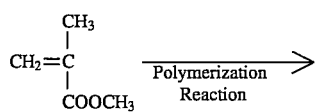

-continued
Reaction Scheme (4)

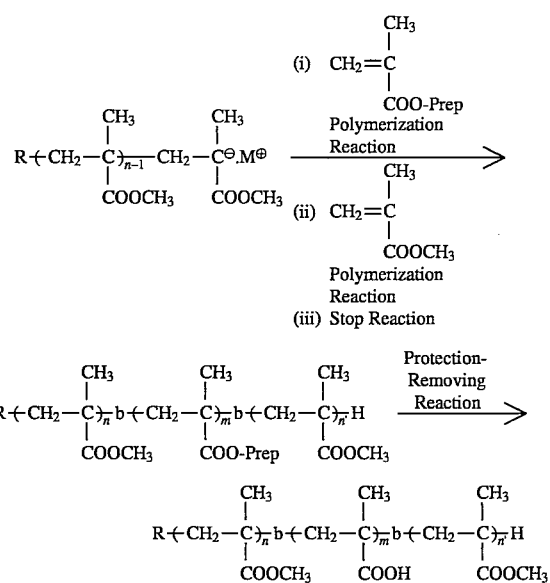

R: Alkyl group, porphyrin ring residue, etc.
Prep: Protective group (e.g., $-C(C_6H_5)_3$, $-Si(C_3H_7)_3$, etc.)
b: A bond connecting blocks Specifically, the BAB block copolymer can be easily synthesized according to the synthesis methods described, e.g., in P. Lutz, P. Masson et al, *Polym. Bull.,* 12, 79 (1984), B. C. Anderson, G. D. Andrews et al, *Macromolecules,* 14, 1601 (1981), K. Hatada, K. Ute et al, *Polym. J.,* 17, 977 (1985), ibid., 18, 1037 (1986), Koichi Ute and Koichi Hatada, *Kobunshi Kako (Polymer Processing),* 36, 366 (1987), Toshinobu Higashimura and Mitsuo Sawamoto, *Kobunshi Ronbun Shu (Polymer Treatises,* 46, 189 (1989), M. Kuroki and T. Aida, *J. Am. Chem. Soc.,* 109, 4737 (1989), Teizo Aida and Shohei Inoue, *Yuki Gosei Kagaku (Organic Synthesis Chemistry),* 43, 300 (1985), and D. Y. Sogah, W. R. Hertler et al, *Macromoleculeg,* 20, 1473 (1987), M. Morton, T. E. Helminiake et al, *J. Polym. Sci.,* 57, 471 (1962), B. Gordon III, M. Blumenthal and J. E. Loftus, *Polym. Bull.,* 11, 349 (1984), and R. B. Bates, W. A. Beavers et al, *J. Org. Chem.,* 44, 3800 (1979).

Also, the protection of the specific polar group by a protective group and the release of the protective group (a reaction for removing a protective group) can be easily conducted by utilizing conventionally known knowledges. More specifically, they can be performed by appropriately selecting methods described, e.g., in Yoshio Iwakura and Keisuke Kurita, *Hannosei Kobunshi (Reactive Polymer),* Kodansha (1977), T. W. Greene, *Protective Groups in Orqanic Synthesis,* John Wiley & Sons (1981), and J. F. W. McOmie, *Protective Groups in Organic Chemistry,* Plenum Press, (1973), as well as the methods as described in the above references.

Further, the BAB block copolymer can also be synthesized by performing a polymerization reaction under light irradiation using a monomer having an unprotected polar group and also using a dithiocarbamate group-containing compound and/or a xanthate group-containing compound as an initiator. For example, the block copolymer can be synthesized according to the synthesis methods described, e.g., in Takayuki Otsu, *Kobunshi (Polymer),* 37, 248 (1988), Shunichi Himori and Ryuichi Otsu, *Polym. Rep. Jap.* 37, 3508 (1988), JP-A-64-111, JP-A-64-26619, Nobuyuki Higashi et al, *Polymer Preprints Japan*, 36, (6), 1511 (1987), and M. Niwa, N. Higashi et al, *J. Macromol. Sci. Chem.*, A24, (5), 567 (1987).

The ratio of resin (A) to resin (B) used in the present invention is preferably 0.05 to 0.60/0.95 to 0.40, more preferably 0.10 to 0.40/0.90 to 0.60 by means of a weight ratio of resin (A)/resin (B).

When the weight ratio of resin (A)/resin (B) is less than 0.05, the effect for improving the electrostatic characteristics may be reduced. On the other hand, when it is more than 0.60, the film strength of the photoconductive layer may not be sufficiently maintained in some cases (particularly, in case of using as an electrophotographic printing plate precursor).

Furthermore, in the present invention, the binder resin used in the photoconductive layer may contain other resin(s) known for inorganic photoconductive substance in addition to the resin (A) and resin (B) according to the present invention. However, the amount of other resins descried above should not exceed 30% parts by weight per 100 parts by weight of the total binder resins since, if the amount is more than 30 parts by weight, the effects of the present invention are remarkably reduced.

Representative other resins which can be employed together with the resins (A) and (B) according to the present invention include vinyl chloride-vinyl acetate copolymers, styrene-butadiene copolymers, styrene-methacrylate copolymers, methacrylate copolymers, acrylate copolymers, vinyl acetate copolymers, polyvinyl butyral resins, alkyd resins, silicone resins, epoxy resins, epoxyester resins, and polyester resins.

Specific examples of other resins used are described, for example, in Takaharu Shibata and Jiro Ishiwatari, *Kobunshi (High Molecular Materials)*, 17, 278 (1968), Harumi Miyamoto and Hidehiko Takei, Imaging No. 8, 9 (1973), Koichi Nakamura, *Kiroku Zairyoyo Binder no Jissai Gijutsu (Practical Technique of Binders for Recording Materials)*, Cp. 10, published by C. M. C. Shuppan (1985), D. Tatt, S. C. Heidecker *Tappi*, 49, No. 10, 439 (1966), E. S. Baltazzi, R. G. Blanckette, et al., *Photo Sci Eng.*, 16, No 5, 354 (1972), Nguyen Chank Keh, Isamu Shimizu and Eiichi Inoue, *Denshi Shashin Gakkaishi (Journal of Electrophotoqraphic Association)*, 18, No. 2, 22 (1980), JP-B-50-31011, JP-A-53-54027, JP-A- 54-20735, JP-A-57-202544 and JP-A-58-68046.

The total amount of binder resin used in the photoconductive layer according to the present invention is preferably from 10 to 100 parts by weight, more preferably from 15 to 50 parts by weight, per 100 parts by weight of the inorganic photoconductive substance.

When the total amount of binder resin used is less than 10 parts by weight, it may be difficult to maintain the film strength of the photoconductive layer. On the other hand, when it is more than 100 parts by weight, the electrostatic characteristics may decrease and the image forming performance may degrade to result in the formation of poor duplicated image.

The inorganic photoconductive substance which can be used in the present invention includes zinc oxide, titanium oxide, zinc sulfide, cadmium sulfide, cadmium carbonate, zinc selenide, cadmium selenide, tellurium selenide, and lead sulfide.

As the spectral sensitizing dye according to the present invention, various dyes can be employed individually or as a combination of two or more thereof. Examples of the spectral sensitizing dyes are carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, and styryl dyes), and phthalocyanine dyes (including metallized dyes). Reference can be made to, for example, in Harumi Miyamoto and Hidehiko Takei, *Imaging*, 1973, No. 8, 12, C. J. Young et al., *RCA Review*, 15, 469 (1954), Kohei Kiyota et al., *Denkitsushin Gakkai Ronbunshi*, J 63-C, No. 2, 97 (1980), Yuji Harasaki et al., *Kogyo Kagaku Zasshi*, 66, 78 and 188 (1963), and Tadaaki Tani, *Nihon Shashin Gakkaishi*, 35, 208 (1972).

Specific examples of the carbonium dyes, triphenylmethane dyes, xanthene dyes, and phthalein dyes are described, for example, in JP-B-51-452, JP-A-50-90334, JP-A-50-114227, JP-A-53-39130, JP-A-53-82353, U.S. Pat. Nos. 3,052,540 and 4,054,450, and JP-A-57-16456.

The polymethine dyes, such as oxonol dyes, merocyanine dyes, cyanine dyes, and rhodacyanine dyes, include those described, for example, in F. M. Hamer, *The Cyanine Dyes and Related Compounds*. Specific examples include those described, for example, in U.S. Pat. Nos. 3,047,384, 3,110, 591, 3,121,008, 3,125,447, 3,128,179, 3,132,942, and 3,622, 317, British Patents 1,226,892, 1,309,274 and 1,405,898, JP-B-48-7814 and JP-B-55-18892.

In addition, polymethine dyes capable of spectrally sensitizing in the longer wavelength region of 700 nm or more, i.e., from the near infrared region to the infrared region, include those described, for example, in JP-A-47-840, JP-A-47-44180, JP-B-51-41061, JP-A-49-5034, JP-A-49-45122, JP-A-57-46245, JP-A-56-35141, JP-A-57-157254, JP-A-61-26044, JP-A-61-27551, U.S. Pat. Nos. 3,619,154 and 4,175,956, and *Research disclosure*, 216,117 to 118 (1982).

The electrophotographic light-sensitive material of the present invention is excellent in that the performance properties thereof are not liable to vary even when various kinds of sensitizing dyes are employed together.

If desired, the photoconductive layer may further contain various additives commonly employed in conventional electrophotographic light-sensitive layer, such as chemical sensitizers. Examples of such additives include electron-accepting compounds (e.g., halogen, benzoquinone, chloranil, acid anhydrides, and organic carboxylic acids) as described in the abovementioned *Imaging*, 1973, No. 8, 12; and polyarylalkane compounds, hindered phenol compounds, and p-phenylene-diamine compounds as described in Hiroshi Kokado et al., *Saikin-no Kododen Zairyo to Kankotai no Kaihatsu Jitsuyoka*, Chaps. 4 to 6, Nippon Kagaku Joho K. K. (1986).

The amount of these additives is not particularly restricted and usually ranges from 0.0001 to 2.0 parts by weight per 100 parts by weight of the photoconductive substance.

The photoconductive layer suitably has a thickness of from 1 to 100 µm, preferably from 10 to 50 µm.

In cases where the photoconductive layer functions as a charge generating layer in a laminated light-sensitive material composed of a charge generating layer and a charge transporting layer, the thickness of the charge generating layer suitably ranges from 0.01 to 1 μm, preferably from 0.05 to 0.5 μm.

If desired, an insulating layer can be provided on the light-sensitive layer of the present invention. When the insulating layer is made to serve for the main purposes for protection and improvement of durability and dark decay characteristics of the light-sensitive material, its thickness is relatively small. When the insulating layer is formed to provide the light-sensitive material suitable for application to special electrophotographic processes, its thickness is relatively large, usually ranging from 5 to 70 μm, preferably from 10 to 50 μm.

Charge transporting materials in the above-described laminated light-sensitive material include polyvinylcarbazole, oxazole dyes, pyrazoline dyes, and triphenylmethane dyes. The thickness of the charge transporting layer ranges usually from 5 to 40 μm, preferably from 10 to 30 μm.

Resins to be used in the insulating layer or charge transporting layer typically include thermoplastic and thermosetting resins, e.g., polystyrene resins, polyester resins, cellulose resins, polyether resins, vinyl chloride resins, vinyl acetate resins, vinyl chloride-vinyl acetate copolymer resins, polyacrylate resins, polyolefin resins, urethane resins, epoxy resins, melamine resins, and silicone resins.

The photoconductive layer according to the present invention can be provided on any known support. In general, a support for an electrophotographic lightsensitive layer is preferably electrically conductive. Any of conventionally employed conductive supports may be utilized in the present invention. Examples of usable conductive supports include a substrate (e.g., a metal sheet, paper, and a plastic sheet) having been rendered electrically conductive by, for example, impregnating with a low resistant substance; the above-described substrate with the back side thereof (opposite to the light-sensitive layer side) being rendered conductive and having further coated thereon at least one layer for the purpose of prevention of curling; the above-described substrate having provided thereon a water-resistant adhesive layer; the above-described substrate having provided thereon at least one precoat layer; and paper laminated with a conductive plastic film on which aluminum is vapor deposited.

Specific examples of conductive supports and materials for imparting conductivity are described, for example, in Yukio Sakamoto, *Denshishashin,* 14, No. 1, pp. 2 to 11 (1975), Hiroyuki Moriga, *Nyumon Tokushushi no Kaqaku,* Kobunshi Kankokai (1975), and M. F. Hoover, *J. Macromol. Sci. Chem.,* A-4(6), pp. 1327 to 1417 (1970).

The electrophotographic light-sensitive material according to the present invention can be utilized in any known electrophotographic process. Specifically, the light-sensitive material of the present invention is employed in any recording system including a PPC system and a CPC system in combination with any developer including a dry type developer and a liquid developer. In particular, the light-sensitive material is preferably employed in combination with a liquid developer in order to obtain the excellent effect of the present invention since the light-sensitive material is capable of providing faithfully duplicated image of highly accurate original.

Further, a color duplicated image can be produced by using it in combination with a color developer in addition to the formation of black and white image. Reference can be made to methods described, for example, in Kuro Takizawa, *Shashin Kogyo,* 33, 34 (1975) and Masayasu Anzai, *Denshitsushin Gakkai Gi,jutsu Kenkyu Hokoku,* 77, 17 (1977):

Moreover, the light-sensitive material of the present invention is effective for recent other systems utilizing an electrophotographic process. For instance, the light-sensitive material containing photoconductive zinc oxide as a photoconductive substance is employed as an offset printing plate precursor, and the lightsensitive material containing photoconductive zinc oxide or titanium oxide which does not cause environmental pollution and has good whiteness is employed as a recording material for forming a block copy usable in an offset printing process or a color proof.

BEST MODE FOR CONDUCTING THE INVENTION

The present invention is illustrated in greater detail with reference to the following examples, but the present invention is not to be construed as being limited thereto.

Synthesis examples of the resin (A) are specifically illustrated below.

SYNTHESIS EXAMPLE 1 OF RESIN (A): Resin (A-1)

A mixed solution of 95 g of benzyl methacrylate, 5 g of acrylic acid, and 200 g of toluene was heated to 90° C. under nitrogen gas stream, and 6.0 g of 2,2'-azo-bisisobutyronitrile (abbreviated as AIBN) was added thereto to effect a reaction for 4 hours. To the reaction mixture was further added 2 g of AIBN, followed by reacting for 2 hours. The resulting resin (A-1) had a weight average molecular weight (Mw) of 8,500. The weight average molecular weight (Mw) was a value measured by the GPC method and calculated in terms of polystyrene (hereinafter the same).

Resin (A-1)

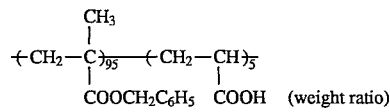

SYNTHESIS EXAMPLES 2 TO 28 OF RESIN (A): Resins (A-2) to (A-28)

Each of Resins (A-2) to (A-28) shown in Table 1 below was synthesized under the same polymerization conditions as described in Synthesis Example 1 of Resin (A). A weight average molecular weight of each of the resins (A) was in a range of from $5.0 \times 10^3$ to $9.0 \times 10^3$.

TABLE 1

$$+CH_2-\underset{\underset{COO-R_{14}}{|}}{\overset{\overset{CH_3}{|}}{C}})_{\overline{x}}(Y_1)_{\overline{y}}$$

| Synthesis Example of Resin (A) | Resin (A) | $R_{14}$ | $Y_1$ | x/y (weight ratio) |
|---|---|---|---|---|
| 2 | A-2 | $-CH_2C_6H_5$ | $-CH_2-\underset{\underset{COOH}{|}}{\overset{\overset{CH_3}{|}}{C}}-$ | 94/6 |
| 3 | A-3 | 2-methyl-3-chlorophenyl | $-CH_2-\underset{\underset{COOCH_2CH_2COOH}{|}}{CH}-$ | 95/5 |
| 4 | A-4 | $-C_6H_5$ | $-CH_2-\underset{\underset{COOH}{|}}{CH}-$ | 95/5 |
| 5 | A-5 | $-CH_2C_6H_5$ | $-CH_2-\underset{\underset{COOCH_2CH_2-O-P(=O)(OH)_2}{|}}{\overset{\overset{CH_3}{|}}{C}}-$ | 97/3 |
| 6 | A-6 | 2-methylphenyl | $-CH_2-\underset{\underset{COOH}{|}}{CH}-$ | 95/5 |
| 7 | A-7 | 2-chlorophenyl | $-CH_2-\underset{\underset{COO(CH_2)_2OCO(CH_2)_2COOH}{|}}{\overset{\overset{CH_3}{|}}{C}}-$ | 94/6 |
| 8 | A-8 | 2,3-dichlorophenyl | $-CH_2-CH(4-COOH-C_6H_4)-$ | 95/5 |
| 9 | A-9 | $-CH_2C_6H_5$ | $-CH_2-\underset{\underset{COO(CH_2)_2OCO-Ar(phthalic anhydride)}{|}}{\overset{\overset{CH_3}{|}}{C}}-$ | 93/7 |
| 10 | A-10 | 2-methyl-3-chlorophenyl | $-CH_2-\underset{\underset{COOH}{|}}{CH}-$ | 95/5 |

TABLE 1-continued $$\overset{CH_3}{\underset{COO-R_{14}}{+CH_2-\overset{|}{\underset{|}{C}}{\xrightarrow{x}}(Y_1)_{y}}}$$

| Synthesis Example of Resin (A) | Resin (A) | $R_{14}$ | $Y_1$ | x/y (weight ratio) |
|---|---|---|---|---|
| 11 | A-11 | 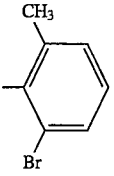 | $-CH_2-\underset{COO(CH_2)_2OCO-}{\overset{CH_3}{\underset{|}{C}}-}$ (phthalic acid with two COOH) | 96/4 |
| 12 | A-12 |  | $-CH_2-CH-$ $\underset{CONHCH_2\overset{CH_3}{\underset{CH_3}{\overset{|}{C}}}-SO_3H}{}$ | 97/3 |
| 13 | A-13 |  | $-CH_2-\overset{CH_3}{\underset{COO(CH_2)_2O-\overset{CH_3}{\underset{OH}{\overset{|}{P}}=O}}{\overset{|}{C}}-}$ | 97/3 |
| 14 | A-14 | 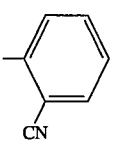 | $-CH_2-CH-$ $\underset{CONH(CH_2)_{10}COOH}{}$ | 94/6 |
| 15 | A-15 | 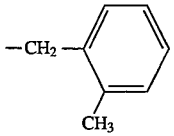 | $-CH_2-CH-COOH$ $\underset{CONHCHCH_2COOH}{| \quad\quad\quad\quad |}$ | 97/3 |
| 16 | A-16 | 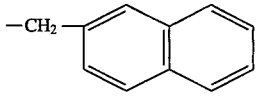 | $-CH_2-CH-$ $\underset{CONH-}{}$ (salicylic acid: COOH, OH) | 95/5 |
| 17 | A-17 | 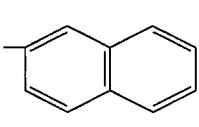 | $-CH_2-\overset{CH_3}{\underset{COO(CH_2)_4COOH}{\overset{|}{C}}-}$ | 93/7 |
| 18 | A-18 | 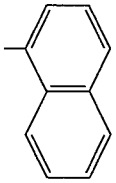 | $-CH_2-CH-$ $\underset{COO(CH_2)_2O-\overset{O}{\underset{OH}{\overset{||}{P}}-OH}}{}$ | 97/3 |
| 19 | A-19 | 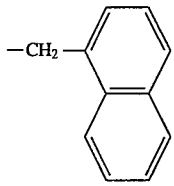 | $-CH_2-\overset{}{\underset{}{C}}-$ with succinic anhydride ring ($-CH_2-$, $O=C-O-C=O$) | 95/5 |

TABLE 1-continued $$-(CH_2-\underset{\underset{COO-R_{14}}{|}}{\overset{\overset{CH_3}{|}}{C}})_{x}-(Y_1)_{y}-$$

| Synthesis Example of Resin (A) | Resin (A) | $R_{14}$ | $Y_1$ | x/y (weight ratio) |
|---|---|---|---|---|
| 20 | A-20 | $-CH_2CH_2-$(2-naphthyl) | $-CH_2-\underset{COO(CH_2)_3SO_3H\cdot N(pyridine)}{\overset{CH_3}{\underset{|}{C}}}-$ | 98/2 |
| 21 | A-21 | $-CH_2CH_2O-$(phenyl) | $-CH_2-\underset{COOH}{\overset{|}{CH}}-$ | 96/4 |
| 22 | A-22 | $-CH_2C_6H_5$ | $-CH_2-\underset{CONHCH_2CH_2\underset{CH_3}{\overset{CH_3}{\underset{|}{C}}}-SO_3H}{\overset{|}{CH}}-$ | 97/3 |
| 23 | A-23 | 2-chlorophenyl | $-CH_2-\underset{COO(CH_2)_2S-\text{(maleic anhydride)}}{\overset{CH_3}{\underset{|}{C}}}-$ | 94/6 |
| 24 | A-24 | 3-bromophenyl | $-CH_2-\underset{COOH}{\overset{|}{CH}}-$ | 95/5 |
| 25 | A-25 | 2,6-dibromophenyl | $-CH_2-\underset{COO(CH_2)_2O-\underset{OH}{\overset{\overset{O}{\|}}{P}}-OC_2H_5}{\overset{CH_3}{\underset{|}{C}}}-$ | 92/8 |
| 26 | A-26 | 3-iodophenyl | $-CH_2-\underset{\text{(4-}O-\underset{OH}{\overset{\overset{O}{\|}}{P}}-C_2H_5\text{ phenyl)}}{\overset{|}{CH}}-$ | 97/3 |
| 27 | A-27 | 3-benzoylphenyl ($COC_6H_5$) | $-CH_2-\underset{COOH}{\overset{|}{CH}}-$ | 95/5 |
| 28 | A-28 | 3-phenylphenyl ($C_6H_5$) | $-CH_2-\underset{COOH}{\overset{|}{CH}}-$ | 95/5 |

SYNTHESIS EXAMPLE 29 OF RESIN (A): Resin (A-29)

A mixed solution of 95 g of 2,6-dichlorophenyl methacrylate, 5 g of acrylic acid, 2 g of n-dodecylmercaptan, and 200 g of toluene was heated to a temperature of 80° C under nitrogen gas stream, and 2 g of AIBN was added thereto to effect reaction for 4 hours. Then, 0.5 g of AIBN was added thereto, followed by reacting for 2 hours, and thereafter 0.5 g of AIBN was added thereto, followed by reacting for 3 hours. After cooling, the reaction mixture was poured into 2 liters of a solvent mixture of methanol and water (9:1) to reprecipitate, and the precipitate was collected by decantation and dried under reduced pressure to obtain 78 g of the copolymer in the wax form having a weight average molecular weight of $6.3 \times 10^3$.

SYNTHESIS EXAMPLES 30 TO 33 OF RESIN (A): Resins (A-30) to (A-33).

Copolymers shown in Table 2 below were synthesized in the same manner as described in Synthesis Example 29 of Resin (A), respectively. A weight average molecular weight of each of the polymers was in a range of from $6 \times 10^3$ to $8 \times 10^3$.

TABLE 2

$$\mathrm{+CH_2-\underset{\underset{COOCH_2C_6H_5}{|}}{\overset{\overset{CH_3}{|}}{C}}\!\!\!\!\!)_{\!\overline{x}}\,(Y)_{\overline{y}}\,(CH_2-\underset{\underset{COOH}{|}}{CH})_{\overline{5.0}}}$$

| Synthesis Example of Resin (A) | Resin (A) | —Y— | x/y (weight ratio) |
|---|---|---|---|
| 30 | A-30 | 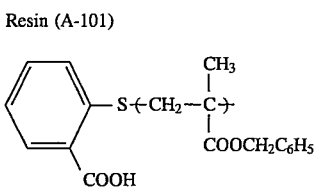 | 90/5 |
| 31 | A-31 | —CH₂—CH—<br>\|<br>CN | 92/3 |

TABLE 2-continued $$\mathrm{+CH_2-\underset{\underset{COOCH_2C_6H_5}{|}}{\overset{\overset{CH_3}{|}}{C}}\!\!\!\!\!)_{\!\overline{x}}\,(Y)_{\overline{y}}\,(CH_2-\underset{\underset{COOH}{|}}{CH})_{\overline{5.0}}}$$

| Synthesis Example of Resin (A) | Resin (A) | —Y— | x/y (weight ratio) |
|---|---|---|---|
| 32 | A-32 | —CH₂—CH—<br>\|<br>COOCH₂CH₂OCH₃ | 88/7 |
| 33 | A-33 | —CH₂—CH—<br>\|<br>CONHCH₃ | 90/5 |

SYNTHESIS EXAMPLE 101 OF RESIN (A): Resin (A-101)

A mixed solution of 96 g of benzyl methacrylate, 4 g of thiosalicylic acid, and 200 g of toluene was heated to a temperature of 75° C. under nitrogen gas stream, and 1.0 g of 2,2'-azobisisobutyronitrile (abbreviated as AIBN ) was added thereto to effect reaction for 4 hours. To the reaction mixture was further added 0.4 g of AIBN, followed by stirring for 2 hours, and thereafter 0.2 g of AIBN was added thereto, followed by stirring for 3 hours. The resulting resin (A-101) had the following structure and a weight average molecular weight of $6.8 \times 10^3$.

Resin (A-101)

$$\underset{\underset{COOH}{}}{\underset{|}{\bigcirc\!\!\!\!\!\bigcirc}}\!-\!S\!+\!CH_2\!-\!\underset{\underset{COOCH_2C_6H_5}{|}}{\overset{\overset{CH_3}{|}}{C}}\!\!\!\!\!+$$

SYNTHESIS EXAMPLES 102 TO 113 OF RESIN (A): Resins (A-102) to (A-113)

Resins (A-102) to (A-113) were synthesized in the same manner as described in Synthesis Example 101 of Resin (A), except for using the monomers described in Table 3 below in place of 96 g of benzyl methacrylate, respectively. A weight average molecular weight of each of these resins was in a range of from $6.0 \times 10^3$ to $8 \times 10^3$.

TABLE 3

$$\underset{\underset{COOH}{}}{\underset{|}{\bigcirc\!\!\!\!\!\bigcirc}}\!-\!S\!-\!\left[\!+\!CH_2\!-\!\underset{\underset{COOR_{17}}{|}}{\overset{\overset{CH_3}{|}}{C}}\!\!\!\!\!)_{\!\overline{x}}\,(Y_1)_{\overline{y}}\!\right]\!\!-$$

| Synthesis Example of Resin (A) | Resin (A) | R₁₇ | —Y₁— | x/y (weight ratio) |
|---|---|---|---|---|
| 102 | A-102 | —C₂H₅ | —CH₂—CH—<br>\|<br>COO(CH₂)₂COOH | 94/2 |
| 103 | A-103 | —C₆H₅ | CH₃<br>\|<br>—CH₂—C—<br>\|<br>COOH | 94/2 |

TABLE 3-continued $$\text{\large Ar}-S-[(CH_2-\underset{\underset{COOR_{17}}{|}}{\overset{\overset{CH_3}{|}}{C}})_{\overline{x}}(Y_1)_y]-$$

(where Ar = 2-carboxyphenyl, i.e., phenyl with ortho-COOH)

| Synthesis Example of Resin (A) | Resin (A) | R₁₇ | —Y₁— | x/y (weight ratio) |
|---|---|---|---|---|
| 104 | A-104 | 2-chlorophenyl | —CH₂—CH(COOH)— | 94.5/1.5 |
| 105 | A-105 | 2-methyl-4-chlorophenyl (CH₃ and Cl on ring) | —CH₂—CH(CN)— | 94/2 |
| 106 | A-106 | —CH₂C₆H₅ | —CH₂—CH(COOH)— | 93.5/2.5 |
| 107 | A-107 | —C₂H₅ | —CH₂—CH(4-COOH-C₆H₄)— | 93/3 |
| 108 | A-108 | 2,6-dibromophenyl | —CH₂—C(CH₃)(COO(CH₂)₃SO₃H)— | 85/11 |
| 109 | A-109 | —CH₂—(2-naphthyl) | — | 96/0 |
| 110 | A-110 | —(CH₂)₂—(1-naphthyl) | —CH₂—C(CH₃)(COO(CH₂)₂OCO(CH₂)₂COOH)— | 92/4 |
| 111 | A-111 | 2-(COC₆H₅)-phenyl | —CH₂—C(CH₃)(COO(CH₂)₂O—P(=O)(OH)₂)— | 94.5/1.5 |
| 112 | A-112 | 2-cyanophenyl | —CH₂—C(CH₃)(COOC₂H₅)— | 76/20 |
| 113 | A-113 | —(CH₂)₂—OC₆H₅ | — | 96/0 |

SYNTHESIS EXAMPLES 114 TO 124 OF RESIN (A): Resins (A-114) to (A-124)

Resins (A-114) to (A-124) were synthesized under the same reaction conditions as described in Synthesis Example 101 of Resin (A), except for using the methacrylates and mercapto compounds described in Table 4 below in place of 96 g of benzyl methacrylate and 4 g of thiosalicylic acid and replacing 200 g of toluene with 150 g of toluene and 50 g of isopropanol, respectively.

TABLE 4

$$W-S+CH_2-\underset{\underset{COOR_{18}}{|}}{\overset{\overset{CH_3}{|}}{C}}\!\!+\!\!$$

| Synthesis Example of Resin (A) | Resin (A) | W— | Amount | —R$_{18}$ | Amount | Weight Average Molecular Weight |
|---|---|---|---|---|---|---|
| 114 | A-114 | HOOCCH$_2$CH$_2$CH$_2$— | 4 g | —C$_2$H$_5$ | 96 g | 7.3 × 10$^3$ |
| 115 | A-115 | HOOCCH$_2$— | 5 g | —C$_3$H$_7$ | 95 g | 5.8 × 10$^3$ |
| 116 | A-116 | HOOC—CH—<br>         |<br>HOOC—CH$_2$ | 5 g | —CH$_2$C$_6$H$_5$ | 95 g | 7.5 × 10$^3$ |
| 117 | A-117 | HOOCCH$_2$CH$_2$— | 5.5 g | —C$_6$H$_5$ | 94.5 g | 6.5 × 10$^3$ |
| 118 | A-118 | HOOCCH$_2$— | 4 g | —C$_6$H$_4$Br (o-Br phenyl) | 96 g | 5.3 × 10$^3$ |
| 119 | A-119 | (HO)$_2$P(O)—OCH$_2$CH$_2$— | 3 g | —C$_6$H$_3$Cl$_2$ (2,4-dichlorophenyl) | 97 g | 6.6 × 10$^3$ |
| 120 | A-120 | HO$_3$SCH$_2$CH$_2$— | 3 g | —C$_6$H$_4$CH$_3$ (m-tolyl) | 97 g | 8.8 × 10$^3$ |
| 121 | A-121 | H$_5$C$_2$O—P(O)(OH)—OCH$_2$CH$_2$— | 4 g | —C$_6$H$_3$(Cl)(CH$_3$) | 96 g | 7.5 × 10$^3$ |
| 122 | A-122 | phthalic anhydride—COOCH$_2$CH$_2$— | 7 g | —C$_6$H$_4$COCH$_3$ | 93 g | 5.5 × 10$^3$ |
| 123 | A-123 | H$_5$C$_2$—P(O)(OH)—OCH$_2$CH$_2$— | 6 g | —C$_6$H$_4$COOCH$_3$ | 94 g | 4.5 × 10$^3$ |

TABLE 4-continued

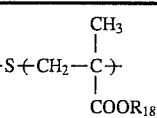

| Synthesis Example of Resin (A) | Resin (A) | W— | Amount | —R$_{18}$ | Amount | Weight Average Molecular Weight |
|---|---|---|---|---|---|---|
| 124 | A-124 | 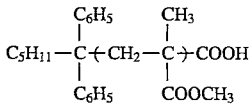 | 4 g | 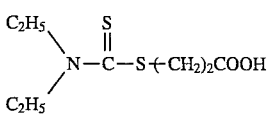 | 96 g | $5.6 \times 10^3$ |

SYNTHESIS EXAMPLE 125 OF RESIN (A): Resin (A-125)

A mixed solution of 100 g of 1-naphthyl methacrylate, 150 g of toluene and 50 g of isopropanol was heated to a temperature of 80° C. under nitrogen gas stream, and 5.0 g of 4,4'-azobis(4-cyanovaleric acid) (abbreviated as ACV) was added thereto, followed by reacting with stirring for 5 hours. Then, 1 g of ACV was added thereto, followed by reacting with stirring for 2 hours, and thereafter 1 g of ACV was added thereto, followed by reacting with stirring for 3 hours. The resulting polymer had a weight average molecular weight of $7.5 \times 10^3$.

Resin (A-125)

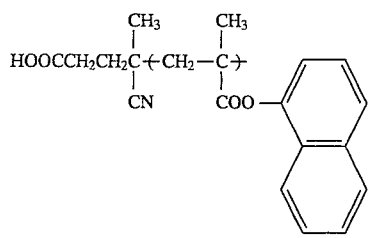

SYNTHESIS EXAMPLE 126 OF RESIN (A): Resin (A-126)

A mixed solution of 50 g of methyl methacrylate and 150 g of methylene chloride was cooled to -20° C. under nitrogen gas stream, and 1.0 g of a 10% hexane solution of 1,1-diphenylhexyl lithium prepared just before was added thereto, followed by stirring for 5 hours. Carbon dioxide was passed through the mixture at a flow rate of 10 ml/cc for 10 minutes with stirring, the cooling was discontinued, and the reaction mixture was allowed to stand to room temperature with stirring. Then, the reaction mixture was added to a solution of 50 ml of 1N hydrochloric acid in 1 liter of methanol to precipitate, and the white powder was collected by filtration. The powder was washed with water until the washings became neutral, and dried under reduced pressure to obtain 18 g of the polymer having a weight average molecular weight of $6.5 \times 10^3$.

Resin (A-126)

$$C_5H_{11}-\underset{\underset{C_6H_5}{|}}{\overset{\overset{C_6H_5}{|}}{C}}(CH_2-\underset{\underset{COOCH_3}{|}}{\overset{\overset{CH_3}{|}}{C}})COOH$$

SYNTHESIS EXAMPLE 127 OF RESIN (A): Resin (A-127)

A mixed solution of 97 g of benzyl methacrylate, 3 g of acrylic acid, 9.7 g of Initiator (I-1) shown below and 100 g of tetrahydrofuran was heated to a temperature of 50° C. under nitrogen gas stream.

Initiator (I-1)

$$\underset{C_2H_5}{\overset{C_2H_5}{\diagdown}}N-\overset{\overset{S}{\|}}{C}-S(CH_2)_2COOH$$

The solution was irradiated with light from a high-pressure mercury lamp of 400 W at a distance of 10 cm through a glass filter for 12 hours to conduct a photopolymerization reaction. The reaction mixture obtained was reprecipitated in one liter of n-hexane, and the precipitates formed were collected and dried to obtain 75 g of the polymer having a weight average molecular weight of $8 \times 10^3$.

Resin (A-127)

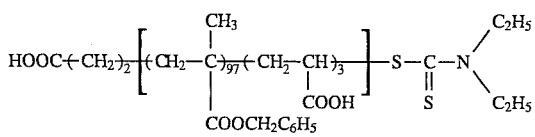

SYNTHESIS EXAMPLES 128 TO 133 OF RESIN (A): Resins (A-128) to (A-133)

Each of resins (A) shown in Table 5 below was synthesized in the same procedure as described in Synthesis Example 127 of Resin (A) except for using 97 g of a monomer corresponding to the polymer component shown in Table 5 below and 0.044 moles of the initiator (I) shown in Table 5 below in place of 97 g of benzyl methacrylate and 9.7 g of Initiator (I-1), respectively. The weight average molecular weight of each of the polymers was in a range of from $7\times10^3$ to $9\times10^3$.

TABLE 5

$$R^{30}-\left[-(CH_2-\underset{COOR^{31}}{\underset{|}{C}})_{\overline{97}}(CH_2CH)_{\overline{3}}\right]-X$$
$$\phantom{R^{30}-\left[-(CH_2-\right.}\overset{CH_3}{\underset{COOR^{31}}{|}}\phantom{)}\underset{COOH}{|}$$

| Synthesis Example of Resin (A) | Resin (A) | Initiator (I) |
|---|---|---|
| 128 | A-128 | $\underset{CH_3}{\overset{CH_3}{\diagdown}}N-\underset{\overset{\|}{S}}{\overset{\|}{C}}-S-CH_2-\bigcirc-COOH$ |
| 129 | A-129 | $\underset{CH_3}{\overset{CH_3}{\diagdown}}CHCH_2O-\underset{\overset{\|}{S}}{C}-S\text{-}(CH_2)_4COOH$ |
| 130 | A-130 | $\underset{CH_3}{\overset{CH_3}{\diagdown}}CH-O-\overset{\overset{S}{\|}}{C}-S-CH_2-\bigcirc-COOH$ |
| 131 | A-131 | $\underset{C_2H_5}{\overset{C_2H_5}{\diagdown}}N-\overset{\overset{S}{\|}}{C}-S\text{-}(CH_2)_4O-\overset{\overset{O}{\|}}{\underset{OH}{P}}-OH$ |
| 132 | A-132 | $\underset{C_4H_9}{\overset{C_4H_9}{\diagdown}}N-\overset{\overset{S}{\|}}{C}-S\text{-}(CH_2)_4SO_3H$ |
| 133 | A-133 | $\underset{CH_3}{\overset{CH_3}{\diagdown}}CHO-\overset{\overset{S}{\|}}{C}-S(CH_2)_2OOC-\bigcirc\underset{\diagdown_O}{\overset{\diagup^O}{\underset{\|}{\overset{\|}{\underset{O}{}}}}}$ |

| Synthesis Example of Resin (A) | $R^{30}-$ | $R^{31}-$ | $-X$ |
|---|---|---|---|
| 128 | $HOOC-\bigcirc-CH_2-$ | $\underset{}{\overset{Cl}{\bigcirc}}-$ | $-S-\overset{\overset{S}{\|}}{C}-N\overset{CH_3}{\underset{CH_3}{\diagdown}}$ |
| 129 | $HOOC(CH_2)_{\overline{4}}$ | $-CH_2C_6H_5$ | $-S-\overset{\overset{S}{\|}}{C}-OCH_2CH\overset{CH_3}{\underset{CH_3}{\diagdown}}$ |
| 130 | $HOOC-\bigcirc-CH_2-$ | $\underset{}{\overset{CH_3}{\bigcirc}}-$ | $-S-\overset{\overset{S}{\|}}{C}-O-CH\overset{CH_3}{\underset{CH_3}{\diagdown}}$ |
| 131 | $HO-\overset{\overset{O}{\|}}{\underset{OH}{P}}(CH_2)_{\overline{4}}$ | $-C_6H_5$ | $-S-\overset{\overset{S}{\|}}{C}-N\overset{C_2H_5}{\underset{C_2H_5}{\diagdown}}$ |

TABLE 5-continued

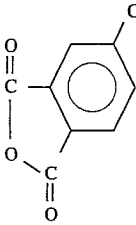

SYNTHESIS EXAMPLE 201 OF RESIN (A): Resin (A-201)

A mixed solution of 95 g of ethyl methacrylate, and 200 g of tetrahydrofuran was sufficiently degassed under nitrogen gas stream and cooled to −20° C. Then, 1.5 g of 1,1-diphenylbutyl lithium was added to the mixture, and the reaction was conducted for 12 hours. Furthermore, a mixed solution of 5 g of triphenylmethyl methacrylate and 5 g of tetrahydrofuran was sufficiently degassed under nitrogen gas stream, and, after adding the mixed solution to the above described mixture, the reaction was further conducted for 8 hours. The mixture was adjusted to 0° C. and after adding thereto 10 ml of methanol, the reaction was conducted for 30 minutes and the polymerization was terminated. The temperature of the polymer solution obtained was adjusted at a temperature of 30° C. under stirring and, after adding thereto 3 ml of an ethanol solution of 30% hydrogen chloride, the resulting mixture was stirred for one hour. Then, the solvent of the reaction mixture was distilled off under reduced pressure until the whole volume was reduced to a half, and then the mixture was reprecipitated from one liter of petroleum ether. The precipitates formed were collected and dried under reduced pressure to obtain 70 g of the polymer having a weight average molecular weight (Mw) of $8.5 \times 10^3$.

Resin (A-201):

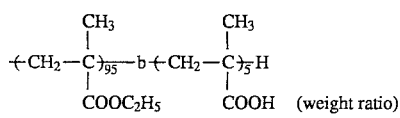

b: A bond connecting blocks (hereinafter the same)

SYNTHESIS EXAMPLE 202 OF RESIN (A): Resin (A-202)

A mixed solution of 46 g of n-butyl methacrylate, 0.5 g of (tetraphenyl prophynato) aluminum methyl, and 60 g of methylene chloride was raised to a temperature of 30° C. under nitrogen gas stream. The mixture was irradiated with light from a xenon lamp of 300 W at a distance of 25 cm through a glass filter, and the reaction was conducted for 12 hours. To the mixture was further added 4 g of benzyl methacrylate, after light-irradiating in the same manner as above for 8 hours, 3 g of methanol was added to the reaction mixture followed by stirring for 30 minutes, and the reaction was terminated. Then, Pd-C was added to the reaction mixture, and a catalytic reduction reaction was conducted for one hour at a temperature of 25° C. After removing insoluble substances from the reaction mixture by filtration, the reaction mixture was reprecipitated from 500 ml of petroleum ether and the precipitates formed were collected and dried to obtain 33 g of the polymer having an Mw of $9.3 \times 10^3$.

Resin (A-202)

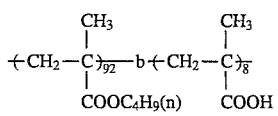

SYNTHESIS EXAMPLE 203 OF RESIN (A): Resin (A-203)

A mixed solution of 90 g of 2-chloro-6-methylphenyl methacrylate and 200 g of toluene was sufficiently degassed under nitrogen gas stream and cooled to 0° C. Then, 2.5 g of 1,1-diphenyl-3-methylpentyl lithium was added to the mixture followed by stirring for 6 hours. Further, 25.4 g of 4-vinylbenzenecarboxylic acid triisopropylsilyl ester was added to the mixture and, after stirring the mixture for 6 hours, 3 g of methanol was added to the mixture followed by stirring for 30 minutes. Then, to the reaction mixture was added 10 g of an ethanol solution of 30% hydrogen chloride and, after stirring the mixture at 25° C. for one hour, the mixture was reprecipitated from one liter of petroleum ether. The precipitates thus formed were collected, washed twice with 300 ml of diethyl ether and dried to obtain 58 g of the polymer having an Mw of $7.8 \times 10^3$.

Resin (A-203)

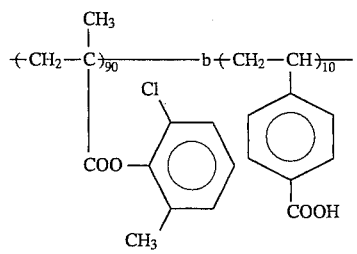

SYNTHESIS EXAMPLE 204 OF RESIN (A): Resin (A-204)

A mixture of 95 g of phenyl methacrylate and 4.8 g of benzyl N,N-diethyldithiocarbamate was placed in a vessel under nitrogen gas stream followed by closing the vessel and heated to a temperature of 60° C. The mixture was irradiated with light from a high-pressure mercury lamp of 400 W at a distance of 10 cm through a glass filter for 10 hours to conduct phqtopolymerization. Then, 5 g of acrylic acid and 180 g of methyl ethyl ketone were added to the mixture and, after replacing the gas in the vessel with nitrogen, the mixture was light-irradiated again for 10 hours. The reaction mixture was reprecipitated from 1.5 liters of hexane and the precipitates formed were collected and dried to obtain 68 g of the polymer having an Mw of $9.5 \times 10^3$.

Resin (A-204)

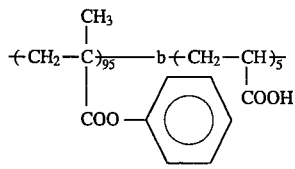

SYNTHESIS EXAMPLES 205 TO 218 OF RESIN (A): Resins (A-205) to (A-218)

Each of resins (A). shown in Table 6 below was synthesized in the same manner as described in Synthesis Example 201 of Resin (A) above, The Mw of each of the resins was in a range of from $6 \times 10^3$ to $9.5 \times 10^3$.

TABLE 6

$$+CH_2-\underset{\underset{COOR_0}{|}}{\overset{\overset{CH_3}{|}}{C}}\!\!\!\!)_{\overline{x}}\,b\,(Y_1)_{\overline{y}}$$

| Synthesis Example of Resin (A) | Resin (A) | $-R_0$ | $-Y-$ | x/y |
|---|---|---|---|---|
| 205 | A-205 | (phenyl with Cl) | $-CH_2-CH-$<br>$\quad\quad\quad\mid$<br>$\quad\quad\quad COOH$ | 96/4 |
| 206 | A-206 | (phenyl with two $CH_3$) | $\quad\quad CH_3$<br>$\quad\quad\mid$<br>$-CH_2-C-$<br>$\quad\quad\mid$<br>$\quad\quad COOH$ | 96/4 |
| 207 | A-207 | (phenyl with two Cl) | $\quad\quad CH_3$<br>$\quad\quad\mid$<br>$-CH_2-C-$<br>$\quad\quad\mid$<br>$\quad\quad COOH$ | 95/5 |
| 208 | A-208 | (phenyl with Br) | $-CH_2-CH-$<br>$\quad\quad\quad\mid$<br>$\quad\quad\quad COO(CH_2)_2COOH$ | 92/8 |
| 209 | A-209 | (naphthyl) | $-CH-CH-$<br>$\;\mid\quad\;\;\mid$<br>$CH_3\;COOH$ | 95/5 |

TABLE 6-continued $$+CH_2-\underset{\underset{COOR_0}{|}}{\overset{\overset{CH_3}{|}}{C}}\!\!\rightarrow_{\!\!x}\!b\!\!\leftarrow\!\!Y_1\!\!\rightarrow_{\!\!y}$$

| Synthesis Example of Resin (A) | Resin (A) | $-R_0$ | $-Y-$ | x/y |
|---|---|---|---|---|
| 210 | A-210 | 2-methyl-5-acetylphenyl | $-CH_2-\underset{\underset{COO(CH_2)_2-O-\overset{\overset{O}{\|}}{\underset{\underset{OH}{\|}}{P}}-OH}{\|}}{\overset{\overset{CH_3}{\|}}{C}}-$ | 97/3 |
| 211 | A-211 | 2-chloro-5-methylphenyl | $-CH_2-\underset{\underset{COO(CH_2)_2O-\overset{\overset{O}{\|}}{\underset{\underset{OC_2H_5}{\|}}{P}}-OH}{\|}}{CH}-$ | 90/10 |
| 212 | A-212 | $-CH_2-$(2-methylphenyl) | $-CH_2-\underset{\underset{COO(CH_2)_3SO_3H}{\|}}{\overset{\overset{CH_3}{\|}}{C}}-$ | 98/2 |
| 213 | A-213 | $-CH_2-$naphthyl | $-CH_2-\underset{\underset{CONH-C_6H_4-COOH}{\|}}{\overset{\overset{CH_3}{\|}}{C}}-$ | 95/5 |
| 214 | A-214 | 2-methyl-6-chlorophenyl | $-CH_2-CH-$ with 4-COOH-phenyl | 94/6 |
| 215 | A-215 | 2-methoxycarbonylphenyl | $-CH_2-CH-\underset{\|}{COOH}$ | 94/6 |
| 216 | A-216 | 2-bromo-5-methylphenyl | $-CH_2-\underset{\underset{COOH}{\|}}{\overset{\overset{CH_3}{\|}}{C}}-$ | 95/5 |
| 217 | A-217 | $-C_3H_7$ | $-CH_2-\underset{\underset{COO(CH_2)_2COOH}{\|}}{\overset{\overset{CH_3}{\|}}{C}}-$ | 95/5 |
| 218 | A-218 | $-CH_2C_6H_5$ | $-CH_2-CH-\underset{\|}{COOH}$ | 96/4 |

SYNTHESIS EXAMPLES 219 TO 223 OF RESIN (A): Resins (A-219) to (A-223)

Each of the resins (A) shown in Table 7 below was synthesized in the same manner as described in synthesis Example 204 of Resin (A) above. The Mw of each of the resins was in a range of from $8\times10^3$ to $1\times10^4$.

Then, the solvent of the reaction mixture was distilled off under reduced pressure until the whole volume was reduced to a half, and then the mixture was reprecipitated from one liter of petroleum ether.

TABLE 7

$$\left(\left(CH_2-\underset{\underset{COOR_0}{|}}{\overset{\overset{CH_3}{|}}{C}}\right)_{\overline{x}}(X)_y\right)-b(Y)_{\overline{z}}$$

| Synthesis Example of Resin (A) | Resin (A) | $-R_0$ | $-X-$ | $-Y-$ | x/y/z (weight ratio) |
|---|---|---|---|---|---|
| 219 | A-219 | $-CH_3$ | $-CH_2-CH-$<br>$\quad\quad\quad\|$<br>$\quad\quad\quad COOC_2H_5$ | $-CH_2-CH-$<br>$\quad\quad\quad\|$<br>$\quad\quad\quad COOH$ | 65/30/5 |
| 220 | A-220 | $-C_2H_5$ | $-CH_2-CH-$<br>$\quad\quad\quad\|$<br>$\quad\quad\quad COOCH_3$ | $\quad\quad CH_3$<br>$\quad\quad\quad\|$<br>$-CH_2-C-$<br>$\quad\quad\quad\|\quad\quad O$<br>$\quad\quad\quad COO(CH_2)_2-O-P-OH$<br>$\quad\quad\quad\quad\quad\quad\quad\quad\quad\|$<br>$\quad\quad\quad\quad\quad\quad\quad\quad\quad OH$ | 75/25/3 |
| 221 | A-221 | 3-chlorophenyl | $-CH_2-CH-$<br>$\quad\quad\quad\|$<br>$\quad\quad\quad COOCH_2C_6H_5$ | $\quad\quad CH_3$<br>$\quad\quad\quad\|$<br>$-CH_2-C-$<br>$\quad\quad\quad\|$<br>$\quad\quad\quad COOH$ | 81/15/4 |
| 222 | A-222 | 2-naphthyl | $-CH_2-CH-$<br>$\quad\quad\quad\|$<br>$\quad\quad\quad COOCH_2C_6H_5$ | $\quad\quad CH_3$<br>$\quad\quad\quad\|$<br>$-CH-CH-$<br>$\quad\quad\quad\|$<br>$\quad\quad\quad COOH$ | 75/20/5 |
| 223 | A-223 | 2,4-dichlorophenyl | $-CH_2-CH-$<br>$\quad\quad\quad\|$<br>$\quad\quad\quad COOCH_3$ | $-CH_2-CH-$<br>$\quad\quad\quad\|$<br>$\quad\quad\quad COO(CH_2)_2COOH$ | 75/20/5 |

Synthesis examples of the resin (B) are specifically illustrated below.

SYNTHESIS EXAMPLE 1 OF RESIN (B): Resin (B-1)

A mixed solution of 100 g of methyl methacrylate and 200 g of tetrahydrofuran was sufficiently degassed under nitrogen gas stream and cooled to $-20°$ C. Then, 0.8 g of 1,1-diphenylbutyl lithium was added to the mixture, and the reaction was conducted for 12 hours. Furthermore, a mixed solution of 60 g of methyl acrylate, 6 g of triphenylmethyl methacrylate and 5 g of tetrahydrofuran was sufficiently degassed under nitrogen gas stream, and, after adding the mixed solution to the above described mixture, the reaction was further conducted for 8 hours. The mixture was adjusted to $0°$ C. and after adding thereto 10 ml of methanol, the reaction was conducted for 30 minutes and the polymerization was terminated. The temperature of the polymer solution obtained was adjusted at $30°$ C. under stirring and, after adding thereto 3 ml of an ethanol solution of 30% hydrogen chloride, the resulting mixture was stirred for one hour.

The precipitates formed were collected and dried under reduced pressure to obtain 72 g of the polymer having an Mw of $7.3\times10^4$.

Resin (B-1)

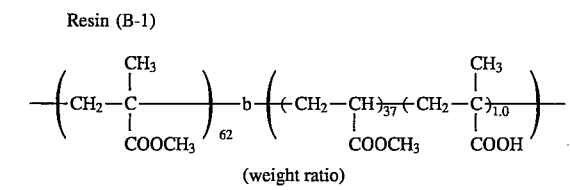

(weight ratio)

b: A bond connecting blocks (hereinafter the same)

SYNTHESIS EXAMPLE 2 OF RESIN (B): Resin (B-2)

A mixed solution of 70 g of methyl methacrylate, 30 g of methyl acrylate, 0.5 g of (tetraphenyl prophynato) aluminum methyl, and 60 g of methylene chloride was raised to a temperature of $30°$ C. under nitrogen gas stream. The mixture was irradiated with light from a xenon lamp of 300 W at a distance of 25 cm through a glass filter, and the reaction was conducted for 12 hours. To the mixture were further added 60 g of methyl acrylate and 3.2 g of benzyl methacrylate, and, after light-irradiating in the same manner as above for 8 hours, 3 g of methanol was added to the reaction mixture followed by stirring for 30 minutes, and the reaction was terminated. Then, Pd-C was added to the reaction mixture, and a catalytic reduction reaction was conducted for one hour at 25° C.

After removing insoluble substances from the reaction mixture by filtration, the reaction mixture was reprecipitated from 500 ml of petroleum ether and the precipitates formed were collected and dried to obtain 118 g of the resin having an Mw of $8 \times 10^4$.

SYNTHESIS EXAMPLE 4 OF RESIN (B): Resin (B-4)

A mixture of 67 g of methyl methacrylate and 4.8 g of benzyl N,N-diethyldithiocarbamate was placed in a vessel under nitrogen gas stream followed by closing the vessel and heated to a temperature of 50° C. The mixture was irradiated with .light from a high-pressure mercury lamp of 400 W at a distance of 10 cm through a glass filter for 6 hours to conduct photopolymerization.

Then, 32 g of methyl acrylate, 1 g of acrylic acid and 180 g of methyl ethyl ketone were added to the mixture and, after replacing the gas in the vessel with nitrogen, the mixture was light-irradiated again for 10 hours. The reaction mixture was Resin (B-2)

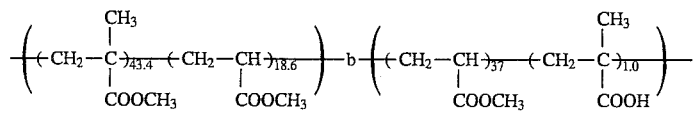

SYNTHESIS EXAMPLE 3 OF RESIN (B): Resin (B-3)

A mixed solution of 100 g of ethyl methacrylate and 200 g of toluene was sufficiently degassed under nitrogen gas stream and cooled to 0° C. Then, 2.5 g of 1,1-diphenyl-3-methylpentyl lithium was added to the mixture followed by stirring for 6 hours. Further, 60 g of methyl methacrylate and 11.7 g of 4-vinylbenzenecarboxylic acid triisopropylsilyl ester were added to the mixture and, after stirring the mixture for 6 hours, 3 g of methanol was added to the mixture followed by stirring for 30 minutes.

Then, to the reaction mixture was added 10 g of an ethanol solution of 30% hydrogen chloride and, after stirring the mixture at 25° C. for one hour, the mixture was reprecipitated from one liter of methanol. The precipitates thus formed were collected, washed twice with 300 ml of methanol and dried to obtain 121 g of the polymer having an Mw of $6.5 \times 10^4$.

Resin (B-3)

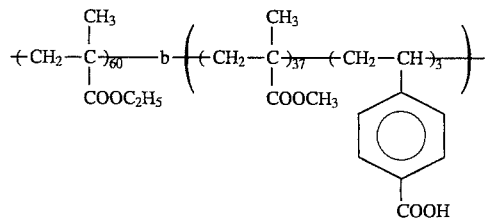

reprecipitated from one liter of methanol and the precipitates formed were collected and dried to obtain 73 g of the polymer having an Mw of $4.8 \times 10^4$.

Resin (B-4)

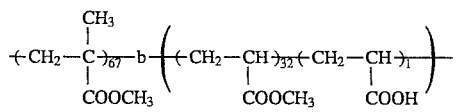

SYNTHESIS EXAMPLE 5 OF RESIN (B): Resin (B-5).

A mixture of 50 g of methyl methacrylate, 25 g of ethyl methacrylate and 1.0 g of benzyl isopropyl- xanthate was placed in a vessel under nitrogen gas stream followed by closing the vessel and heated to a temperature of 50° C. The mixture was irradiated with light from a high-pressure mercury lamp of 400 W at a distance of 10 cm through a glass filter for 6 hours to conduct photopolymerization. The polymerization product was dissolved in tetrahydrofuran to make a 40% solution, then 22 g of methyl acrylate was added thereto and, after replacing the gas in the vessel with nitrogen, the mixture was light-irradiated again for 10 hours.

Then, 3 g of 2-(2'-carboxyethyl)carboxyloxyethyl methacrylate was added to the mixture and, after replacing the gas in the vessel with nitrogen, the mixture was light-irradiated again for 8 hours. The reaction mixture was reprecipitated from 2 liters of methanol and the powder collected was dried to obtain 63 g of the polymer having an Mw of $6 \times 10^4$.

Resin (B-5)

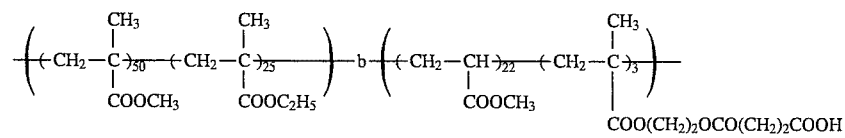

65

SYNTHESIS EXAMPLE 6 OF RESIN (B): Resin (B-6)

A mixed solution of 97 g of ethyl acrylate, 3 g of methacrylic acid, 2 g of 2-mercaptoethanol and 200 g of tetrahydrofuran was heated to 60° C. under nitrogen gas stream with stirring, and 1.0 g of 2,2'-azobisisovaleronitrile (abbreviated as AIVN) was added thereto to effect a reaction for 4 hours. To the reaction mixture was further added 0.5 g of AIVN, followed by reacting for 4 hours. The temperature of the reaction mixture was adjusted at 20° C., then a mixed solution of 8.6 g of 4,4'-azobis(4-cyanovaleric acid), 12 g of dicyclohexylcarbodiimide, 0.2 g of 4-(N,N-dimethylamino)pyridine and 30 g of tetrahydrofuran was added dropwise thereto over a period of one hour. After further stirring for 2 hours, 5 g of a 85% aqueous formic acid solution was added thereto, followed by stirring for 30 minutes. The crystals thus-deposited were removed by filtration, the liltrate was distilled under reduced pressure at a temperature of 25° C. to remove the solvent. The polymer thus-obtained (polymer initiator) shown below had an Mw of $6.3 \times 10^3$.

Polymer Initiator

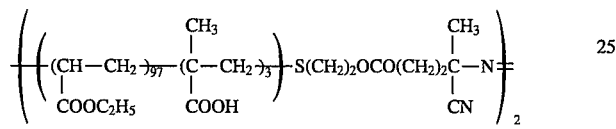

A mixed solution of 70 g of methyl methacrylate and 170 g of toluene was heated to 70° C. under nitrogen gas stream with stirring. A solution prepared by dissolving 30 g of the above described polymer initiator in 30 g of toluene and replacing the gas in the vessel with nitrogen was added to the above mixed solution, followed by reacting for 8 hours. The polymer formed was reprecipitated from 2 liters of methanol and the powder collected was dried to obtain 72 g of the polymer having an Mw of $4 \times 10^4$.

Resin (B-6)

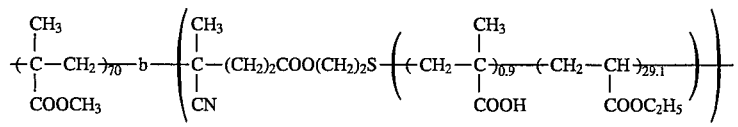

SYNTHESIS EXAMPLES 7 TO 16 OF RESIN (B): Resins (B-7) to (B-16)

Each of the resins (B) shown in Table 8 below was synthesized in the same reaction procedure as described in Synthesis Example 3 of Resin (B). The Mw of each of the resins obtained was in a range of from $5 \times 10^4$ to $9 \times 10^4$.

TABLE 8

$$\left(\left(CH_2-\underset{\underset{COOR^{32}}{|}}{\overset{\overset{CH_3}{|}}{C}}\right)_p(X_1)_q\right)_b\left(\left(CH_2-\underset{\underset{COOR^{33}}{|}}{CH}\right)_r(Y_2)_y(Z_3)_z\right)$$

| Synthesis Examples of Resin (B) | Resin (B) | $R^{32}$ | $-X_1-$ | $R^{33}$ | $-Y_2-$ | $-Z_3-$ | p/q/r/y/z (weight ratio) |
|---|---|---|---|---|---|---|---|
| 7 | B-7 | $-CH_3$ | — | $-CH_3$ | — | $-CH_2-CH-$<br>$\quad\quad\quad\mid$<br>$\quad\quad\quad COO(CH_2)_2COOH$ | 65/0/32/0/3 |
| 8 | B-8 | $-CH_3$ | — | $-C_2H_5$ | — | $-CH_2-C\overset{CH_2}{\underset{O=C-O}{\big|}}\overset{}{\underset{}{C=O}}$ | 72/0/25/0/3 |
| 9 | B-9 | $-CH_3$ | $-CH_2-CH-$<br>$\quad\quad\quad\mid$<br>$\quad\quad\quad COOCH_3$ | $-CH_3$ | $-CH_2CH-$<br>$\quad\quad\mid$<br>$\quad\quad N\!\!-\!\!C=O$ (pyrrolidone) | $-CH_2-\underset{\underset{COOH}{|}}{\overset{\overset{CH_3}{|}}{C}}-$ | 66/10/20/3/1 |
| 10 | B-10 | $-C_2H_5$ | $-CH_2-CH-$<br>$\quad\quad\quad\mid$<br>$\quad\quad\quad COOCH_2C_6H_5$ | $-CH_3$ | — | $-CH_2-CH-$<br>$\quad\quad\quad\mid$<br>$\quad\quad\quad COO(CH_2)_3SO_3H$ | 74.2/10/15/0/0.8 |
| 11 | B-11 | $-C_3H_7$ | $-CH_2-CH-$ (phenyl) | $-CH_3$ | $-CH_2CH-$<br>$\quad\quad\mid$<br>$\quad\quad COOCH_2CH_2OCH_3$ | $-CH_2-\underset{\underset{CH_2COOH}{|}}{\overset{\overset{COOH}{|}}{C}}-$ | 61/10/20/8/1.0 |
| 12 | B-12 | $-CH_3$ | $-CH_2-CH-$<br>$\quad\quad\quad\mid$<br>$\quad\quad\quad COOC_2H_5$ | $-CH_3$ | $-CH_2CH-$<br>$\quad\quad\mid$<br>$\quad\quad COCH_3$ | $-CH_2C-\underset{\underset{COO(CH_2)_2O-P-OH}{|}}{\overset{\overset{CH_3}{|}}{}}\overset{O}{\underset{OH}{\parallel}}$ | 59/10/20/10/1.0 |

TABLE 8-continued $$\left(\left(CH_2-\underset{\underset{COOR^{32}}{|}}{\overset{\overset{CH_3}{|}}{C}}\right)_p\left(X_1\right)_q\right)_b\left(\left(CH_2-CH\right)_r\left(Y_2\right)_y\left(Z_3\right)_z\right)$$
$$\hspace{3.5cm} COOR^{33}$$

| Synthesis Examples of Resin (B) | Resin (B) | $R^{32}$ | $-X_1-$ | $R^{33}$ | $-Y_2-$ | $-Z_3-$ | p/q/r/y/z (weight ratio) |
|---|---|---|---|---|---|---|---|
| 13 | B-13 | $-CH_3$ | — | $-C_2H_5$ | — | 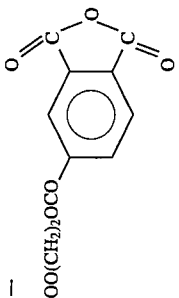 $\begin{array}{c}CH_3\\ |\\ -CH_2C-\\ |\\ COO(CH_2)_2OCO\end{array}$ | 81/0/15/0/4 |
| 14 | B-14 | $-C_6H_5$ | $\begin{array}{c}CH_3\\ |\\ -CH_2C-\\ |\\ COOC_2H_5\end{array}$ | $-CH_3$ | $\begin{array}{c}-CH_2CH-\\ |\\ CN\end{array}$ | $\begin{array}{c}-CH_2CH-\\ |\\ CONH(CH_2)_4COOH\end{array}$ | 30/20/45/3/2 |
| 15 | B-15 | $-CH_2C_6H_5$ | — | $-CH_3$ | $\begin{array}{c}-CH_2CH-\\ |\\ OCOCH_3\end{array}$ | $\begin{array}{c}-CH_2CH-\\ |\\ COO(CH_2)_2OCO(CH_2)_2-OCOH\end{array}$ | 75/0/15/6.5/3.5 |
| 16 | B-16 | $-CH_3$ | — | $-C_2H_5$ |  $\begin{array}{c}-CH_2CH-\\ |\\ N\end{array}$ |  $-CH_2CH-\text{—}\bigcirc\text{—}COOH$ | 80/0/14/4/2 |

SYNTHESIS EXAMPLES 17 TO 23 OF RESIN (B): Resins (B-17) to (B-23)

Each of the resins (B) shown in Table 9 below was synthesized in the same reaction procedure as described in Synthesis Example 4 of Resin (B). The Mw of each of the resins obtained was in a range of from $4\times10^4$ to $8\times10^4$.

TABLE 9

$$\left(\!\!\left(CH_2\!-\!\underset{\underset{COOCH_3}{|}}{\overset{\overset{CH_3}{|}}{C}}\!\right)_{\!\!k}\!\!\left(X_2\right)_{\!l}\right)\!\!-b-\!\left(\!\!\left(CH_2\!-\!\underset{\underset{COOCH_3}{|}}{CH}\right)_{\!\!m}\!\!\left(Y_2\right)_{\!n}\!\!\left(Z_3\right)_{\!q}\right)$$

| Synthesis Example of Resin (B) | Resin (B) | $-X_2-$ | $-Y_2-$ | $-Z_3-$ | k/l/m/n/q (weight ratio) |
|---|---|---|---|---|---|
| 17 | B-17 | $-CH_2-CH-$<br>$\quad\quad\ \|$<br>$\quad\quad COOC_2H_5$ | $-CH_2-CH-$<br>$\quad\quad\ \|$<br>$\quad\quad OCH_3$ | $-CH_2-CH-$<br>$\quad\quad\ \|$<br>$\quad\quad COOH$ | 64/15/15/4.8/1.2 |
| 18 | B-18 | — | $-CH_2-CH-$<br>$\quad\quad\ \|$<br>$\quad\quad OC_2H_5$ | $\quad\quad\quad CH_3$<br>$\quad\quad\quad\ \|$<br>$-CH_2-C-$<br>$\quad\quad\quad\ \|$<br>$\quad\quad\quad COOH$ | 70/0/20/9/1.0 |
| 19 | B-19 | — | — | $\quad\quad\quad CH_3$<br>$\quad\quad\quad\ \|$<br>$-CH_2-C-\quad\quad O$<br>$\quad\quad\quad\ \|\quad\quad\ \ \|\|$<br>$\quad\quad COO(CH_2)_2OP-OH$<br>$\quad\quad\quad\quad\quad\quad\quad\ \|$<br>$\quad\quad\quad\quad\quad\quad\quad OH$ | 67/0/31.5/0/1.5 |
| 20 | B-20 | — | $-CH_2-CH-$<br>$\quad\quad\ \|$<br>$\quad\quad COO(CH_2)_2\text{-tetrahydrofuryl}$ | $-CH_2-CH-$<br>$\quad\quad\ \|$<br>$\quad\quad COOH$ | 65/0/28/6/1.0 |
| 21 | B-21 | $\quad\quad\quad CH_3$<br>$\quad\quad\quad\ \|$<br>$-CH_2-C-$<br>$\quad\quad\quad\ \|$<br>$\quad\quad COOC_2H_5$ | $\quad\quad\quad CH_3$<br>$\quad\quad\quad\ \|$<br>$-CH_2-C-$<br>$\quad\quad\quad\ \|$<br>$\quad\quad COO(CH_2)_2\text{-thienyl}$ | $-CH_2-CH-$<br>$\quad\quad\ \|$<br>$\quad\quad COO(CH_2)_2COOH$ | 53.4/10/30/5/1.6 |
| 22 | B-22 | $-CH_2-CH-$<br>$\quad\quad\ \|$<br>$\quad\quad CN$ | $-CH_2-CH-$<br>$\quad\quad\ \|$<br>$\quad\quad COOC_2H_5$ | $\quad\quad\quad CH_3$<br>$\quad\quad\quad\ \|$<br>$-CH-CH-$<br>$\quad\quad\quad\ \|$<br>$\quad\quad COOH$ | 64/5/20/10/1.0 |
| 23 | B-23 | — | $-CH_2-CH-$<br>$\quad\quad\ \|$<br>$\quad\quad N\text{-pyrrolidonyl}$ | $-CH_2-CH-\quad\quad\quad\ O$<br>$\quad\quad\ \|\quad\quad\quad\quad\quad\quad\ \|\|$<br>$\quad\ CONH-\text{(phenyl)}-P-OH$<br>$\quad\quad\quad\quad\quad\quad\quad\quad\quad\quad\ \|$<br>$\quad\quad\quad\quad\quad\quad\quad\quad\quad\quad OH$ | 70/0/25/3/2.0 |

SYNTHESIS EXAMPLE 101 OF RESIN (B): Resin (B-101)

A mixture of 47.5 g of methyl acrylate, 2.5 g of acrylic acid, 7.6 g of 2-carboxyethyl N,N-diethyldithiocarbamate (Initiator 1-101) and 50 g of tetrahydrofuran was placed in a Qessel under nitrogen gas stream and, after closing the vessel, heated to a temperature of 50° C. The mixture was irradiated with light from a high-pressure mercury lamp for 400 W at a distance of 10 cm through a glass filter for 8 hours to conduct photopolymerization. The reaction mixture obtained was reprecipitated from 500 ml of petroleum ether, and the precipitates formed were collected and dried to obtain 41 g of the polymer having an Mw of $1.0\times10^4$.

A mixture of 10 g of the above described polymer (polymer initiator), 65 g of methyl methacrylate, 25 g of methyl acrylate and 100 g of tetrahydrofuran was heated to a temperature of 50° C. under nitrogen gas stream and irradiated with light under the same condition as above for 10 hours to conduct photopolymerization. The reaction mixture was reprecipitated from one liter of methanol and the precipitates thus formed were collected and dried to obtain 85 g of the block polymer having an Mw of $8.5\times10^4$.

Resin (B-101)

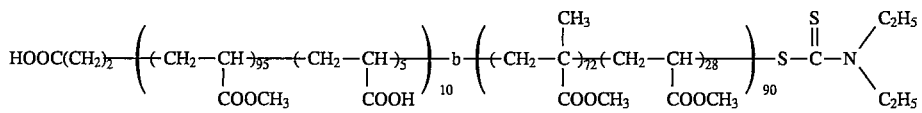

SYNTHESIS EXAMPLE 102 OF RESIN (B): Resin (B-102)

A mixed solution of 67 g of methyl methacrylate, 33 g of methyl .acrylate, 2.2 g of benzyl N-ethyl-N-(2-carboxyethyl)dithiocarbamate (Initiator 1-102) and 100 g of tetrahydrofuran was heated to a temperature of 50° C. under nitrogen gas stream and irradiated with light under the same condition as described in Synthesis Example 101 for 8 hours to conduct photopolymerization. The reaction mixture was reprecipitated from one liter of methanol and the precipitates formed were collected and dried to obtain 85 g of the polymer having an Mw of $8 \times 10^4$. A mixture of 85 g of the above described polymer, 14 g of methyl methacrylate, 1 g of methacrylic acid and 150 g of tetrahydrofuran was heated to a temperature of 50 ° C. under nitrogen gas stream and irradiated with light under the same condition as described in Synthesis Example 101 for 16 hours to conduct photopolymerization. The reaction mixture was reprecipitated from one liter of methanol and the precipitates formed were collected and dried to obtain 83 g of the block polymer having an Mw of $9.5 \times 10^4$.

was added dropwise one liter of a methanol solution containing 10 g of 30% hydrochloric acid with stirring over a period of 30 minutes, followed by stirring for one hour. The powder thus deposited was collected by filtration, washed with methanol and dried to obtain 75 g of the block polymer having an Mw of $6.5 \times 10^4$.

Resin (B-102)

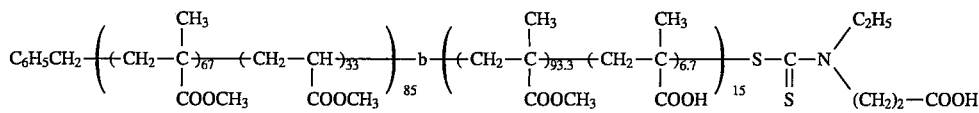

SYNTHESIS EXAMPLE 103 OF RESIN (B): Resin (B-103)

A mixed solution of 80 g of ethyl methacrylate and 200 g of toluene was sufficiently degassed under nitrogen gas stream and cooled to -20° C. Then, 2.0 g of 1,1-diphenyl-3-methylpentyl lithium was added to the mixture followed by stirring for 12 hours. To the mixture were further added 19 g of methyl methacrylate and 1.5 g of 4-vinylphenylcarbonyloxytrimethylsilane, and the mixture was subjected to reaction for 12 hours. Then, the mixture was reacted for 2 hours under carbon dioxide gas stream, followed by reacting at a temperature of 0° C. for 2 hours. To the reaction mixture Resin (B-103)

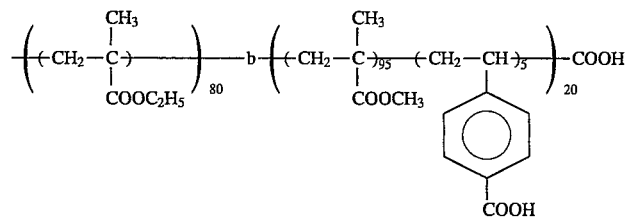

SYNTHESIS EXAMPLES 104 TO 113 OF RESIN (B): Resins (B-104) to (B-113)

Each of the resins (B) shown in Table 10 below was synthesized in the same reaction procedure as described in Synthesis Example 102 of Resin (B). The Mw of each of the resins obtained was in a range of from $7 \times 10^4$ to $9 \times 10^4$.

TABLE 10-continued $$C_6H_5CH_2 + \left( +CH_2-\underset{COOR^{41}}{\overset{CH_3}{\underset{|}{C}}} \right)_b - \left( +CH_2-CH_{\overline{)p}}(X^1)_{\overline{)q}} \right)_b - \left( \left( +CH_2-\underset{COOR_2}{\underset{|}{CH}} \right)_{\overline{)r}} (Y^1)_{\overline{)y}} (Z^1)_{\overline{)z}} \right)_z - S - \underset{\overset{||}{S}}{C} - N \underset{CH_2CH_2COOH}{\overset{C_2H_5}{\diagup}}$$

| Synthesis Examples of Resin (B) | Resin (B) | $R^{41}$ | $-X^1-$ | $R_2$ | $-Y^1-$ | $-Z^1-$ | p/q/r/y/z (weight ratio) |
|---|---|---|---|---|---|---|---|
| 110 | B-110 | $-CH_3$ | — | $-C_2H_5$ | — | $-CH_2CH-$<br>$\quad\|$<br>COO(CH$_2$)$_2$OCO—[phthalic anhydride group] | 81/0/15/0/4 |
| 111 | B-111 | $-C_6H_5$ | $-CH_2C-$<br>$\quad\|\ CH_3$<br>$\quad\ COOC_2H_5$ | $-CH_3$ | $-CH_2CH-$<br>$\quad\|$<br>CN | $-CH_2CH-$<br>$\quad\|$<br>CONH(CH$_2$)$_4$COOH | 30/20/45/3/2 |
| 112 | B-112 | $-CH_2C_6H_5$ | — | $-CH_3$ | $-CH_2CH-$<br>$\quad\|$<br>OCOCH$_3$ | $-CH_2CH-$<br>$\quad\|$<br>COO(CH$_2$)$_2$OCO(CH$_2$)$_2$—OCOH | 75/0/15/6.5/3.5 |
| 113 | B-113 | $-CH_3$ | — | $-C_2H_5$ | $-CH_2CH-$<br>$\quad\|$<br>N(imidazolyl) | $-CH_2CH-$<br>$\quad\|$<br>C$_6$H$_4$—COOH | 80/0/14/4/2 |

SYNTHESIS EXAMPLES 114 TO 120 OF RESIN (B): Resins (B-114) to (B-120)

Each of the block polymers shown in Table 11 below was synthesized in the same manner as described in Synthesis Example 101 of Resin (B) except for using $4.2\times10^{-3}$ moles of each of the initiators shown in Table below in place of 7.6 g of initiator (I-101) used in Synthesis Example 101 of Resin (B), The Mw of each of the resins was in a range of from $8\times10^4$ to $10\times10^4$,

TABLE 11

| Synthesis Example of Resin (B) | Resin (B) | Initiator | |
|---|---|---|---|
| 114 | B-114 | I-103 | HOOC—C₆H₄—CH₂S—C(=S)—N(CH₃)₂ |
| 115 | B-115 | I-104 | H₂O₃P—C₆H₄—CH₂S—C(=S)—N(C₂H₅)₂ |
| 116 | B-116 | I-105 | HO₃S(CH₂)₄S—C(=S)—N(C₄H₉)₂ |
| 117 | B-117 | I-106 | HOOC(CH₂)₃—S—C(=S)—O—CH(CH₃)₂ |
| 118 | B-118 | I-107 | (maleic anhydride)—C₆H₄—COO(CH₂)₂S—C(=S)—N(C₃H₇)₂ |
| 119 | B-119 | I-108 | H₅C₂O—P(=O)(OH)—O—C₆H₄—CH₂S—C(=S)—N(CH₂C₆H₅)(C₂H₅) |
| 120 | B-120 | I-109 | (succinic anhydride)—S(CH₂)₂S—C(=S)—N(C₂H₅)₂ |

SYNTHESIS EXAMPLES 121 TO 230 OF RESIN (B): Resins (B-121) to (B-130)

Each of the resins (B) shown in Table 12 below was synthesized by a photopolymerization reaction in the same manner as described in Synthesis Example 102 of Resin (B). The Mw of each of the resins was in a range of from $6\times10^4$ to $8\times10^4$.

TABLE 12

$$R_1 - \left( \begin{array}{c} CH_3 \\ | \\ -(CH_2-C)_k(X^2)_l- \\ | \\ COOCH_3 \end{array} \right)_b -\left( (CH_2-CH)_m(Y^2)_n(Z^2)_o \right) - W$$
$$\phantom{R_1} \phantom{xxxxxxxxxxxxxxxxxxxxxxxxxxxxxxxxxxxx} COOCH_3$$

| Synthesis Example of Resin (B) | Resin (B) | $R_1$ | —W— | —$X^2$— | —$Y^2$— | —$Z^2$— | k/l/m/n/o (weight ratio) |
|---|---|---|---|---|---|---|---|
| 121 | B-121 | $C_4H_9$— | —S—C(=S)—N(C$_2$H$_5$)(CH$_2$)$_2$COOH | —CH$_2$—CH(COOC$_2$H$_5$)— | —CH$_2$—CH(OCH$_3$)— | —CH$_2$—CH(COOH)— | 64/15/15/4.8/1.2 |
| 122 | B-122 | $C_4H_9$— | —S—C(=S)—N(CH$_2$)$_2$COOH | — | —CH$_2$—C(CH$_3$)(*)—  *COO(CH$_2$)$_2$NHCOOCH$_3$ | —CH$_2$—C(CH$_3$)(COOH)— | 70/0/20/9/1.0 |
| 123 | B-123 | $C_6H_5CH_2$— | —S—C(=S)—O(CH$_2$)$_3$COOH | —CH$_2$—CH(COOC$_2$H$_5$)— | — | —CH$_2$—C(CH$_3$)(COO(CH$_3$)OP(=O)(OH)OH)— | 47/20/32/9/1.0 |
| 124 | B-124 | $C_6H_5CH_2$— | —S—C(=S)—O—CH$_2$—C$_6$H$_3$(—C(=O)—O—C(=O)—) (phthalic anhydride) | —CH$_2$—CH(COOC$_2$H$_5$)— | —CH$_2$—C(CH$_3$)(COOCH$_3$)— | —CH$_2$—C(CH$_3$)(*)—  *COO(CH$_2$)$_2$OCO(CH$_2$)$_2$COOH | 48.5/10/10/30/1.5 |
| 125 | B-125 | $C_6H_{13}$— | —S—C(=S)—O(CH$_2$)$_3$SO$_3$H | —CH$_2$—CH(COOC$_2$H$_5$)— | —CH$_2$—C(CH$_3$)(COOCH$_2$C$_6$H$_5$)— | —CH$_2$—CH(*)—  *CONHCH$_2$COC(CH$_3$)$_2$—SO$_3$H | 59/10.2/10/20/0.8 |

TABLE 12-continued $$R_1 - \left( \left( CH_2 - \underset{\underset{COOCH_3}{|}}{\overset{\overset{CH_3}{|}}{C}} \right)_k (X^2)_l \right)_a - b \left( \left( CH_2 - \underset{\underset{COOCH_3}{|}}{CH} \right)_m (Y^2)_n (Z^2)_o \right)_b - W$$

| Synthesis Example of Resin (B) | Resin (B) | $R_1$ | —W— | —$X^2$— | —$Y^2$— | —$Z^2$— | k/l/m/n/o (weight ratio) |
|---|---|---|---|---|---|---|---|
| 126 | B-126 | $C_6H_5CH_2-$ | $-S-\underset{\underset{S}{\|}}{C}-N\underset{(CH_2)_2COOH}{\overset{C_3H_7}{\|}}$ | — | $-CH_2-\underset{\underset{COO(CH_2)_2OCH_3}{\|}}{\overset{\overset{CH_3}{\|}}{C}}-$ | $-CH_2-\underset{\underset{COOH}{\|}}{CH}-$ | 80/0/16.3/2/5/1.2 |
| 127 | B-127 | $C_6H_{13}-$ | $-S-\underset{\underset{S}{\|}}{C}-N\underset{H}{\overset{(CH_2)_2O-\underset{\underset{OH}{\|}}{\overset{\overset{O}{\|}}{P}}-OH}{\|}}$ | — | ![tetrahydrofuran with $-CH_2-\underset{COO(CH_2)_2}{CH}-$] | $-CH_2-\underset{COOH}{CH}-$ | 80/0/16/3/1.0 |
| 128 | B-128 | $C_6H_5CH_2-$ | $-S-\underset{\underset{S}{\|}}{C}-O-C(CH_2)_4COOH$ | $-CH_2-\underset{\underset{COOC_2H_5}{\|}}{\overset{\overset{CH_3}{\|}}{C}}-$ | ![thiophene with $-CH_2-\underset{COO(CH_2)_2}{CH}-$] | $-CH_2-\underset{COO(CH_2)_2COOH}{CH}-$ | 40/45/11/2.5/1.5 |
| 129 | B-129 | $C_3H_7-$ | $-S-\underset{\underset{S}{\|}}{C}-N\underset{(CH_2)_2COOH}{\overset{C_2H_5}{\|}}$ | $-CH_2-\underset{CN}{CH}-$ | $-CH_2-\underset{COOC_2H_5}{CH}-$ | $-CH-\underset{COOH}{\overset{CH_3}{\|}}-$ | 64/5/20/10/1.0 |
| 130 | B-130 | $C_8H_{17}-$ | $-S-\underset{\underset{S}{\|}}{C}-O-(CH_2)_2CONH*-\underset{\underset{OH}{\|}}{\overset{\overset{O}{\|}}{P}}-OH$ (phenyl) | $-CH_2-\underset{COOCH_3}{CH}-$ | $-CH_2CH-N\underset{}{\overset{O}{\|}}$ (pyrrolidinone) | $-CH_2-\underset{CONH*}{CH}-$ (phenyl)-$\underset{\underset{OH}{\|}}{\overset{\overset{O}{\|}}{P}}-OH$ | 50/25/21/2.5/1.5 |

SYNTHESIS EXAMPLE 201 OF RESIN (B):
Resin (B-201)

A mixed solution of 90 g of methyl acrylate, 10 g of acrylic acid and 13.4 g of Initiator (I-201) shown below was heated to a temperature of 40° C. under nitrogen gas stream.

Initiator (I-201)

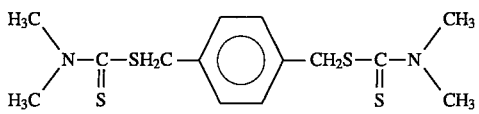

The solution was irradiated with light from a high-pressure mercury lamp of 400 W at a distance of 10 cm through a glass filter for 10 hours to conduct photopolymerization. The reaction mixture obtained was reprecipitated in one liter of methanol, and the precipitates formed were collected and dried to obtain 78 g of the polymer having a weight average molecular weight (Mw) of $2\times10^4$.

A mixed solution of 10 g of the above described polymer, 65 g of methyl methacrylate, 25 g of methyl acrylate and 100 g of tetrahydrofuran was heated to a temperature of 50° C. under nitrogen gas stream and irradiated with light under the same condition as above for 15 hours. The reaction mixture was reprecipitated from 1.5 liters of methanol and the precipitates thus formed were collected and dried to obtain 75 g of the polymer having an Mw of $8\times10^4$.

SYNTHESIS EXAMPLE 203 OF RESIN (B):
Resin (B-203)

A mixed solution of 80 g of methyl methacrylate, 20 g of ethyl acrylate, 13.5 g of Initiator (I-203) shown below and 150 g of tetrahydrofuran was heated at a temperature of 50° C. under nitrogen gas stream.

Initiator (I-203)

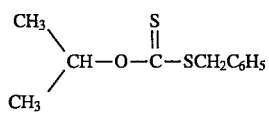

The mixture was irradiated with light under the same condition as described in Synthesis Example 201 of Resin (B) for 10 hours. The reaction mixture obtained was reprecipitated from one liter of methanol and the precipitates thus formed were collected and dried to obtain the polymer.

A mixed solution of 60 g of the above described polymer, 30 g of methyl acrylate, 10 g of methacrylic acid and 100 g of tetrahydrofuran was heated to a temperature of 50° C. under nitrogen gas stream and subjected to light irradiation in the same manner as above for 10 hours. The reaction mixture obtained was reprecipitated from one liter of methanol, and the precipitates formed were collected and dried to obtain 73 g of the polymer as a powder. A mixed solution of 60 g of the polymer thus obtained, 30 g of ethyl methacry- Resin (B-201)

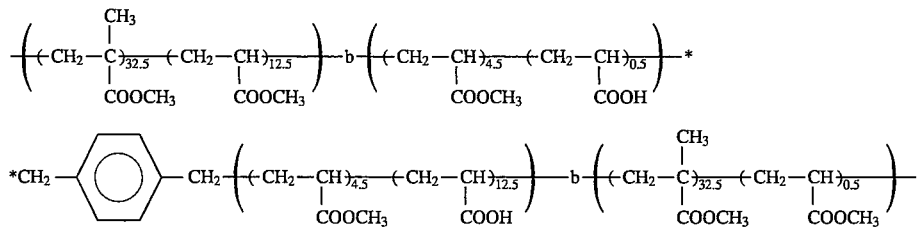

SYNTHESIS EXAMPLE 202 OF RESIN (B):
Resin (B-202)

A reaction procedure was conducted under the same condition as Synthesis Example 201 of Resin (B) except for using 14.8 g of Initiator (I-202) shown below in place of 13.4 g of Initiator (I-201) used in Synthesis Example 201 of Resin (B) to obtain 73 g of the polymer having an Mw of $5\times10^4$.

late, 10 g of methyl acrylate and 100 g of tetrahydrofuran was heated to a temperature of 50° C. under nitrogen gas stream and subjected to light irradiation in the same manner as above for 10 hours. The reaction mixture obtained was reprecipitated from 1.5 liters of methanol and the precipitates formed were collected and dried to obtain 76 g of the polymer having an Mw of $9\times10^4$.

Initiator (I-202)

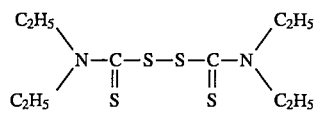

Resin (B-202)

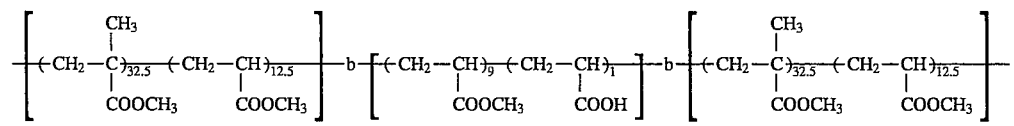

Resin (B-203)

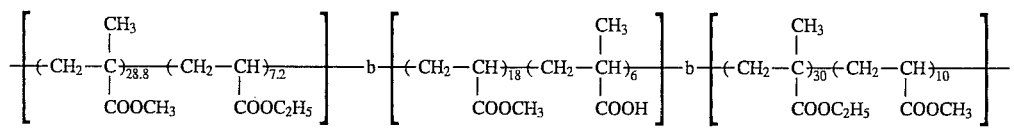

SYNTHESIS EXAMPLE 204 OF RESIN (B): Resin (B-204)

A mixed solution of 50 g of methyl methacrylate and 100 g of tetrahydrofuran was sufficiently degassed under nitrogen gas stream and cooled to −20° C. Then, 1.2 g of 1,1-diphenylpentyl lithium was added to the mixture, and the reaction was conducted for 12 hours. Separately, a mixed solution of 30 g of methyl acrylate, 3 g of triphenylmethyl methacrylate and 50 g of tetrahydrofuran was sufficiently degassed under nitrogen gas stream and the resulting mixed solution was added to the above described mixture, and then reaction was further conducted for 8 hours. Separately, a mixed solution of 50 g of methyl methacrylate and 50 g of tetrahydrofuran was sufficiently degassed under nitrogen gas stream, and the resulting mixed solution was added to the above described mixture, and then reaction was further conducted for 10 hours. The temperature of the reaction mixture was adjusted to 0° C., 10 ml of methanol was added thereto, followed by reacting for 30 minutes, and the polymerization reaction was terminated. The temperature of the polymer solution obtained was adjusted to 30° C. with stirring, 3 ml of an ethanol solution of 30% hydrogen chloride was added thereto and the mixture was stirred for one hour. Then, the solvent of the reaction mixture was distilled off under reduced pressure until the whole volume was reduced to a half, and the mixture was reprecipitated from one liter of methanol. The precipitates thus formed were collected and dried under reduced pressure to obtain 65 g of the polymer having an Mw of $8.5 \times 10^4$.

methacrylate, followed by reacting for 10 hours with light irradiation in the same manner as above. Further, 70 g methyl methacrylate and 30 g of methyl acrylate were added to the mixture, followed by reacting for 12 hours with light irradiation in the same manner as above. Then, 3 g of methanol was added to the reaction mixture, followed by stirring for 30 minutes, and the reaction was terminated. Then, Pd-C was added to the reaction mixture, and a catalytic reduction reaction was conducted for one hour at a temperature of 25° C. After removing the insoluble substances from the reaction mixture by filtration, the reaction mixture was reprecipitated from 2 liters of methanol, and the precipitates thus formed were collected by filtration and dried to obtain 180 g of the polymer having an Mw of $8.5 \times 10^4$.

Resin (B-205)

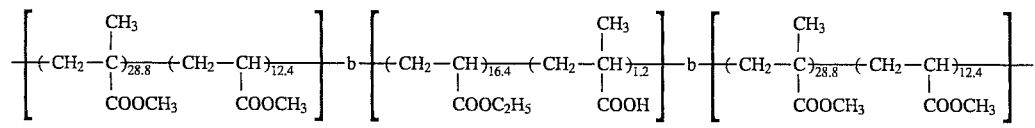

SYNTHESIS EXAMPLES 206 TO 215 OF RESIN (B): Resins (B-206) to (B-215)

Each of the resins (B) shown in Table 13 below was synthesized in the same reaction procedure as described in Synthesis Example 202 of Resin (B). The Mw of each of the polymers obtained was in a range of from $5 \times 10^4$ to $7 \times 10^4$.

Resin (B-204)

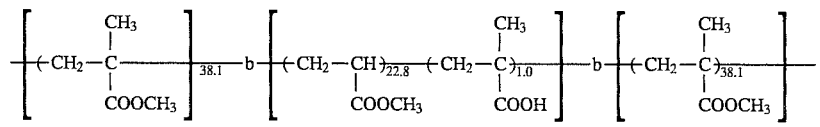

SYNTHESIS EXAMPLE 205 OF RESIN (B): Resin (B-205)

A mixed solution of 70 g of methyl methacrylate, 30 g of methyl acrylate, 0.5 g of (tetraphenyl porphinato) aluminum methyl and 200 g of methylene chloride was raised to a temperature of 30° C. under nitrogen gas stream. The mixture was irradiated with light from a xenon lamp of 300 W at a distance of 25 cm through a glass filter, and the reaction was conducted for 12 hours. To the mixture were further added 40 g of ethyl acrylate and 6.4 g of benzyl

TABLE 13

$$\{P\}\text{-}b\text{-}\{(CH_2-CH)_r\text{-}(Y_2)_y\text{-}(Z_3)_z\}\text{-}b\text{-}\{P\} \quad \{P\}: \{(CH_2-\underset{\underset{COOR_1}{|}}{\overset{\overset{CH_3}{|}}{C}})_p\text{-}(X_1)_q\}$$
$$\quad\quad\quad\quad\quad |$$
$$\quad\quad\quad\quad COOR_2$$

| Synthesis Examples of Resin (B) | Resin (B) | $R_1$ | $-X_1-$ | $R_2$ | $-Y_2-$ | $-Z_3-$ | p/q/r/y/z (weight ratio) |
|---|---|---|---|---|---|---|---|
| 206 | B-206 | $-CH_3$ | — | $-CH_3$ | — | $-CH_2-CH-$<br>$\quad\quad\quad\|$<br>$\quad\quad COO(CH_2)_2COOH$ | 32.5/0/32/0/3 |
| 207 | B-207 | $-CH_3$ | — | $-C_2H_5$ | — | $-CH_2-C(CH_2)-$<br>(anhydride ring: $O=C-O-C=O$) | 36/0/25/0/3 |
| 208 | B-208 | $-CH_3$ | $-CH_2-CH-$<br>$\quad\quad\|$<br>$\quad COOCH_3$ | $-CH_3$ | $-CH_2CH-$<br>$\quad\quad\|$<br>N-C=O (pyrrolidone ring) | $-CH_2-\underset{\underset{COOH}{|}}{\overset{\overset{CH_3}{|}}{C}}-$ | 33/5/20/3/1 |
| 209 | B-209 | $-C_2H_5$ | $-CH_2-CH-$<br>$\quad\quad\|$<br>$\quad COOCH_2C_6H_5$ | $-CH_3$ | — | $-CH_2-CH-$<br>$\quad\quad\|$<br>$\quad COO(CH_2)_3SO_3H$ | 37.1/5/15/0/0.8 |
| 210 | B-210 | $-C_3H_7$ | $-CH_2-CH-$<br>$\quad\quad\|$<br>$\quad C_6H_5$ | $-CH_3$ | $-CH_2CH-$<br>$\quad\quad\|$<br>$\quad COOCH_2CH_2OCH_3$ | $-CH_2-\underset{\underset{CH_2COOH}{|}}{\overset{\overset{COOH}{|}}{C}}-$ | 30.5/5/20/8/1.0 |
| 211 | B-211 | $-CH_3$ | $-CH_2-CH-$<br>$\quad\quad\|$<br>$\quad COOCH_2C_6H_5$ | $-CH_3$ | $-CH_2CH-$<br>$\quad\quad\|$<br>$\quad COCH_3$ | $-CH_2-\underset{\underset{COO(CH_2)_2O-P(=O)(OH)_2}{|}}{\overset{\overset{CH_3}{|}}{C}}-$ | 30/5/19/10/1.0 |

TABLE 13-continued $$+P+_b++CH_2-CH+_r+Y_2+_y+Z_3+_z+b+P+\quad +P+: \quad ++CH_2-\underset{COOR_1}{\underset{|}{\overset{CH_3}{\overset{|}{C}}}}+_p+X_1+_q+$$
$$\underset{COOR_2}{|}$$

| Synthesis Examples of Resin (B) | Resin (B) | $R_1$ | $-X_1-$ | $R_2$ | $-Y_2-$ | $-Z_3-$ | p/q/r/y/z (weight ratio) |
|---|---|---|---|---|---|---|---|
| 212 | B-212 | $-CH_3$ | $-CH_2-\underset{COOCH_2C_6H_5}{\underset{|}{\overset{CH_3}{\overset{|}{C}}}}-$ | $-C_2H_5$ | — | $-CH_2-\underset{COO(CH_2)_2OCO}{\underset{|}{\overset{CH_3}{\overset{|}{C}}}}-$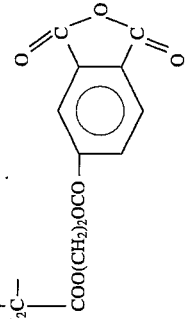 | 40.5/0/15/0/4 |
| 213 | B-213 | $-C_6H_5$ | $-CH_2-\underset{COOC_2H_5}{\underset{|}{\overset{CH_3}{\overset{|}{C}}}}-$ | $-CH_3$ | $-CH_2CH-$<br>$\quad\quad\ \ |$<br>$\quad\quad\ \ CN$ | $-CH_2CH-$<br>$\quad\quad\ \ |$<br>$\quad\quad\ \ CONH(CH_2)_4COOH$ | 15/10/45/3/2 |
| 214 | B-214 | $-CH_2C_6H_5$ | — | $-CH_3$ | $-CH_2CH-$<br>$\quad\quad\ \ |$<br>$\quad\quad\ \ OCOCH_3$ | $-CH_2CH-$<br>$\quad\quad\ \ |$<br>$\quad\quad\ \ COO(CH_2)_2OCO(CH_2)_2-COOH$ | 37.5/0/15/6.5/3.5 |
| 215 | B-215 | $-C_6H_5$ | $-CH_2-CH-$<br>$\quad\quad\ \ \ |$<br>$\quad\quad\ \ \ COOC_6H_5$ | $-C_2H_5$ | $-CH_2CH-$<br>$\quad\quad\ \ |\!\diagup\!\!\diagdown$<br>$\quad\quad\ \ N\ \ \ \ N$ | $-CH_2CH-$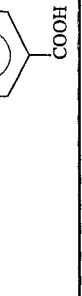$-COOH$ | 40/0/14/4/2 |

SYNTHESIS EXAMPLES 216 TO 219 OF RESIN (B): Resins (B-216) to (B-219)

Each of the polymers shown in Table 14 below was synthesized in the same procedure as described in Synthesis Example 201 of Resin (B) except for using $5 \times 10^{-2}$ moles of each of the initiators shown in Table 14 below in place of 13.4 g of Initiator (I-201) used in Synthesis Examples 201 of Resin (B). The Mw of each of the polymers was in a range of from $7 \times 10^4$ to $8.5 \times 10^4$.

The mixture was reacted under the same light-irradiation condition as described in Synthesis Example 201 of Resin (B) for 5 hours. The polymer obtained was dissolved in 200 g of tetrahydrofuran, reprecipitated from 1.0 liter of methanol, and the precipitates formed were collected by filtration and dried.

A mixed solution of 20 g of the polymer thus obtained, a monomer corresponding to each of the polymer components

TABLE 14

| Synthesis Examples of Resin (B) | Resin (B) | Initiator structure | Initiator |
|---|---|---|---|
| 216 | B-216 | 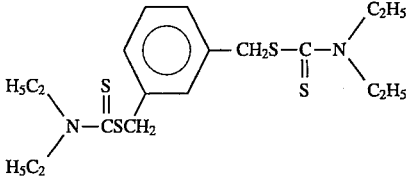 | I-204 |
| 217 | B-217 | 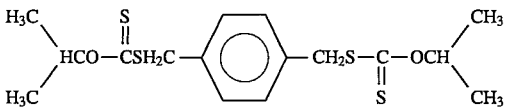 | I-205 |
| 218 | B-218 | 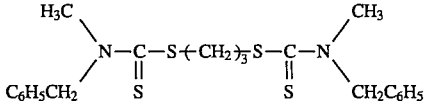 | I-206 |
| 219 | B-219 | $C_6H_5CH_2O-\underset{\underset{S}{\|}}{C}-S\text{-}(CH_2\text{)}_3\text{-}S-\underset{\underset{S}{\|}}{C}-OCH_2C_6H_5$ | I-207 |

SYNTHESIS EXAMPLES 220 TO 226 OF RESIN (B): Resins (B-220) to (B-226)

A mixed solution of 90 g of benzyl methacrylate, 10 g of acrylic acid and 7.8 g of Initiator (1-208) shown below was heated to a temperature of 40° C. under nitrogen gas stream.

Initiator (I-208)

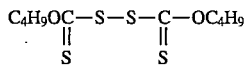

shown in Table 15 below and 100 g of tetrahydrofuran was reacted with light irradiation in the same manner as above for 15 hours. The polymer obtained was reprecipitated from 1.5 liters of methanol and the precipitates formed were collected by filtration and dried. The yield of each polymer was in a range of from 60 to 70 g and the Mw thereof was in a range of from $4 \times 10^4$ to $7 \times 10^4$.

TABLE 15

$$+P+b+(CH_2-\underset{COOCH_2C_6H_5}{\underset{|}{CH}})_{18}-(CH_2-\underset{COOH}{\underset{|}{CH}})_2+b+P+ \quad +P+: \quad +(CH_2-\underset{COOR}{\underset{|}{\underset{|}{C}-CH_3}})_x+(Y)_y+(Z)_z+$$

| Synthesis Example of Resin (B) | Resin (B) | —R— | —Y— | —Z— | x/y/z (weight ratio) |
|---|---|---|---|---|---|
| 220 | B-220 | —CH₃ | — | — | 40/0/0 |
| 221 | B-221 | —C₂H₅ | —CH₂—CH— <br> \|<br>CN | — | 38/2/0 |
| 222 | B-222 | —CH₃ | —CH₂—CH— <br>\|<br>COOCH₃ | —CH₂—CH— <br>\|<br>CN | 27/12/1 |
| 223 | B-223 | —CH₃ | —CH₂—CH— <br>\|<br>COO(CH₂)₂OCH₃ | — | 37/3/0 |
| 224 | B-224 | —CH₂C₆H₅ | —CH₂—CH— <br>\|<br>N-pyrrolidinone | — | 38.5/1.5/0 |
| 225 | B-225 | —C₂H₅ | — | — | 40/0/0 |
| 226 | B-226 | —C₂H₅ | —CH₂—CH—C₆H₅ | —CH₂—CH— <br>\|<br>CON-morpholino | 30/7.5/2.5 |

EXAMPLE I-1

A mixture of 6 g (solid basis) of Resin (A-7), 34 g (solid basis) of Resin (B-1), 200 g of photoconductive zinc oxide, 0.018 g of Cyanine Dye (I-1) shown below, 0.15 g of phthalic anhydride and 300 g of toluene was dispersed by a homogenizer (manufactured by Nippon Seiki K.K.) at a rotation of 6×10³ r.p.m. for 10 minutes to prepare a coating composition for a light-sensitive layer. The coating composition was coated on paper, which had been subjected to electrically conductive treatment, by a wire bar at a dry coverage of 22 g/m², followed by drying at 110° C. for 10 seconds. The coated material was then allowed to stand in a dark place at 20° C. and 65% RH (relative humidity) for 24 hours to prepare an electrophotographic light-sensitive material.

Cyanine Dye (I-1)

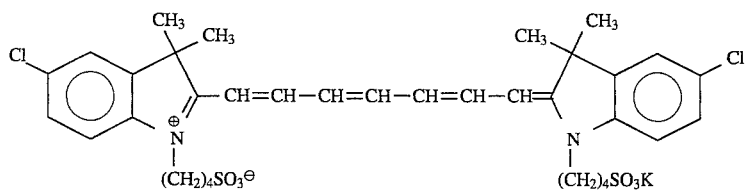

COMPARATIVE EXAMPLE I-1

An electrophotographic light-sensitive material was prepared in the same manner as in Example I-1, except for using 34 g of Resin (R-I-1) shown below in place of 34 g of Resin (B-1) used in Example I-1.

Comparative Resin (R-I-1)

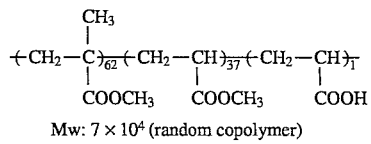

Mw: 7 × 10⁴ (random copolymer)

COMPARATIVE EXAMPLE I-2

An electrophotographic light-sensitive material was prepared in the same manner as in Example I-1, except for using 34 g of Resin (R-I-2) shown below in place of 34 g of Resin (B-1) used in Example I-1.

Comparative Resin (R-I-2)

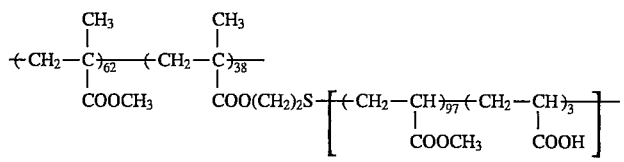

Mw: 7.5 × 10⁴ (graft copolymer)

With each of the light-sensitive material thus prepared, electrostatic characteristics and image forming performance were evaluated. The results obtained are shown in Table I-1 below.

TABLE I-1

|  | Example I-1 | Comparative Example I-1 | Comparative Example I-2 |
|---|---|---|---|
| Electrostatic Characteristics*[1] | | | |
| $V_{10}$ (−V) | | | |
| I (20° C., 65% RH) | 650 | 650 | 655 |
| II (30° C., 80% RH) | 640 | 640 | 640 |
| D.R.R. (90 sec value) (%) | | | |
| I (20° C., 65% RH) | 88 | 85 | 86 |
| II (30° C., 80% RH) | 86 | 80 | 82 |
| $E_{1/10}$ (erg/cm²) | | | |
| I (20° C., 65% RH) | 12 | 22 | 18 |
| II (30° C., 80% RH) | 15 | 28 | 23 |
| $E_{1/100}$ (erg/cm²) | | | |
| I (20° C., 65% RH) | 18 | 37 | 29 |
| II (30° C., 80% RH) | 23 | 48 | 37 |
| Image Forming Performance*[2] | | | |
| I (20° C., 65% RH) | Very good | Scratches of fine lines and letters, unevenness in half tone area | Scratches of fine lines and letters, unevenness in half tone area |
| II (30° C., 80% RH) | Very good | Scratches of fine lines and letters, unevenness in half tone area | Scratches of fine lines and letters, unevenness in half tone area |

The evaluation of each item shown in Table I-1 was conducted in the following manner.

*1) Electrostatic Characteristics

The light-sensitive material was charged with a corona discharge to a voltage of −6 kV for 20 seconds in a dark room using a paper analyzer ("Paper Analyzer SP- 428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

$$DRR\ (\%) = (V_{100}/V_{10}) \times 100$$

Separately, the surface of photoconductive layer was charged to −400 V with a corona discharge and then exposed to light emitted from a gallium-aluminum-arsenic semiconductor laser (oscillation wavelength: 780 nm), and the time required for decay of the surface potential $V_{10}$ to one-tenth was measured, and the exposure amount $E_{1/10}$ (erg/cm²) was calculated therefrom. Further, in the same manner as described above the time required for decay of the surface potential $V_{10}$ to one-hundredth was measured, and the exposure amount $E_{1/100}$ (erg/cm²) was calculated therefrom. The measurements were conducted under ambient condition of 20° C. and 65% RH (Condition I) or 30° C. and 80% RH (Condition II).

*2) Image Forming Performance

After the light-sensitive material was allowed to stand for one day under the ambient condition shown below, the light-sensitive material was charged to −6 kV and exposed to light emitted from a gallium-aluminum-arsenic semiconductor laser (oscillation wavelength: 780 nm; output: 2.8 mW) at an exposure amount of 64 erg/cm² (on the surface of the photoconductive layer) at a pitch of 25 μm and a scanning speed of 300 m/sec. The thus formed electrostatic latent image was developed with a liquid developer ("ELP-T" produced by Fuji Photo Film Co., Ltd.), washed with a rinse solution of isoparaffinic solvent ("Isopar G" manufactured by Esso Chemical K. K.) and fixed. The duplicated image obtained was visually evaluated for fog and image quality. The ambient condition at. the time of image formation was 20° C. and 65% RH (Condition I) or 30° C. and 80% RH (Condition II).

As can be seen from the results shown in Table I-1, the light-sensitive material according to the present invention had good electrostatic characteristics. The duplicated image obtained thereon was clear and free from background fog. On the contrary, with the light-sensitive materials of Comparative Examples I-1 and I-2 the decrease in photosensitivity ($E_{1/10}$ and $E_{1/100}$) occurred, and in the duplicated images the scratches of fine lines and letters were observed and a slight background fog remained without removing after the rinse treatment. Further, the occurrence of unevenness in half tone areas of continuous gradation of the original was observed regardless of the electrostatic characteristics.

The value of $E_{1/100}$ is largely different between the light-sensitive material of the present invention and those of the comparative examples. The value of $E_{1/100}$ indicates an electrical potential remaining in the non-image areas after exposure at the practice of image formation. The smaller this value, the less the background fog in the non-image areas.

More specifically, it is required that the remaining potential is decreased to −10 V or less. Therefore, an amount of exposure necessary to make the remaining potential below −10 V is an important factor. In the scanning exposure system using a semiconductor laser beam, it is quite important to make the remaining potential below −10 V by a small exposure amount in view of a design for an optical system of a duplicator (such as cost of the device, and accuracy of the optical system).

From all these considerations, it is thus clear that an electrophotographic light-sensitive material satisfying both the requirements of electrostatic characteristics and image forming performance and being advantageously employed particularly in a scanning exposure system using a semiconductor laser beam can be obtained only using the binder resin according to the present invention.

EXAMPLE I-2

A mixture of 5 g (solid basis) of Resin (A-3), 35 g (solid basis) of Resin (B-2), 200 g of photoconductive zinc oxide, 0.020 g of Methine Dye (I-II) shown below, 0.20 g of N-hydroxymaleinimide and 300 g of toluene was treated in the same manner as described in Example I-1 to prepare an electrophotographic light-sensitive material.

Methine Dye (I-II)

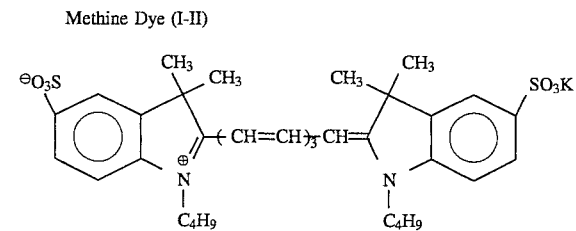

With the light-sensitive material thus-prepared, a film property in terms of surface smoothness, electrostatic characteristics and image forming performance were evaluated. Further, printing property was evaluated when it was used as an electrophotographic lithographic printing plate precursor. The results obtained are shown in Table I-2 below.

TABLE I-2

|  |  | Example I-2 |
|---|---|---|
| Smoothness of Photoconductive Layer*3) (sec/cc) |  | 650 |
| Electrostatic Characteristics |  |  |
| $V_{10}$ (−V) | I (20° C., 65% RH) | 660 |
|  | II (30° C., 80% RH) | 650 |
| D.R.R. | I (20° C., 65% RH) | 88 |
| (90 sec value) (%) | II (30° C., 80% RH) | 85 |
| $E_{1/10}$ (erg/cm$^2$) | I (20° C., 65% RH) | 15 |
|  | II (30° C., 80% RH) | 17 |
| $E_{1/100}$ (erg/cm$^2$) | I (20° C., 65% RH) | 23 |
|  | II (30° C., 80% RH) | 26 |
| Image Forming Performance |  |  |
|  | I (20° C., 65% RH) | Very good |
|  | II (30° C., 80% RH) | Very good |
| Contact Angle with Water*4) (°) |  | 10 or less |
| Printing Durability*5) |  | 10,000 prints |

The evaluation of each item shown in Table I-2 was conducted in the following manner.

*3) Smoothness of Photoconductive Layer

The smoothness (sec/cc) of the light-sensitive material was measured using a Beck's smoothness test machine (manufactured by Kumagaya Riko K. K.) under an air volume condition of 1 cc.

*4) Contact Angle with Water

The light-sensitive material was passed once through an etching processor using a solution prepared by diluting an oil-desensitizing solution ("ELP-EX" produced by Fuji Photo Film Co., Ltd.) to a two-fold volume with distilled water to conduct oil-desensitization treatment on the surface of the photoconductive layer. On the thus oil-desensitized surface was placed a drop of 2 μl of distilled water, and the contact angle formed between the surface and water was measured using a goniometer.

*5) Printing Durability

The light-sensitive material was subjected to plate making in the same manner as described in *2) above to form toner images, and the surface of the photoconductive layer was subjected to oil-desensitization treatment under the same condition as in *4) above. The resulting lithographic printing plate was mounted on an offset printing machine ("Oliver Model 52", manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table I-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 10° or less with water. On practical printing using the resulting master plate, 10,000 prints of clear image without background stains were obtained.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES I-3 TO I-18

Each electrophotographic light-sensitive material was prepared in the same manner as described in Example I-2, except for using each of Resins (A) and Resins (B) shown in Table I-3 below in place of Resin (A-3) and Resin (B-2) used in Example I-2, respectively.

The electrostatic characteristics of the resulting light-sensitive materials were evaluated in the same manner as described in Example I-2. The results obtained are shown in Table I-3 below.

TABLE I-3

| Example | Resin (A) | Resin (B) | $V_{10}$ (−V) | D.R.R. (%) | $E_{1/10}$ (erg/cm$^2$) | $E_{1/100}$ (erg/cm$^2$) |
|---|---|---|---|---|---|---|
| I-3 | A-1 | B-5 | 600 | 80 | 20 | 31 |
| I-4 | A-4 | B-6 | 605 | 81 | 20 | 32 |
| I-5 | A-5 | B-7 | 605 | 81 | 21 | 31 |
| I-6 | A-6 | B-8 | 610 | 81 | 19 | 29 |
| I-7 | A-8 | B-9 | 680 | 85 | 15 | 28 |
| I-8 | A-12 | B-10 | 605 | 81 | 20 | 30 |
| I-9 | A-14 | B-11 | 580 | 80 | 23 | 35 |
| I-10 | A-17 | B-12 | 650 | 83 | 18 | 30 |
| I-11 | A-18 | B-13 | 660 | 83 | 17 | 29 |
| I-12 | A-19 | B-14 | 630 | 82 | 19 | 31 |
| I-13 | A-23 | B-16 | 660 | 84 | 16 | 28 |
| I-14 | A-24 | B-17 | 580 | 80 | 19 | 32 |
| I-15 | A-25 | B-19 | 570 | 79 | 22 | 35 |
| I-16 | A-27 | B-20 | 585 | 80 | 20 | 31 |
| I-17 | A-28 | B-21 | 580 | 79 | 23 | 34 |
| I-18 | A-29 | B-22 | 690 | 84 | 16 | 29 |

The electrostatic characteristics were evaluated under condition of 30° C. and 80% RH.

As a result of the evaluation on image forming performance of each light-sensitive material, it was found that clear duplicated images having good reproducibility of fine lines and letters and no occurrence of unevenness in half tone areas without the formation of background fog were obtained.

EXAMPLES I-19 TO I-22

Each electrophotographic light-sensitive material was prepared in the same manner as described in Example I-1, except for using each of the dye shown in Table I-4 below in place of Cyanine Dye (I-1) used in Example I-1.

The coating composition was coated on paper, which had been subjected to electrically conductive treatment, by a wire bar at a dry coverage of 20 g/m², and dried for 20 seconds at 110° C. Then, the coated material was allowed to stand in a dark place for 24 hours under the conditions of 20° C. and 65% RH to prepare each electrophotographic light-sensitive material.

Methine Dye (I-VII)

TABLE I-4

| Example | Dye | Chemical Structure of Dye |
|---|---|---|
| I-19 | (I-III) | [structure] |
| I-20 | (I-IV) | [structure] |
| I-21 | (I-V) | [structure] |
| I-22 | (I-VI) | [structure] |

Each of the light-sensitive materials according to the present invention was excellent in charging properties, dark charge retention rate and photosensitivity, and provided clear duplicated images free from background fog even when processed under severe condition of high temperature and high humidity (30° C. and 80% RE).

EXAMPLES I-23 AND I-24

A mixture of 6.5 g of Resin (A-1) (Example I-23) or Resin (A-29) (Example 1-24), 33.5 g of Resin (B-9), 200 g of zinc oxide, 0.02 g of uranine, 0.03 g of Methine Dye (I-VII) shown below, 0.03 g of Methine Dye (I-VIII) shown below, 0.18 g of p-hydroxybenzoic acid and 300 g of toluene was dispersed by a homogenizer at 7×10³ r.p.m. for 10 minutes to prepare a coating composition for a light-sensitive layer.

-continued

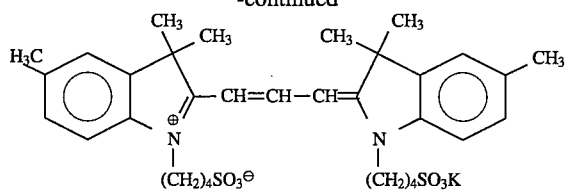

Methine Dye (I-VIII)

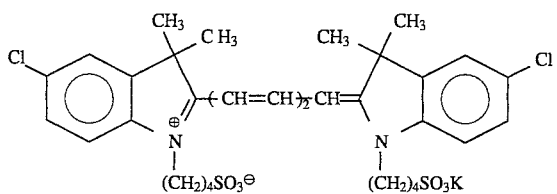

COMPARATIVE EXAMPLE I-3

An electrophotographic light-sensitive material was prepared in the same manner as in Example I-23, except for using Resin (R-I-3) shown below in place of Resin (B-9) used in Example I-23.

Comparative Resin (R-I-3)

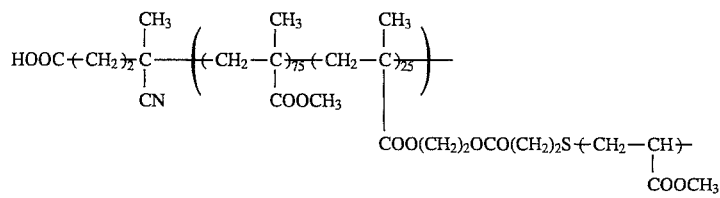

Mw: $7.5 \times 10^4$

With each of the light-sensitive materials thus prepared, various characteristics were evaluated in the same manner as in Example I-2. The results obtained are shown in Table I-5 below.

for decay of the surface potential ($V_{10}$) to $1/10$ or $1/100$ thereof was determined, and the exposure amount $E_{1/10}$ or $E_{1/100}$ (lux.sec) was calculated therefrom.

*7) Image Forminq Performance

The electrophotographic light-sensitive material was allowed to stand for one day under the ambient condition described below, the light-sensitive material was subjected to plate making by a full-automatic plate making machine (ELP-404V manufactured by Fuji Photo Film Co., Ltd.) using ELP-T as a toner. The duplicated image thus obtained was visually evaluated for fog and image quality. The ambient condition at the time of image formation was 20° C. and 65% RH (I) or 30° C. and 80% RH (II). The original used for the duplication was composed of cuttings of other originals pasted up thereon.

From the results shown above, it can be seen that each light-sensitive material exhibited almost the same properties with respect to the surface smoothness and mechanical strength of the photoconductive layer. However, on the electrostatic characteristics, the light-sensitive material of Comparative Example I-3 had the particularly large value of

TABLE I-5

|  |  | Example I-23 | Example I-24 | Comparative Example I-3 |
|---|---|---|---|---|
| Binder Resin |  | (A-1)/(B-9) | (A-29)/(B-9) | (A-1)/(R-I-3) |
| Smoothness of Photoconductive Layer (sec/cc) |  | 550 | 560 | 560 |
| Electrostatic Characteristics*6) |  |  |  |  |
| $V_{10}$ (−V) | I (20° C., 65% RH) | 595 | 685 | 580 |
|  | II (30° C., 80% RH) | 585 | 675 | 570 |
| D.R.R. (%) | I (20° C., 65% RH) | 93 | 96 | 92 |
|  | II (30° C., 80% RH) | 90 | 94 | 90 |
| $E_{1/10}$ (lux/sec) | I (20° C., 65% RH) | 6.3 | 5.8 | 7.5 |
|  | II (30° C., 80% RH) | 7.0 | 6.3 | 8.0 |
| $E_{1/100}$ (lux/sec) | I (20° C., 65% RH) | 10.0 | 9.0 | 13.0 |
|  | II (30° C., 80% RH) | 11.2 | 9.5 | 14.0 |
| Image Forming*7) | I (20° C., 65% RH) | Good | Very good | Edge mark of cutting |
| Performance | II (30° C., 80% RH) | Good | Very good | Edge mark of cutting, unevenness in half tone area |
| Contact Angle with Water |  | 10 or less | 10 or less | 10 or less |
| Printing Durability |  | 10,000 prints | 10,000 prints | Background stain due to edge mark of cutting occurred from the start of printing |

The characteristics were evaluated in the same manner as in Example I-2, except that some electrostatic characteristics and image forming performance were evaluated according to the following test methods.

*6) Measurement of Electrostatic Characteristics: $E_{1/10}$ and $E_{1/100}$

The surface of the photoconductive layer was charged to −400 V with corona discharge, and then irradiated by visible light of the illuminance of 2.0 lux. Then, the time required photosensitivity $E_{1/100}$, and this tendency increased under the high temperature and high humidity condition. On the contrary, the electrostatic characteristics of the light-sensitive material according to the present invention were good. Further, those of Example 1-24 using the resin (A') were very good. The value of $E_{1/100}$ thereof was particularly small.

With respect to image forming performance, the edge mark of cuttings pasted up was observed as background fog in the non-image areas in the light-sensitive material of Comparative Example I-3. On the contrary, the light-sensitive materials according to the present invention provided clear duplicated images free from background fog.

Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example I-3, the above described edge mark of cuttings pasted up was not removed with the oil-desensitizing treatment and the background stains occurred from the start of printing.

It can be seen from the results described above that the light-sensitive materials according to the present invention were excellent in all aspects of the surface smoothness and mechanical strength of the photoconductive layer, electrostatic characteristics and printing property. Further, it can be seen that the electrostatic characteristics are more improved by using the resin (A').

EXAMPLE I-25

A mixture of 5 g of Resin (A-23), 35 g of Resin (B-12), 200 g of zinc oxide, 0.02 g of uranine, 0.04 g of Rose Bengal, 0.03 g of bromophenol blue, 0.40 g of phthalic anhydride and 300 g of toluene was treated in the same manner as described in Example I-23 to prepare an electrophotographic light-sensitive material.

As the result of the evaluation of various characteristics in the same manner as described in Example I-23, it can be seen that the light-sensitive material according to the present invention is excellent in charging properties, dark charge retention rate and photosensitivity, and provides a clear duplicated image free from background fog under severe conditions of high temperature and high humidity (30° C. and 80% RH). Further, when the material was employed as an offset master plate precursor, 10,000 prints of clear image were obtained.

EXAMPLES I-26 TO I-37

Each electrophotographic light-sensitive material was prepared in the same manner as described in Example I-25, except for using 5 g of each of Resin (A) and 35 g of each of Resin (B) shown in Table I-6 below in place of 5 g of Resin (A-23) and 35 g of Resin (B-12) used in Example I-25, respectively.

TABLE I-6

| Example | Resin (A) | Resin (B) |
| --- | --- | --- |
| I-26 | A-1 | B-1 |
| I-27 | A-2 | B-2 |
| I-28 | A-4 | B-3 |
| I-29 | A-5 | B-4 |
| I-30 | A-9 | B-6 |
| I-31 | A-15 | B-15 |
| I-32 | A-20 | B-18 |
| I-33 | A-21 | B-20 |
| I-34 | A-22 | B-21 |
| I-35 | A-25 | B-22 |
| I-36 | A-26 | B-23 |
| I-37 | A-28 | B-13 |

Each of the light-sensitive materials according to the present invention was excellent in charging properties, dark charge retention rate and photosensitivity, and provided a clear duplicated image free from background fog and scratches of fine lines even under severe condition of high temperature and high humidity (30° C. and 80% RH). Further, when these materials were employed as offset master plate precursors, more than 10,000 prints of a clear image free from background stains were obtained respectively.

EXAMPLE II-1

A mixture of 6 g (solid basis) of Resin (A-104), 34 g (solid basis) of Resin (B-i), 200 g of photoconductive zinc oxide, 0.018 g of Cyanine Dye (II-1) shown below, 0.45 g of phthalic anhydride and 300 g of toluene was dispersed by a homogenizer (manufactured by Nippon Seiki K. K.) at a rotation of 7×10³ r.p.m. for 10 minutes to prepare a coating composition for a light-sensitive layer. The coating composition was coated on paper, which had been subjected to electrically conductive treatment, by a wire bar at a dry coverage of 25 g/m², followed by drying at 110° C. for 10 seconds. The coated material was then allowed to stand in a dark place at 20° C. and 65% RH for 24 hours to prepare an electrophotographic light-sensitive material.

Cyanine Dye (II-1)

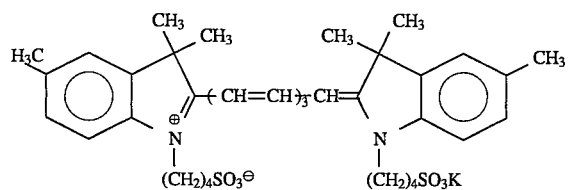

COMPARATIVE EXAMPLE II-1

An electrophotographic light-sensitive material was prepared in the same manner as in Example II-1, except for using 34 g of Resin (R-II-1) shown below in place of 34 g of Resin (B-b 1) used in Example II-1.

Comparative Resin (R-II-1)

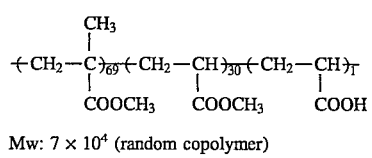

Mw: 7 × 10⁴ (random copolymer)

COMPARATIVE EXAMPLE II-2

An electrophotographic light-sensitive material was prepared in the same manner as in Example II-1, except for using 34 g of Resin (R-II-2) shown below in place of 34 g of Resin (B-1) used in Example II-1.

Comparative Resin (R-II-2)

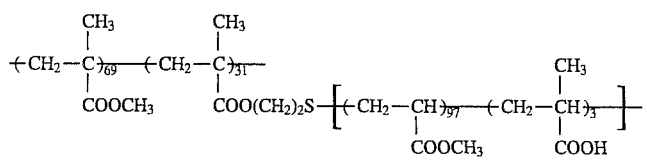

Mw: $7.5 \times 10^4$ (graft copolymer)

With each of the light-sensitive materials thus prepared, electrostatic characteristics and image forming performance were evaluated. The results obtained are shown in Table II-1 below.

TABLE II-1

|  | Example II-1 | Comparative Example II-1 | Comparative Example II-2 |
| --- | --- | --- | --- |
| Electrostatic*[1] Characteristics |  |  |  |
| $V_{10}$ (−V) |  |  |  |
| I (20° C., 65% RH) | 680 | 660 | 670 |
| II (30° C., 80% RH) | 660 | 635 | 645 |
| III (15° C., 30% RH) | 690 | 665 | 680 |
| D.R.R. (90 sec value) (%) |  |  |  |
| I (20° C., 65% RH) | 89 | 85 | 87 |
| II (30° C., 80% RH) | 84 | 80 | 83 |
| III (15° C., 30% RH) | 89 | 87 | 89 |
| $E_{1/10}$ (erg/cm$^2$) |  |  |  |
| I (20° C., 65% RH) | 15.5 | 22 | 20 |
| II (30° C., 80% RH) | 18 | 28 | 25 |
| III (15° C., 30% RH) | 24 | 30 | 28 |
| Image Forming*[2] Performance |  |  |  |
| I (20° C., 65% RH) | Very good | Good | Good |
| II (30° C., 80% RH) | Good | Unevenness in half tone area, slight background fog | Unevenness in half tone area, slight background fog |
| III (15° C., 30% RH) | Good | White spots in image portion | White spots in image portion |

The evaluation of each item shown in Table II-1 was conducted in the following manner.

*1) Electrostatic Characteristics

The light-sensitive material was charged with a corona discharge to a voltage of −6 kV for 20 seconds in a dark room using a paper analyzer ("Paper Analyzer SP- 428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

$$DRR\ (\%) = (V_{100}/V_{10}) \times 100$$

Separately, the surface of photoconductive layer was charged to −400 V with a corona discharge and then exposed to light emitted from a gallium-aluminum-arsenic semiconductor laser (oscillation wavelength: 780 nm), and the time required for decay of the surface potential $V_{10}$ to one-tenth was measured, and the exposure amount $E_{1/10}$ (erg/cm$^2$) was calculated therefrom. The measurements were conducted under ambient condition of 20° C. and 65% RH (I), 30° C. and 80% RH (II) or 15° C. and 30% RH

*2) Image Forminq Performance

After the light-sensitive material was allowed to stand for one day under the ambient condition shown below, the light-sensitive material was charged to −6 kV and exposed to light emitted from a gallium-aluminum-arsenic semiconductor laser (oscillation wavelength: 780 nm; output: 2.8 mW) at an exposure amount of 64 erg/cm$^2$ (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of iso- paraffinic solvent Isopar G (manufactured by Esso Chemical K. K.) and fixed. The duplicated image obtained was visually evaluated for fog and image quality. The ambient condition at the time of image formation was 20° C. and 65% RH (I), 30° C. and 80% RH (II) or 15° C. and 30% RH (III).

As can be seen from the results shown in Table II-1, the light-sensitive material according to the present invention exhibited good electrostatic characteristics and provided duplicated image which was clear and free from background fog, even when the ambient condition was fluctuated. On the contrary, while the light-sensitive materials of Comparative Examples II-1 and II-2 exhibited good image forming performance under the ambient condition of normal temperature and normal humidity (I), the occurrence of unevenness of density was observed in the highly accurate image portions, in particular, half tone areas of continuous gradation under the ambient condition of high temperature and high humidity (II) regardless of the electrostatic characteristics. Also, a slight background fog remained without removing after the rinse treatment. Further, the occurrence of unevenness of small white spots at random in the image portion was observed under the ambient condition of low temperature and low humidity (III)

From all these considerations, it is thus clear that an electrophotographic light-sensitive material satisfying both requirements of electrostatic characteristics and image forming performance (in particular, for highly accurate image) and being advantageously employed particularly in a scanning exposure system using a semiconductor laser beam can be obtained only when the binder resin according to the present invention is used.

EXAMPLE II-2

A mixture of 5 g (solid basis) of Resin (A-119), 35 g (solid basis) of Resin (B-2), 200 g of photoconductive zinc oxide, 0,020 g of Methine Dye (II-II) shown below, 0.20 g of N-hydroxymaleinimide and 300 g of toluene was treated in the same manner as described in Example II-1 to prepare an electrophotographic light-sensitive material.

Methine Dye (II-II)

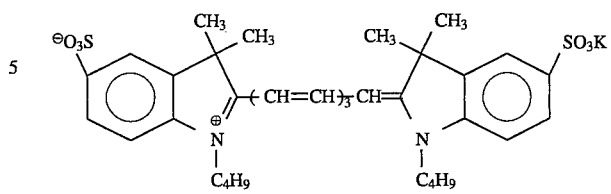

COMPARATIVE EXAMPLE II-3

An electrophotographic light-sensitive material was prepared in the same manner as in Example II-2, except for using 35 g of Resin (R-II-3) shown below in place of 35 g of Resin (B-2) used in Example II-2.

Comparative Resin (R-II-3)

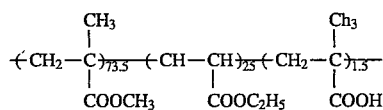

Mw: $6.5 \times 10^4$ (random copolymer)

COMPARATIVE EXAMPLE II-4

An electrophotographic light-sensitive material was prepared in the same manner as in Example II-2, except for using 35 g of Resin (R-II-4) shown below in place of 35 g of Resin (B-2) used in Example II-2.

Comparative Resin (R-II-4)

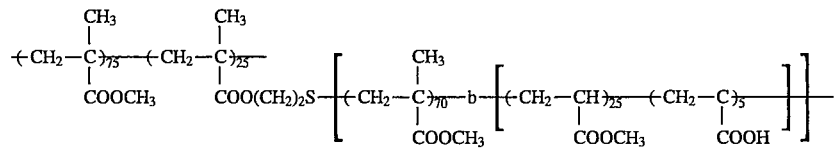

Mw: $5.5 \times 10^4$ (graft copolymer)

With each of the light-sensitive materials thus-prepared, a film property in terms of surface smoothness, mechanical strength, electrostatic characteristics and image forming performance were evaluated. Further, printing property was evaluated when it was used as an electrophotographic lithographic printing plate precursor. The results obtained are shown in Table II-2 below.

TABLE II-2

| | | Example II-2 | Comparative Example II-3 | Comparative Example II-4 |
|---|---|---|---|---|
| Smoothness of Photoconductive*[3] Layer (sec/cc) | | 430 | 440 | 415 |
| Mechanical Strength of*[4] Photoconductive Layer (%) | | 96 | 80 | 85 |
| Electrostatic Characteristics | | | | |
| $V_{10}$ (−V) | I (20° C., 65% RH) | 730 | 700 | 720 |
| | II (30° C., 80% RH) | 700 | 675 | 695 |
| | III (15° C., 30% RH) | 740 | 705 | 725 |
| D.R.R. (%) | I (20° C., 65% RH) | 88 | 83 | 85 |
| (90 sec value) | II (30° C., 80% RH) | 84 | 79 | 81 |
| | III (15° C., 30% RH) | 89 | 85 | 86 |

TABLE II-2-continued

|  |  | Example II-2 | Comparative Example II-3 | Comparative Example II-4 |
|---|---|---|---|---|
| $E_{1/10}$ (erg/cm$^2$) | I (20° C., 65% RH) | 15.1 | 22 | 20 |
|  | II (30° C., 80% RH) | 14.8 | 19.4 | 18.6 |
|  | III(15° C., 30% RH) | 18.5 | 28 | 24 |
| Image Forming Performance | I (20° C., 65% RH) | Good | Good | Good |
|  | II (30° C., 80% RH) | Good | Unevenness in half tone area | Slight unevenness in half tone area |
|  | III (15° C., 30% RH) | Good | Unevenness in half tone area, unevenness of white spots in image portion | Unevenness in half tone area, unevenness of white spots in image portion |
| Water Retentivity of*5) Light-Sensitive Material |  | No background stain at all | Background stain | Slight background stain |
| Printing Durability*6) |  | 10,000 prints | 4,000 prints | 6,000 prints |

The evaluation of each item shown in Table II-2 was conducted in the following manner.

*3) smoothness of Photoconductive Layer

The smoothness (sec/cc) of the light-sensitive material was measured using a Beck's smoothness test machine manufactured by Kumagaya Riko K. K.) under an air volume condition of 1 cc.

*4) Mechanical Strength of Photoconductive Layer

The surface of the light-sensitive material was repeatedly (1000 times) rubbed with emery paper (#1000) under a load of 75 g/cm$^2$ using a Heidon 14 Model surface testing machine manufactured by Shinto Kagaku K. K.). After dusting, the abrasion loss of the photoconductive layer was measured to obtain film retention (%).

*5) Water Retentivity of Light-Sensitive Material

A light-sensitive material without subjecting to plate making was passed twice through an etching processor using an aqueous solution obtained by diluting an oil-desensitizing solution ELP-EX (produced by Fuji Photo Film Co., Ltd.) to a five-fold volume with distilled water to conduct an oil-desensitizing treatment of the surface of the photoconductive layer. The material thus-treated was mounted on an offset printing machine ("611XLA-II Model" manufactured by Hamada Printing Machine Manufacturing Co.) and printing was conducted using distilled water as dampening water. The extent of background stain occurred on the 50th print was visually evaluated. This testing method corresponds to evaluation of water retentivity after oil-desensitizing treatment of the light-sensitive material under the forced condition.

*6) Printing Durability

The light-sensitive material was subjected to plate making in the same manner as described in *2) above to form toner images, and the surface of the photoconductive layer was subjected to oil-desensitization treatment by passing twice through an etching processor using ELP-EX. The resulting lithographic printing plate was mounted on an offset printing machine ("Oliver Model 52",manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table II-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic and adhesion of ink was not observed at all as a result of the evaluation of water retentivity under the forced condition. On practical printing using the resulting master plate, 10,000 prints of clear image without background stains were obtained.

On the contrary, with the light-sensitive materials of Comparative Examples II-3 and II-4, the occurrence of slight background stain in non-image area, unevenness in highly accurate image of continuous gradation and unevenness of white spots in image portion was observed when the image formation was conducted under severe conditions. Further, as a result of the test on water retentivity of these light-sensitive materials to make offset master plates, the adhesion of ink was observed. The printing durability thereof was at most 5,000 to 6,000 prints.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES II-3 TO II-18

Each electrophotographic right-sensitive material was prepared in the same manner as described in Example II-2, except for using each of Resins (A) and Resins (B) shown in Table II-3 below in place of Resin (A-119) and Resin (B-2) used in Example II-2, respectively.

TABLE II-3

| Example | Resin (A) | Resin (B) |
|---|---|---|
| II-3 | A-105 | B-3 |
| II-4 | A-106 | B-4 |
| II-5 | A-108 | B-5 |
| II-6 | A-109 | B-6 |
| II-7 | A-110 | B-7 |
| II-8 | A-111 | B-8 |
| II-9 | A-112 | B-9 |
| II-10 | A-116 | B-10 |
| II-11 | A-121 | B-11 |
| II-12 | A-122 | B-12 |
| II-13 | A-123 | B-13 |
| II-14 | A-128 | B-14 |
| II-15 | A-129 | B-15 |

TABLE II-3-continued

| Example | Resin (A) | Resin (B) |
|---------|-----------|-----------|
| II-16   | A-131     | B-17      |
| II-17   | A-132     | B-19      |
| II-18   | A-133     | B-23      |

The electrostatic characteristics and image forming performance of each of the light-sensitive materials were determined in the same manner as described in Example II-1. Each light-sensitive material exhibited good electrostatic characteristics. As a result of the evaluation on image forming performance of each light-sensitive material, it was found that clear duplicated images having good reproducibility of fine lines and letters and no occurrence of unevenness in half tone areas without the formation of background fog were obtained.

Further, when these electrophotographic light-sensitive materials were employed as offset master plate precursors under the same printing condition as described in Example II-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics and printing property.

EXAMPLES II-19 TO II-22

Each electrophotographic light-sensitive material was prepared in the same manner as described in Example II-1, except for using each of the dye shown in Table II-4 below in place of Cyanine Dye (II-1) used in Example II-1.

TABLE II-4

| Example | Dye | Chemical Structure of Dye |
|---------|-----|---------------------------|
| II-19 | (II-III) | (indoline)–CH=CH–CH=C(CH$_3$)–CH=CH–CH=(indoline); N-(CH$_2$)$_4$SO$_3^\ominus$ / N-(CH$_2$)$_4$SO$_3$K |
| II-20 | (II-IV) | (benz[e]indoline)–(CH=CH)$_3$–CH=(benz[e]indoline); N-(CH$_2$)$_4$SO$_3^\ominus$ / N-(CH$_2$)$_4$SO$_3$Na |
| II-21 | (II-V) | KO$_3$S-(indoline)–CH=CH–C(CH$_3$)=CH–C(CH$_3$)=(2,6-di-t-butyl-4H-thiopyran); N-(CH$_2$)$_4$SO$_3^\ominus$ |
| II-22 | (II-VI) | NaO$_3$S, SO$_3$Na-(benz[e]indoline)–CH=CH–CH=CH–C(CH$_3$)=(2,6-di-t-butyl-4H-thiopyran); N-(CH$_2$)$_4$SO$_3^\ominus$ |

Each of the light-sensitive materials according to the present invention was excellent in charging properties, dark charge retention rate and photosensitivity, and provided clear duplicated images free from background fog even when processed under severe conditions of high temperature and high humidity (30° C. and 80% RH) and low temperature and low humidity (15° C. and 30% RH).

EXAMPLES II-23 AND II-24

A mixture of 6.5 g of Resin (A-101) (Example II-23) or Resin (A-104) (Example II-24), 33.5 g of Resin (B-9), 200 g of zinc oxide, 0.02 g of uranine, 0.03 g of Methine Dye (II-VII) shown below, 0.03 g of Methine Dye (II-VIII) shown below, 0.18 g of p-hydroxybenzoic acid and 300 g of toluene was dispersed by a h mogenizer at a rotation of $7\times10^3$ r.p.m. for 10 minutes to prepare a coating composition for a light-sensitive layer. The coating composition was coated on paper, which had been subjected to electrically conductive treatment, by a wire bar at a dry coverage of 25 g/m², and dried for 20 seconds at 110° C. Then, the coated material was allowed to stand in a dark place for 24 hours under the conditions of 20° C. and 65% RH to prepare each electrophotographic light-sensitive material.

Methine Dye (II-VII)

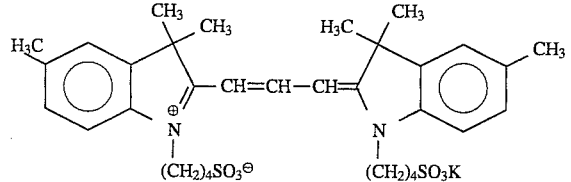

Methine Dye (II-VIII)

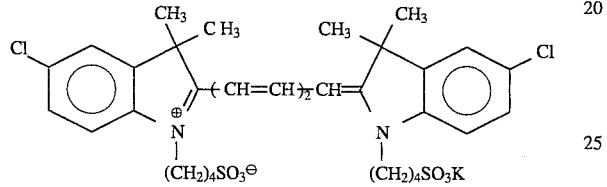

COMPARATIVE EXAMPLE II-5

An electrophotographic light-sensitive material was prepared in the same manner as in Example II-23, except for using 33.5 g of Resin (R-II-5) shown below in place of 33.5 g of Resin (B-9) used in Example II-23.

Comparative Resin (R-II-5)

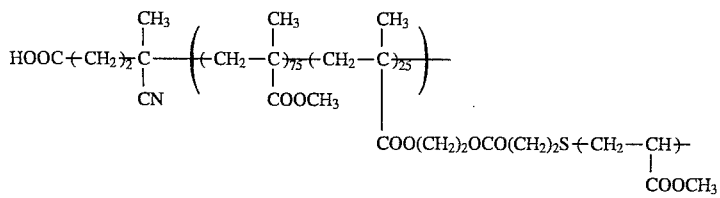

Mw: $7.5 \times 10^4$

With each of the light-sensitive materials thus prepared, various characteristics were evaluated in the same manner as in Example II-2. The results obtained are shown in Table II-5 below.

TABLE II-5

|  |  | Example II-23 | Example II-24 | Comparative Example II-5 |
|---|---|---|---|---|
| Binder Resin |  | (A-101)/(B-9) | (A-104)/(B-9) | (A-101)/(R-II-5) |
| Smoothness of Photoconductive Layer (sec/cc) |  | 400 | 410 | 400 |
| Mechanical Strength of Photoconductive Layer (%) |  | 95 | 96 | 86 |
| Electrostatic Characteristics*[7)] |  |  |  |  |
| $V_{10}$ (−V) | I (20° C., 65% RH) | 605 | 700 | 600 |
|  | II (30° C., 80% RH) | 580 | 680 | 575 |
|  | III (15° C., 30% RH) | 620 | 730 | 625 |
| D.R.R. (%) | I (20° C., 65% RH) | 95 | 97 | 93 |
|  | II (30° C., 80% RH) | 93 | 94 | 91 |
|  | III (15° C., 30% RH) | 96 | 96 | 92 |

TABLE II-5-continued

|  |  | Example II-23 | Example II-24 | Comparative Example II-5 |
|---|---|---|---|---|
| $E_{1/10}$ (lux/sec) | I (20° C., 65% RH) | 11.6 | 73 | 13.7 |
|  | II (30° C., 80% RH) | 11.0 | 8.4 | 13.3 |
|  | III (15° C., 30% RH) | 12.3 | 9.6 | 14.2 |
| Image Forming*[8] Performance | I (20° C., 65% RH) | Good | Very good | Good |
|  | II (30° C., 80% RH) | Good | Very good | Edge mark of cutting, unevenness in half tone area |
|  | III (15° C., 30% RH) | Good | Very good | Edge mark of cutting, unevenness in image portion |
| Water Retentivity of Light-Sensitive Material |  | Good | Good | Slight background stain |
| Printing Durability |  | 10,000 prints | 10,000 prints | Background stain from the start of printing |

The characteristics were evaluated in the same manner as in Example II-2, except that same electro-static characteristics and image forming performance were evaluated according to the following test methods.

*7) Measurement of Electrostatic Characteristics: $E_{1/1}Q$

The surface of the photoconductive layer was charged to −400 V with corona discharge, and then irradiated by visible light of the illuminance of 2.0 lux. Then, the time required for decay of the surface potential ($V_{10}$) to ¹/₁₀ thereof was determined, and the exposure amount $E_{1/10}$ (lux.sec) was calculated therefrom.

*8) Image Forming Performance

The electrophotographic light-sensitive material was allowed to stand for one day under the ambient condition described below, the light-sensitive material was subjected to plate making by a full-automatic plate making machine ELP-404V manufactured by Fuji Photo Film Co., Ltd.) using ELP-T as a toner. The duplicated image thus obtained was visually evaluated for fog and image quality. The ambient condition at the time of image formation was 20° C. and 65% RH (I), 30° C. and 80% RH (II) or 15° C. and 30% RH (III). The original used for the duplication was composed of cuttings of other originals pasted up thereon.

From the results, it can be seen that each of the light-sensitive materials according to the present invention exhibited good mechanical strength of the photoconductive layer. On the contrary, with the light-sensitive material of Comparative Example II-5 the value of mechanical strength was lower than them, and the value of $E_{1/10}$ of electrostatic characteristics degraded particularly under the ambient condition of low temperature and low humidity (III), while they were good under the ambient condition of normal temperature and normal humidity (I). On the other hand, the electrostatic characteristics of the light-sensitive materials according to the present invention were good. Particularly, those of Example II-24 using the resin (A') were very good. The value of $E_{1/100}$ thereof was particularly small.

With respect to image forming performance, the edge mark of cuttings pasted up was observed as background fog in the non-image areas in the light-sensitive material of Comparative Example II-5. Also, the occurrence of unevenness in half tone area of continuous gradation and unevenness of small white spots in image portion was observed on the duplicated image when the ambient conditions at the time of the image formation were high temperature and high humidity (II) and low temperature and low humidity (III).

Further, each of these light-sensitive materials was subjected to the oil-desensitizing treatment to prepare an offset printing plate and using the plate printing was conducted. The plates according to the present invention provided 10,000 prints of clear image without background stains. However, with the plate of Comparative Example II-5, the above described edge mark of cuttings pasted up was not removed with the oil-desensitizing treatment and the background stains occurred from the start of printing.

It can be seen from the results described above that only the light-sensitive materials according to the present invention can provide excellent performance.

EXAMPLE II-25

A mixture of 5 g of Resin (A-122), 35 g of Resin (B-22), 200 g of zinc oxide, 0.02 g of uranine, 0.04 g of Rose Bengal, 0.03 g of bremophenol blue, 0.40 g of phthalic anhydride and 300 g of toluene was treated in the same manner as described in Example II-24 to prepare an electrophotographic light-sensitive material.

As the result of the evaluation of various characteristics in the same manner as described in Example II-24, it can be seen that the light-sensitive material according to the present invention is excellent in charging properties, dark charge retention rate and photosensitivity, and provides a clear duplicated image free from background fog under severe conditions of high temperature and high humidity (30° C. and 80% RH) and low temperature and low humidity (15° C. and 30% RH). Further, when the material was employed as an offset master plate precursor for printing, 10,000 prints of clear image were obtained.

EXAMPLES II-26 TO II-49

Each electrophotographic light-sensitive material was prepared in the same manner as described in Example II-25, except for using 5 g of each of Resin (A) and 35 g of each of Resin (B) shown in Table II-6 below in place of 5 g of Resin (A-122) and 35 g of Resin (B- 22) used in Example II-25, respectively.

TABLE II-6

| Example | Resin (A) | Resin (B) |
|---|---|---|
| II-26 | A-102 | B-6 |
| II-27 | A-103 | B-8 |
| II-28 | A-104 | B-11 |
| II-29 | A-106 | B-13 |
| II-30 | A-107 | B-16 |
| II-31 | A-110 | B-18 |
| II-32 | A-112 | B-19 |
| II-33 | A-113 | B-20 |
| II-34 | A-114 | B-21 |
| II-35 | A-115 | B-22 |
| II-36 | A-116 | B-23 |
| II-37 | A-117 | B-17 |
| II-38 | A-123 | B-2 |
| II-39 | A-129 | B-5 |

TABLE II-6-continued

| Example | Resin (A) | Resin (B) |
|---|---|---|
| II-40 | A-130 | B-14 |
| II-41 | A-131 | B-17 |
| II-42 | A-132 | B-16 |
| II-43 | A-133 | B-1 |
| II-44 | A-124 | B-3 |
| II-45 | A-121 | B-21 |
| II-46 | A-119 | B-22 |
| II-47 | A-106 | B-23 |
| II-48 | A-105 | B-15 |
| II-49 | A-104 | B-12 |

Each of the light-sensitive materials according to the present invention was excellent in charging properties, dark charge retention rate and photosensitivity, and provided a clear duplicated image free from background fog and scratches of fine lines even under severe conditions of high temperature and high humidity (30° C. and 80% RH) and low temperature and low humidity (15° C. and 30% RH). Further, when these materials were employed as offset master plate precursors, 10,000 prints of a clear image free from background stains were obtained respectively.

EXAMPLE III-1

A mixture of 6 g (solid basis) of Resin (A-205), 34 g (solid basis) of Resin (B-1), 200 g of photoconductive zinc oxide, 0.018 g of Cyanine Dye (III-I) shown below, 0.15 g of phthalic anhydride and 300 g of toluene was dispersed by a h mogenizer manufactured by Nippon Seiki K. K.) at a rotation of $6\times10^3$ r.p.m. for 10 minutes to prepare a coating composition for a light-sensitive layer. The coating composition was coated on paper, which had been subjected to electrically conductive treatment, by a wire bar at a dry coverage of 22 g/m², followed by drying at 110° C. for 10 seconds. The coated material was then allowed to stand in a dark place at 20° C. and 65% RH (relative humidity) for 24 hours to prepare an electrophotographic light-sensitive material.

Cyanine Dye (III-I)

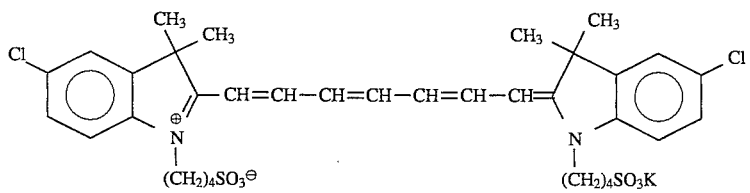

COMPARATIVE EXAMPLE III-1

An electrophotographic light-sensitive material was prepared in the same manner as in Example III-1, except for using 34 g of Resin (R-III-1) shown below in place of 34 g of Resin (B-1) used in Example III-1.

Comparative Resin (R-III-1)

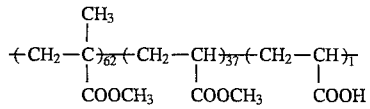

Mw: $7 \times 10^4$ (random copolymer)

COMPARATIVE EXAMPLE III-2

An electrophotographic light-sensitive material was prepared in the same manner as in Example III-1, except for using 34 g of Resin (R-III-2) shown below in place of 34 g of Resin (B-1) used in Example III-1.

Comparative Resin (R-III-2)

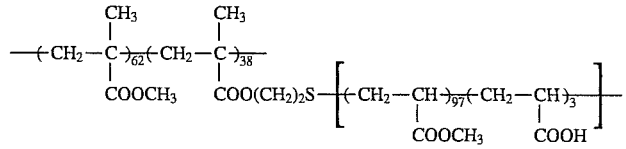

Mw: $7.5 \times 10^4$ (graft copolymer)

With each of the light-sensitive material thus prepared, electrostatic characteristics and image forming performance were evaluated. The results obtained are shown in Table III-1 below.

TABLE III-1

|  | Example III-1 | Comparative Example III-1 | Comparative Example III-2 |
|---|---|---|---|
| Electrostatic*[1] Characteristics | | | |
| $V_{10}$ (–V) | | | |
| I (20° C., 65% RH) | 730 | 700 | 720 |
| II (30° C., 80% RH) | 710 | 670 | 705 |
| III (15° C., 30% RH) | 740 | 720 | 730 |
| D.R.R. (90 sec value) (%) | | | |
| I (20° C., 65% RH) | 88 | 88 | 88 |
| II (30° C., 80% RH) | 85 | 80 | 83 |
| III (15° C., 30% RH) | 88 | 88 | 89 |
| $E_{1/10}$ (erg/cm$^2$) | | | |
| I (20° C., 65% RH) | 16.0 | 20 | 18 |
| II (30° C., 80% RH) | 14.0 | 18 | 16 |
| III (15° C., 30% RH) | 19.0 | 28 | 24 |
| Image Forming*[2] Performance | | | |
| I (20° C., 65% RH) | Very good | Good | Good |
| II (30° C., 80% RH) | Good | Unevenness in half tone area, slight background fog | Unevenness in half tone area, slight background fog |
| III (15° C., 30% RH) | Good | White spots in image portion | White spots in image portion |

The evaluation of each item shown in Table III-1 was conducted in the-following manner.

1) Electrostatic Characteristics

The light-sensitive material was charged with a corona discharge to a voltage of –6 kV for 20 seconds in a dark room using a paper analyzer ("Paper Analyzer SP- 428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

$$DRR\ (\%) = (V_{100}/V_{10}) \times 100$$

Separately, the surface of photoconductive layer was charged to –400 V with a corona discharge and then exposed to light emitted from a gallium-aluminum-arsenic semiconductor laser (oscillation wavelength: 780 nm), and the time required for decay of the surface potential $V_{10}$ to one-tenth was measured, and the exposure amount $E_{1/10}$ (erg/cm$^2$) was calculated therefrom. The measurements were conducted under ambient condition of 20° C. and 65% RH (I), 30° C. and 80% RH (II) or 15° C. and 30% RH (III).

*2) Image Forming Performance

After the light-sensitive material was allowed to stand for one day under the ambient condition shown below, the light-sensitive material was charged to –6 kV and exposed to light emitted from a gallium-aluminum-arsenic semiconductor laser (oscillation wavelength: 780 nm; output: 2.8 mW) at an exposure amount of 64 erg/cm$^2$ (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of isoparaffinic solvent Isopar G manufactured by Esso Chemical K. K.) and fixed. The duplicated image obtained was visually evaluated for fog and image quality. The ambient condition at the time of image formation was 20° C. and 65% RH (I), 30° C. and 80% RH (II) or 15° C. and 30% RH (III).

As can be seen from the results shown in Table III-1, the light-sensitive material according to the present invention exhibited good electrostatic characteristics and provided duplicated image which was clear and free from background fog, even when the ambient condition was fluctuated. On the contrary, while the light-sensitive materials of Comparative Examples III-1 and III-2 exhibited good image forming performance under the ambient condition of normal temperature and normal humidity (I), the occurrence of unevenness of density was observed in the highly accurate image portions, in particular, half tone areas of continuous gradation under the ambient condition of high temperature and high humidity (II) regardless of the electrostatic characteristics. Also, a slight background fog remained unremoved after the rinse treatment. Further, the occurrence of unevenness of small white spots at random in the image portion was observed under the ambient condition of low temperature and low humidity (III).

From all these considerations, it is thus clear that an electrophotographic light-sensitive material satisfying both requirements of electrostatic characteristics and image forming performance (in particular, for highly accurate image) and being advantageously employed particularly in a scanning exposure system using a semiconductor laser beam can be obtained only when the binder resin according to the present invention is used.

EXAMPLE III-2

A mixture of 5 g (solid basis) of Resin (A-221), 35 g (solid basis) of Resin (B-2), 200 g of photoconductive zinc oxide, 0.020 g of Methine Dye (III-II) shown below, 0.20 g of N-hydroxymaleinimide and 300 g of toluene was treated in the same manner as described in Example III-1 to prepare an electrophotographic light-sensitive material.

Methine Dye (III-II)

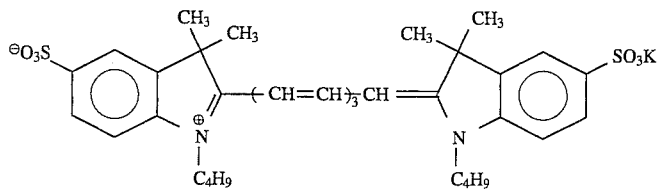

COMPARATIVE EXAMPLE III-3

An electrophotographic light-sensitive material was prepared in the same manner as in Example III-2, except for using 35 g of Resin (R-III-3) shown below in place of 35 g of Resin (B-2) used in Example III-2.

Comparative Resin (R-III-3)

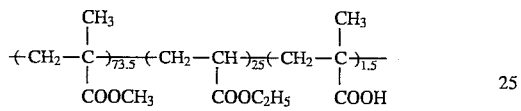

Mw: $6.5 \times 10^{4}$ (random copolymer)

COMPARATIVE EXAMPLE III-4

An electrophbtographic light-sensitive material was prepared in the same manner as in Example III-2, except for using 35 g of Resin (R-III-4) shown below in place of 35 g of Resin (B-2) used in Example III-2.

Comparative Resin (R-III-4)

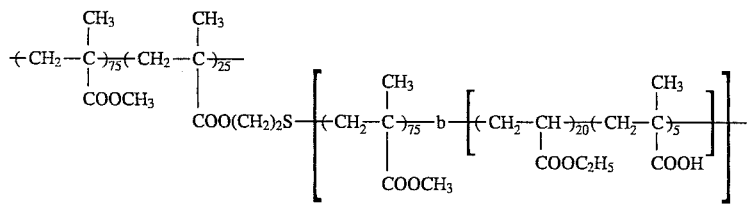

Mw: $5.5 \times 10^{4}$ (graft copolymer)

With each of the light-sensitive materials thus prepared, a film property in terms of surface smoothness, mechanical strength, electrostatic characteristics and image forming performance were evaluated. Further, printing property was evaluated when it was used as an electrophotographic lithographic printing plate precursor. The results obtained are shown in Table III-2 below.

TABLE III-2

|  |  | Example III-2 | Comparative Example III-3 | Comparative Example III-4 |
| --- | --- | --- | --- | --- |
| Smoothness of Photoconductive*[3] Layer (sec/cc) | | 400 | 410 | 405 |
| Mechanical Strength of*[4] Photoconductive Layer (%) | | 95 | 80 | 86 |
| Electrostatic Characteristics | | | | |
| $V_{10}$ (−V) | I (20° C., 65% RH) | 680 | 660 | 675 |
|  | II (30° C., 80% RH) | 665 | 640 | 660 |
|  | III (15° C., 30% RH) | 690 | 675 | 685 |
| D.R.R. (%) | I (20° C., 65% RH) | 88 | 83 | 88 |
| (90 sec value) | II (30° C., 80% RH) | 84 | 78 | 81 |
|  | III (15° C., 30% RH) | 89 | 85 | 88 |
| $E_{1/10}$ (erg/cm$^2$) | I (20° C., 65% RH) | 16.0 | 20 | 20 |

TABLE III-2-continued

|  |  | Example III-2 | Comparative Example III-3 | Comparative Example III-4 |
|---|---|---|---|---|
|  | II (30° C., 80% RH) | 15.0 | 17 | 18 |
|  | III (15° C., 30% RH) | 19.2 | 29 | 24 |
| Image Forming | I (20° C., 65% RH) | Good | Good | Good |
| Performance | II (30° C., 80% RH) | Good | Unevenness in half tone area | Slight unevenness in half tone area |
|  | III (15° C., 30% RH) | Good | Unevenness in half tone area, unevenness of white spots in image portion | Unevenness in half tone area, unevenness of white spots in image portion |
| Water Retentivity of[*5] Light-Sensitive Material |  | No background stain at all | Background stain | Slight background stain |
| Printing Durability[*6] |  | 10,000 prints | 4,500 prints | 6,000 prints |

The evaluation of each item shown in Table III-2 was conducted in the following manner.

*3) smoothness of Photoconductive Layer

The smoothness (sec/cc) of the light-sensitive material was measured using a Beck's smoothness test machine manufactured by Kumagaya Riko K. K.) under an air volume condition of 1 cc.

*4) Mechanical Strength of Photoconductive Layer

The surface of the light-sensitive material was repeatedly (1000 times) rubbed with emery paper (#1000) under a load of 75 g/cm$^2$ using a Heidon 14 Model surface testing machine manufactured by Shinto Kagaku K. K.). After dusting, the abrasion loss of the photoconductive layer was measured to obtain film retention (%).

*5) Water Retentivity of Light-Sensitive Material

A light-sensitive material without subjecting to plate making was passed twice through an etching processor using an aqueous solution obtained by diluting an oil-desensitizing solution ELP-EX (produced by Fuji Photo Film Co., Ltd.) to a five-fold volume with distilled water to conduct an oil-desensitizing treatment of the surface of the photoconductive layer. The material thus-treated was mounted on an offset printing machine ("611XLA-II Model" manufactured by Hamada Printing Machine Manufacturing Co.) and printing was conducted using distilled water as dampening water. The extent of background stain occurred on the 50th print was visually evaluated. This testing method corresponds to evaluation of water retentivity after oil-desensitizing treatment of the light-sensitive material under the forced condition.

*6) Printing Durability

The light-sensitive material was subjected to plate making in the same manner as described in *2) above to form toner images, and the surface of the photoconductive layer was subjected to oil-desensitization treatment by passing twice through an etching processor using ELP-EX. The resulting lithographic printing plate was mounted on an offset printing machine ("Oliver Model 52",manufactured by Sakurai Seisakusho K. K.) for printing. The number of prints obtained until background stains in the non-image areas appeared or the quality of the image areas was deteriorated was taken as the printing durability. The larger the number of the prints, the higher the printing durability.

As shown in Table III-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic and adhesion of ink was not observed at all as a result of the evaluation of water retentivity under the forced condition. On practical printing using the resulting master plate, 10,000 prints of clear image without background stains were obtained.

On the contrary, with the light-sensitive materials of Comparative Examples III-3 and III-4, the occurrence of slight background stain in non-image area, unevenness in highly accurate image of continuous gradation and unevenness of white spots in image portion was observed when the image formation was conducted under severe conditions. Further, as a result of the test on water retentivity of these light-sensitive materials to make offset master plates, the adhesion of ink was observed. The printing durability thereof was at most 4,000 to 6,000 prints.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES III-3 TO III-22

Each electrophotographic light-sensitive material was prepared in the same manner as described in Example III-2, except for using each of Resins (A) and Resins (B) shown in Table III-3 below in place of Resin (A-221) and Resin (B-2) used in Example III-2, respectively.

TABLE III-3

| Example | Resin (A) | Resin (B) |
|---|---|---|
| III-3 | A-203 | B-1 |
| III-4 | A-204 | B-3 |
| III-5 | A-206 | B-4 |
| III-6 | A-207 | B-5 |
| III-7 | A-208 | B-7 |
| III-8 | A-209 | B-9 |
| III-9 | A-210 | B-10 |
| III-10 | A-211 | B-11 |
| III-11 | A-213 | B-12 |
| III-12 | A-214 | B-13 |
| III-13 | A-215 | B-14 |
| III-14 | A-216 | B-15 |

TABLE III-3-continued

| Example | Resin (A) | Resin (B) |
|---|---|---|
| III-15 | A-218 | B-16 |
| III-16 | A-221 | B-17 |
| III-17 | A-222 | B-18 |
| III-18 | A-223 | B-19 |
| III-19 | A-214 | B-20 |
| III-20 | A-212 | B-21 |
| III-21 | A-210 | B-22 |
| III-22 | A-207 | B-23 |

The electrostatic characteristics and image forming performance of each of the light-sensitive materials were determined in the same manner as described in Example III-1. Each light-sensitive material exhibited good electrostatic characteristics. As a result of the evaluation on image forming performance of each light-sensitive material, it was found that clear duplicated images having good reproducibility of fine lines and letters and no occurrence of unevenness in half tone areas without the formation of background fog were obtained.

Further, when these electrophotographic light-sensitive materials were employed as offset master plate precursors under the same printing condition as described in Example III-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics and printing property.

EXAMPLES III-23 TO III-26

Each electrophotographic light-sensitive material was prepared in the same manner as described in Example III-1, except for using each of the dye shown in Table III-4 below in place of Cyanine Dye (III-I) used in Example III-1.

TABLE III-4

| Example | Dye | Chemical Structure of Dye |
|---|---|---|
| III-23 | (III-III) | 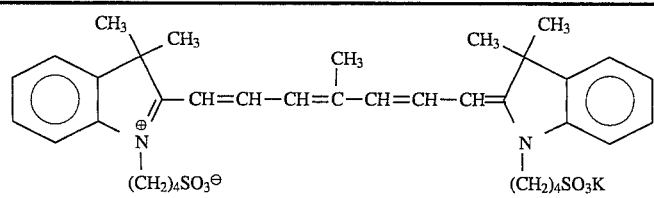 |
| III-24 | (III-IV) | 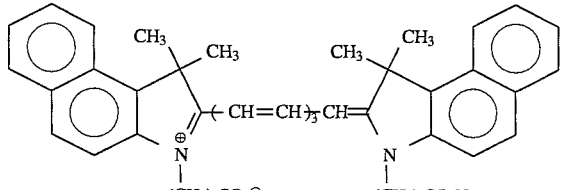 |
| III-25 | (III-V) | 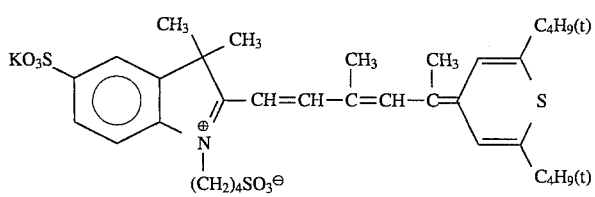 |
| III-26 | (III-VI) | 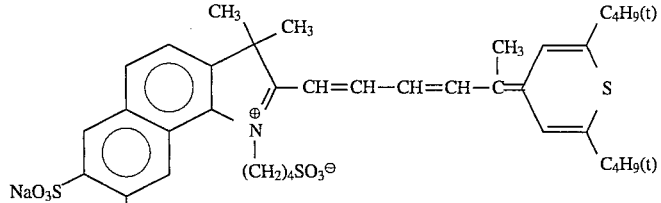 |

Each of the light-sensitive materials according to the present invention was excellent in charging properties, dark charge retention rate and photosensitivity, and provided clear duplicated images free from background fog even when processed under severe conditions of high temperature and high humidity (30° C. and 80% RH) and low temperature and low humidity (15° C. and 30% RH).

EXAMPLES III-27 AND III-28

A mixture of 6.5 g of Resin (A-201) (Example III-27) or Resin (A-207) (Example III-28), 33.5 g of Resin (B-23), 200 g of zinc oxide, 0.02 g of uranine, 0.03 g of Methine Dye (III-VII) shown below, 0.03 g of Methine Dye (III-VIII) shown below, 0.18 g of p-hydroxybenzoic acid and 300 g of toluene was dispersed by a homogenizer at a rotation of $7 \times 10^3$ r.p.m. for 10 minutes to prepare a coating composition for a light-sensitive layer. The coating composition was coated on paper, which had been subjected to electrically conductive treatment, by a wire bar at a dry coverage of 25 $g/m^2$, and dried for 20 seconds at 110° C. Then, the coated material was allowed to stand in a dark place for 24 hours under the conditions of 20° C. and 65% RH to prepare each electrophotographic light-sensitive material.

Methine Dye (III-VII)

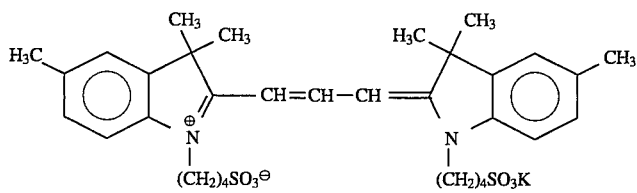

Methine Dye (III-VIII)

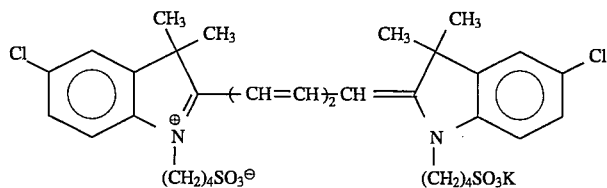

COMPARATIVE EXAMPLE III-5

An electrophotographic light-sensitive material was prepared in the same manner as in Example III-27, except for using Resin (R-III-5) shown below in place of 33.5 g of Resin (B-23) used in Example III-27.

Comparative Resin (R-III-5)

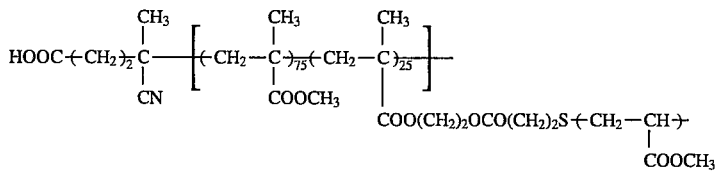

Mw: $7.5 \times 10^4$

With each of the light-sensitive materials thus prepared, various characteristics were evaluated in the same manner as in Example III-2. The results obtained are shown in Table III-5 below.

TABLE III-5

|  | Example III-27 | Example III-28 | Comparative Example III-5 |
|---|---|---|---|
| Binder Resin | (A-201)/(B-23) | (A-207)/(B-23) | (A-201)/(R-III-5) |
| Smoothness of Photoconductive Layer (sec/cc) | 405 | 410 | 410 |

TABLE III-5-continued

| | | Example III-27 | Example III-28 | Comparative Example III-5 |
|---|---|---|---|---|
| Mechanical Strength of Photoconductive Layer (%) | | 96 | 95 | 86 |
| Electrostatic Characteristics*[7] | | | | |
| $V_{10}$ (-V) | I (20° C., 65% RH) | 600 | 730 | 600 |
| | II (30° C., 80% RH) | 580 | 715 | 575 |
| | III (15° C., 30% RH) | 615 | 740 | 620 |
| D.R.R. (%) | I (20° C., 65% RH) | 90 | 96 | 90 |
| | II (30° C., 80% RH) | 87 | 94 | 85 |
| | III (15° C., 30% RH) | 91 | 96 | 91 |
| $E_{1/10}$ (lux/sec) | I (20° C., 65% RH) | 10.3 | 8.5 | 11.8 |
| | II (30° C., 80% RH) | 9.8 | 8.0 | 11.0 |
| | III (15° C., 30% RH) | 12.5 | 10.1 | 13.3 |
| Image Forming*[8] Performance | I (20° C., 65% RH) | Good | Very good | Good |
| | II (30° C., 80% RH) | Good | Very good | Edge mark of cutting, unevenness in half tone area |
| | III (15° C., 30% RH) | Good | Very good | Edge mark of cutting, unevenness in image portion |
| Water Retentivity of Light-Sensitive Material | | Good | Good | Slight background stain |
| Printing Durability | | 10,000 prints | 10,000 prints | Background stain from the start of printing |

The characteristics were evaluated in the same manner as in Example III-2, except that same electro-static characteristics and image forming performance were evaluated according to the following test methods.

*7J Measurement of Electrostatic Characteristics: $E_{1/10}$

The surface of the photoconductive layer was charged to −400 V with corona discharge, and then irradiated by visible light of the illuminance of 2.0 lux. Then, the time required for decay of the surface potential ($V_{10}$) to $1/10$ thereof was determined, and the exposure amount $E_{1/10}$ (lux.sec) was calculated therefrom.

8) Image Forming Performance

The electrophotographic light-sensitive material was allowed to stand for one day under the ambient condition described below, the light-sensitive material was subjected to plate making by a full-automatic plate making machine ELP-404V manufactured by Fuji Photo Film Co., Ltd.) using ELP-T as a toner. The duplicated image thus obtained was visually evaluated for fog and image quality. The ambient condition at the time of image formation was 20° C. and 65% RH (I), 30° C. and 80% RH (II) or 15° C. and 30% RH (III). The original used for the duplication was composed of cuttings of other originals pasted up thereon.

From the results, it can be seen that each of the light-sensitive materials according to the present invention exhibited good mechanical strength of the photoconductive layer. On the contrary, with the light-sensitive material of Comparative Example III-5 the value of mechanical strength was lower than them, and the value of $E_{1/10}$ of electrostatic characteristics degraded particularly under the ambient condition of low temperature and low humidity (III), while they were good under the ambient condition of normal temperature and normal humidity (I). On the other hand, the electrostatic characteristics of the light-sensitive materials according to the present invention were good. Particularly, those of Example III-28 using the resin (A') were very good. The value of $E_{1/10}$ thereof was particularly small.

With respect to image forming performance, the edge mark of cuttings pasted up was observed as background fog in the non-image areas in the light-sensitive material of Comparative Example III-5. Also, the occurrence of unevenness in half tone area of continuous gradation and unevenness of small white spots in image portion was observed on the duplicated image when the ambient conditions at the time of the image formation were high temperature and high humidity (II) and low temperature and low humidity (III). On the contrary, the light-sensitive materials according to the present invention provided clear images free from background fog.

Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example III-5, the above described edge mark of cuttings pasted up was not removed with the oil-desensitizing treatment and the background stains occurred from the start of printing.

It can be seen from the results described above that the light-sensitive materials according to the present invention was satisfactory in all aspects of the surface smoothness and film strength of the photoconductive layer, electrostatic characteristics and printing property. Further, .it can be seen that the electrostatic characteristics are further improved by the use of the resin (A').

EXAMPLE III-29

A mixture of 5 g of Resin (A-223), 35 g of Resin (B-22), 200 g of zinc oxide, 0.02 g of uranine, 0.04 g of Rose Bengal, 0.03 g of bremophenol blue, 0.40 g of phthalic anhydride and 300 g of toluene was treated in the same manner as described in Example III-27 to prepare an electrophotographic light-sensitive material.

As the result of the evaluation of various characteristics in the same manner as described in Example III-27, it can be seen that the light-sensitive material according to the present invention is excellent in charging properties, dark charge retention rate and photosensitivity, and provides a clear duplicated image free from background fog under severe conditions of high temperature and high humidity (30° C. and 80% RH) and low temperature and low humidity (15° C. and 30% RH). Further, when the material was employed as an offset master plate precursor, 10,000 prints of clear image were obtained.

EXAMPLES III-30 TO III-53

Each electrophotographic light-sensitive material was prepared in the same manner as described in Example III-29, except for using 5 g of each of Resin (A) and 35 g of each of Resin (B) shown in Table III-6 below in place of 5 g of Resin (A-223) and 35 g of Resin (B-22) used in Example III-29, respectively.

TABLE III-6

| Example | Resin (A) | Resin (B) |
|---------|-----------|-----------|
| III-30  | A-201     | B-3       |
| III-31  | A-202     | B-2       |
| III-32  | A-203     | B-7       |
| III-33  | A-204     | B-8       |
| III-34  | A-205     | B-9       |
| III-35  | A-206     | B-12      |
| III-36  | A-208     | B-13      |

TABLE III-6-continued

| Example | Resin (A) | Resin (B) |
|---------|-----------|-----------|
| III-37  | A-210     | B-14      |
| III-38  | A-211     | B-15      |
| III-39  | A-212     | B-16      |
| III-40  | A-213     | B-17      |
| III-41  | A-214     | B-18      |
| III-42  | A-215     | B-20      |
| III-43  | A-216     | B-21      |
| III-44  | A-217     | B-23      |
| III-45  | A-218     | B-22      |
| III-46  | A-219     | B-11      |
| III-47  | A-220     | B-11      |
| III-48  | A-221     | B-9       |
| III-49  | A-222     | B-12      |
| III-50  | A-223     | B-23      |
| III-51  | A-214     | B-9       |
| III-52  | A-210     | B-16      |
| III-53  | A-223     | B-22      |

Each of the light-sensitive materials according to the present invention was excellent in charging properties, dark charge retention rate and photosensitivity, and provided a clear duplicated image free from background fog and scratches of fine lines even under severe conditions of high temperature and high humidity (30° C. and 80% RH) and low temperature and low humidity (15° C. and 30% RH). Further, when these materials were employed as offset master plate precursors, 10,000 prints of a clear image free from background stains were obtained respectively.

EXAMPLE IV-1

A mixture of 8 g (solid basis) of Resin (A-7), 32 g (solid basis) of Resin (B-101), 200 g of photoconductive zinc oxide, 0.017 g of Methine Dye (IV-I) shown below, 0.18 g of phthalic anhydride and 300 g of toluene was dispersed by a homogenizer manufactured by Nippon Seiki K. K.) at a rotation of $6\times10^3$ r.p.m. for 7 minutes to prepare a coating composition for a light-sensitive layer. The coating composition was coated on paper, which had been subjected to electrically conductive treatment, by a wire bar at a dry coverage of 20 g/m² followed by drying at 100° C. for 30 seconds. The coated material was then allowed to stand in a dark place at 20° C. and 65% RH for 24 hours to prepare an electrophotographic light-sensitive material.

Methine Dye (IV-I)

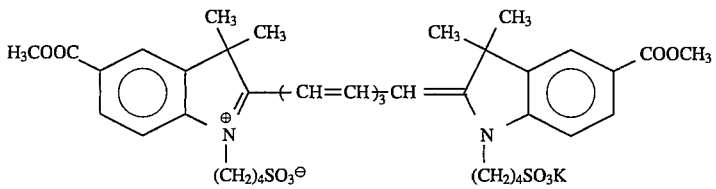

COMPARATIVE EXAMPLE IV-1

An electrophotographic light-sensitive material was prepared in the same manner as in Example IV-1, except for using 32 g of Resin (R-IV-1) shown below in place of 32 g of Resin (B-101) used in Example IV-1.

Comparative Resin (R-IV-1)

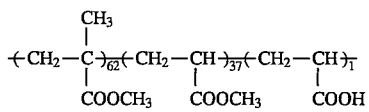

Mw: $8 \times 10^4$ (random copolymer)

COMPARATIVE EXAMPLE IV-2

An electrophotographic light-sensitive material was prepared in the same manner as in Example IV-1, except for using 32 g of Resin (R-IV-2) shown below in place of 32 g of Resin (B-101) used in Example IV-1.

Comparative Resin (R-IV-2)

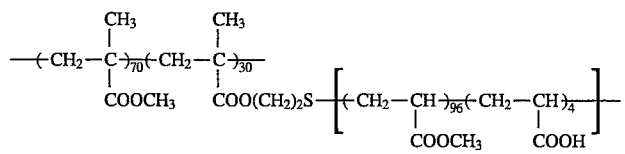

Mw: $6.3 \times 10^4$ (graft copolymer)

COMPARATIVE EXAMPLE IV-3

An electrophotographic light-sensitive material was prepared in the same manner as in Example IV-1, except for using 32 g of Resin (R-IV-3) shown below in place of 32 g of Resin (B-101) used in Example IV-1.

Comparative Resin (R-IV-3)

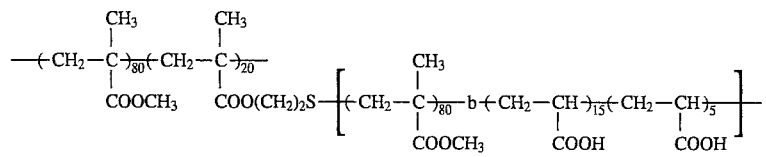

Mw: 6 × 10⁴ (AB block graft copolymer)

With each of the light-sensitive material thus prepared, mechanical strength of photoconductive layer, electrostatic characteristics and image forming performance were evaluated. The results obtained are shown in Table IV-1 below.

to light emitted from a gallium-aluminum-arsenic semiconductor laser (oscillation wavelength: 780 nm), and the time required for decay of the surface potential $V_{10}$ to one-tenth was measured, and the exposure amount $E_{1/10}$

TABLE IV-1

|  |  | Example IV-1 | Comparative Example IV-1 | Comparative Example IV-2 | Comparative Example IV-3 |
|---|---|---|---|---|---|
| Mechanical Strength of*[1] photoconductive layer |  | 95% | 75% | 85% | 86% |
| Electrostatic Characteristics*[2] |  |  |  |  |  |
| $V_{10}$ (−V) | I (20° C., 65% RH) | 635 | 600 | 610 | 600 |
|  | II (30° C., 80% RH) | 620 | 575 | 590 | 585 |
| D.R.R. (90 sec value) (%) |  |  |  |  |  |
|  | I (20° C., 65% RH) | 88 | 84 | 85 | 85 |
|  | II (30° C., 80% RH) | 83 | 78 | 80 | 81 |
| $E_{1/10}$ | I (20° C., 65% RH) | 22 | 30 | 28 | 28 |
| (erg/cm²) | II (30° C., 80% RH) | 26 | 35 | 34 | 33 |
| $E_{1/100}$ | I (20° C., 65% RH) | 35 | 51 | 46 | 43 |
| (erg/cm²) | II (30° C., 80% RH) | 43 | 77 | 70 | 68 |
| Image Forming Performance*[3] |  |  |  |  |  |
|  | I (20° C., 65% RH) | Very good | Scratches of fine lines and letters, unevenness in half tone area | Scratches of fine lines and letters, unevenness in half tone area | Scratches of fine lines and unevenness in half tone area |
|  | II (30° C., 80% RH) | Very good | Scratches of fine lines and letters, unevenness in half tone area | Scratches of fine lines and letters, unevenness in half tone area | Scratches of fine lines and letters, unevenness in half tone area |

The evaluation of each item shown in Table IV-1 was conducted in the following manner.
1) Mechanical Strength of Photoconductive Layer The surface of the light-sensitive material was repeatedly (1500 times) rubbed with emery paper (#000) under a load of 50 g/cm² using a Heidon 14 Model surface testing machine manufactured by Shinto Kagaku K. K.). After dusting, the abrasion loss of the photoconductive layer was measured to obtain film retention (%).
*2) Electrostatic Characteristics The light-sensitive material was charged with a corona discharge to a voltage of −6 kV for 20 seconds in a dark room using a paper analyzer ("Paper Analyzer SP- 428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

DRR (%)=($V_{100}/V_{10}$)×100

Separately, the surface of photoconductive layer was charged to −400 V with a corona discharge and then exposed (erg/cm²) was calculated therefrom. Further, in the same manner as described above the time required for decay of the surface potential $V_{10}$ to one-hundredth was measured, and the exposure amount $E_{1/100}$ (erg/cm²) was calculated therefrom. The measurements were conducted under ambient condition of 20° C. and 65% RH (I) or 30° C. and 80% RH (II).
*3) Image Forming Performance After the light-sensitive material was allowed to stand for one day under the ambient condition shown below, the light-sensitive material was charged to −6 kV and exposed to light emitted from a gallium-aluminum-arsenic semiconductor laser (oscillation wavelength: 780 nm; output: 2.8 mW) at an exposure amount of 64 erg/cm² (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of isoparaffinic solvent Isopar G manufactured by Esso Chemical K. K.) and fixed. The duplicated image obtained was visually evaluated for fog and image quality. The ambient condition at the time of image formation was 20° C. and 65% RH (I) or 30° C. and 80% RH (II).

As can be seen from the results shown in Table IV-1, the light-sensitive material according to the present invention had good electrostatic characteristics. The duplicated image obtained thereon was clear and free from background fog. On the contrary, with the light-sensitive materials of Comparative Examples IV-1, IV-2 and IV-3, the decrease in photosensitivity ($E_{1/10}$ and $E_{1/100}$) occurred, and in the duplicated images the scratches of fine lines and letters were observed and a background fog remained unremoved after the rinse treatment. Further, the occurrence of unevenness in half tone areas of continuous gradation of the original was observed regardless of the electrostatic characteristics.

The value of $E_{1/100}$ is largely different between the light-sensitive material of the present invention and those of the comparative examples. The value of $E_{1/100}$ indicates an electrical potential remaining in the non-image areas after exposure at the practice of image formation. The smaller the value, the less the background fog in the non-image areas. More specifically, it is required that the remaining potential is decreased to $-10V$ or less. Therefore, an amount of exposure necessary to make the remaining potential below $-10V$ is an important factor. In the scanning exposure system using a semiconductor laser beam, it is quite important to make the remaining potential below $-10V$ by a small exposure amount in view of a design for an optical system of a duplicator (such as cost of the device, and accuracy of the optical system).

From all these considerations, it is thus clear that an electrophotographic light-sensitive material satisfying both requirements of electrostatic characteristics and image forming performance and being advantageously employed particularly in a scanning exposure system using a semiconductor laser beam can be obtained only using the binder resin according to the present invention.

EXAMPLE IV-2

A mixture of 6 g (solid basis) of Resin (A-10), 34 g (solid basis) of Resin (B-102), 200 g of photoconductive zinc oxide, 0.020 g of Methine Dye (IV-II) shown below, 0.20 g of N-hydroxymaleinimide and 300 g of toluene was treated in the same manner as described in Example IV-1 to prepare an electrophotographic light-sensitive material.

Methine Dye (III-II)

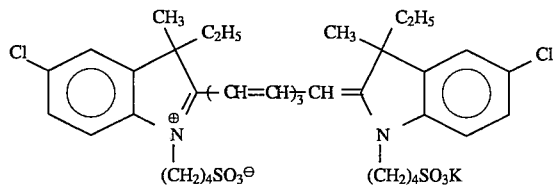

With the light-sensitive material thus-prepared, a film property in terms of surface smoothness, electrostatic characteristics and image forming performance were evaluated. Further, printing property was evaluated when it was used as an electrophotographic lithographic printing plate precursor. The results obtained are shown in Table IV-2 below.

TABLE IV-2

|  |  | Example IV-2 |
|---|---|---|
| Smoothness of Photoconductive Layer*[4] |  | 300 |
| Electrostatic Characteristics |  |  |
| $V_{10}$ (−V) | I (20° C., 65% RH) | 640 |
|  | II (30° C., 80% RH) | 625 |
| D.R.R. | I (20° C., 65% RH) | 88 |
| (90 sec value) (%) |  |  |
|  | II (30° C., 80% RH) | 83 |
| $E_{1/10}$ (erg/cm$^2$) | I (20° C., 65% RH) | 20 |

TABLE IV-2-continued

|  |  | Example IV-2 |
|---|---|---|
|  | II (30° C., 80% RH) | 25 |
| $E_{1/100}$ (erg/cm$^2$) | I (20° C., 65% RH) | 31 |
|  | II (30° C., 80% RH) | 40 |
| Image Forming Performance |  |  |
|  | I (20° C., 65% RH) | Very good |
|  | II (30° C., 80% RH) | Very good |
| Contact Angle with Water*[5] (°) |  | 0 |
| Printing Durability*[6] |  | 10,000 prints |

The evaluation of each item shown in Table IV-2 was conducted in the following manner.

*4) Smoothness of Photoconductive Layer

The smoothness (sec/cc) of the light-sensitive material was measured using a Beck's smoothness test machine manufactured by Kumagaya Riko K. K.) under an air volume condition of 1 cc.

*5) Contact Anqle with Water

The light-sensitive material was passed once through an etching processor using a solution prepared by diluting an oil-desensitizing solution ELP-EX (produced by Fuji Photo Film Co., .Ltd.) to a two-fold volume with distilled water to conduct oil-desensitization treatment on the surface of the photoconductive layer. On the thus oil-desensitized surface was placed a drop of 2 μl of distilled water, and the contact angle formed between the surface and water was measured using a goniometer.

*6) Printing Durability

The light-sensitive material was subjected to plate making in the same manner as described in *3) above to form toner images, and the surface of the photoconductive layer was subjected to oil-desensitization treatment under the same condition as in *5) above. The resulting lithographic printing plate was mounted on an offset printing machine ("Oliver Model 52", manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table IV-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 0° with water. On practical printing using the resulting master plate, 10,000 prints of clear image without background stains were obtained.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES IV-3 TO IV-20

Each electrophotographic light-sensitive material was prepared in the same manner as described in Example IV-2, except for using each of Resins (A) and Resins (B) shown in Table IV-3 below in place of Resin (A-10) and Resin (B-102) used in Example IV-2, respectively.

TABLE IV-3

| Example | Resin (A) | Resin (B) |
|---|---|---|
| IV-3 | A-2 | B-104 |
| IV-4 | A-3 | B-105 |
| IV-5 | A-4 | B-106 |
| IV-6 | A-5 | B-107 |
| IV-7 | A-6 | B-108 |
| IV-8 | A-8 | B-109 |
| IV-9 | A-9 | B-110 |
| IV-10 | A-11 | B-112 |
| IV-11 | A-12 | B-113 |
| IV-12 | A-13 | B-114 |
| IV-13 | A-14 | B-115 |
| IV-14 | A-16 | B-116 |
| IV-15 | A-17 | B-118 |
| IV-16 | A-19 | B-119 |
| IV-17 | A-22 | B-120 |
| IV-18 | A-23 | B-122 |
| IV-19 | A-27 | B-124 |
| IV-20 | A-28 | B-127 |

The electrostatic characteristics of the resulting light-sensitive materials were evaluated in the same manner as described in Example IV-2, and good results were obtained.

As a result of the evaluation on image forming performance of each light-sensitive material, it was found that clear duplicated images having good reproducibility of fine lines and letters and no occurrence of unevenness in half tone areas without the formation of background fog were obtained.

Further, when these electrophotographic light-sensitive materials were employed as offset master plate precursors under the same printing condition as described in Example IV-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics, and printing property.

EXAMPLES IV-21 TO IV-24

Each electrophotographic light-sensitive material was prepared in the same manner as described in Example IV-1, except for using each of the dye shown in Table IV-4 below in place of Methine Dye (IV-I) used in Example IV-1.

TABLE IV-4

| Example | Dye | Chemical Structure of Dye |
|---|---|---|
| IV-21 | (IV-III) | 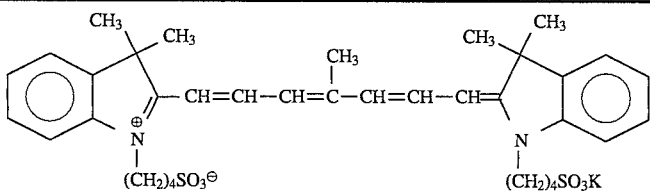 |
| IV-22 | (IV-IV) | 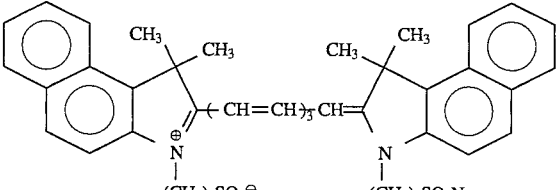 |
| IV-23 | (IV-V) | 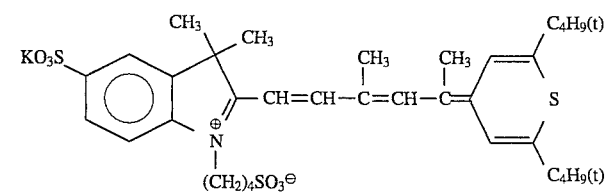 |
| IV-24 | (IV-VI) | 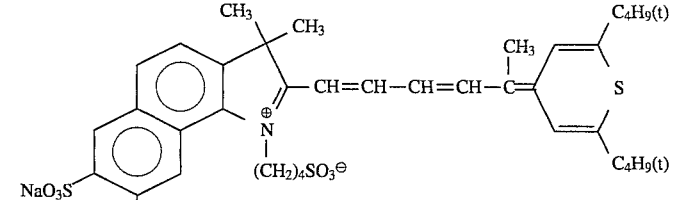 |

Each of the light-sensitive materials according to the present invention was excellent in charging properties, dark charge retention rate and photosensitivity, and provided clear duplicated images free from background fog even when processed under severe condition of high temperature and high humidity (30° C. and 80% RH).

EXAMPLES IV-25 AND IV-26

A mixture of 6.5 g of Resin (A-1) (Example IV-25) or Resin (A-18) (Example IV-26), 33.5 g of Resin (B- 130), 200 g of zinc oxide, 0.02 g of uranine, 0.035 g of Rose Bengal, 0.025 g of bremophenol blue, 0.18 g of p-hydroxybenzoic acid and 300 g of toluene was dispersed by a homogenizer at a rotation of $7 \times 10^3$ r.p.m. for 6 minutes to prepare a coating composition for a light-sensitive layer. The coating composition was coated on paper, which had been subjected to electrically conductive treatment, by a wire bar at a dry coverage of 25 g/m², and dried for 20 seconds at 110° C. Then, the coated material was allowed to stand in a dark place for 24 hours under the -conditions of 20° C. and 65% RH to prepare each electrophotographic light-sensitive material.

COMPARATIVE EXAMPLE IV-4

An electrophotographic light-sensitive material was prepared in the same manner as in Example IV-25, except for using 33.5 g of Comparative Resin (R-IV-2) described above in place of 33.5 g of Resin (B-130) used in Example IV-25.

With each of the light-sensitive materials thus prepared, various characteristics were evaluated in the same manner as in Example IV-2. The results obtained are shown in Table IV-5 below.

for decay of the surface potential ($V_{10}$) to 1/10 or 1/100 thereof was determined, and the exposure amount $E_{1/10}$ or $E_{1/100}$ (lux.sec) was calculated therefrom.

*8) Image Forming Performance

The electrophotographic light-sensitive material was allowed to stand for one day under the ambient condition described below, the light-sensitive material was subjected to plate making by a full-automatic plate making/machine ELP-404V manufactured by Fuji Photo Film Co., Ltd.) using ELP-T as a toner. The duplicated image thus obtained was visually evaluated for fog and image quality. The ambient condition at the time of image formation was 20° C. and 65% RH (I) or 30° C. and 80% RH (II). The original used for the duplication was composed of cuttings of other originals pasted up thereon.

From the results shown above, it can be seen that each light-sensitive material exhibited a most same properties with respect to the surface smoothness and mechanical strength of the photoconductive layer. However, on the electrostatic characteristics, the light-sensitive material of Comparative Example IV-4 had the particularly large value of photosensitivity $E_{1/100}$, and this tendency increased under the high temperature and high humidity condition. On the contrary, the electrostatic characteristics of the light-sensitive materials according to the present invention were good. Particularly, those of Example IV-26 using the resin (A') were very good. The value of $E_{1/100}$ thereof was particularly small.

With respect to image forming performance, the edge mark of cuttings pasted up was observed as background fog in the non-image areas in the light-sensitive material of Comparative Example IV-4. On the contrary, the light-sensitive materials according to the present invention provided clear duplicated images free from background fog.

TABLE IV-5

| | | Example IV-25 | Example IV-26 | Comparative Example IV-4 |
|---|---|---|---|---|
| Binder Resin | | (A-1)/(B-130) | (A-18)/(B-130) | (A-1)/(R-IV-2) |
| Smoothness of Photoconductive Layer (sec/cc) | | 280 | 290 | 260 |
| Electrostatic Characteristics*7) | | | | |
| $V_{10}$ (−V) | I (20° C., 65% RH) | 570 | 650 | 550 |
| | II (30° C., 80% RH) | 550 | 635 | 525 |
| D.R.R. (%) | I (20° C., 65% RH) | 85 | 9 2 | 83 |
| | II (30° C., 80% RH) | 80 | 87 | 77 |
| $E_{1/10}$ (lux/sec) | I (20° C., 65% RH) | 10.5 | 7.6 | 13.5 |
| | II (30° C., 80% RH) | 11.3 | 8.8 | 14.2 |
| $E_{1/100}$ (lux/sec) | I (20° C., 65% RH) | 17 | 12 | 21 |
| | II (30° C., 80% RH) | 19 | 14 | 23 |
| Image Forming*8) Performance | I (20° C., 65% RH) | Good | Very good | Edge mark of cutting |
| | II (30° C., 80% RH) | Good | Very good | Edge mark of cutting, unevenness in half tone area |
| Contact Angle with Water (°) | | 0 | 0 | 0 |
| Printing Durability | | 10,000 prints | 10,000 prints | Background stain due to edge mark of cutting occurred from the start of printing |

The characteristics were evaluated in the same manner as in Example IV-2, except that same electrostatic characteristics and image forming performance were evaluated according to the following test methods.

*7) Measurement of Electrostatic Characteristics: $E_{1/10}$ and $E_{1/100}$

The surface of the photoconductive layer was charged to −400 V with corona discharge, and then irradiated by visible light of the illuminance of 2.0 lux. Then, the time required Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example IV-4, the above described edge mark of cuttings pasted up was not removed with the oil-desensitizing treatment and the background stains occurred from the start of printing.

It can be seen from the results described above that only the light-sensitive materials according to the present invention can provide excellent performance.

EXAMPLES IV-27 TO IV-42

Each electrophotographic light-sensitive material was prepared in the same manner as described in Example IV-25, except for using 6.5 g of each of Resin (A) and 33.5 g of each of Resin (B) shown in Table IV-6 below in place of 6.5 g of Resin (A-1) and 33.5 g of Resin (B-130) used in Example IV-25, respectively.

TABLE IV-6

| Example | Resin (A) | Resin (B) |
|---------|-----------|-----------|
| IV-27 | A-2 | B-111 |
| IV-28 | A-4 | B-117 |
| IV-29 | A-5 | B-121 |
| IV-30 | A-8 | B-123 |
| IV-31 | A-9 | B-124 |
| IV-32 | A-20 | B-126 |
| IV-33 | A-21 | B-128 |
| IV-34 | A-22 | B-129 |
| IV-35 | A-24 | B-130 |
| IV-36 | A-25 | B-103 |
| IV-37 | A-26 | B-122 |
| IV-38 | A-29 | B-124 |
| IV-39 | A-17 | B-115 |
| IV-40 | A-19 | B-116 |
| IV-41 | A-14 | B-118 |
| IV-42 | A-15 | B-119 |

Each of the light-sensitive materials according to the present invention was excellent in charging properties, dark charge retention rate and photosensitivity, and provided a clear duplicated image free from background fog even under severe condition of high temperature and high humidity (30° C. and 80% RH). Further, when these materials were employed as offset master plate precursors, more than 10,000 prints of a clear image free from background stains were obtained respectively. Moreover, the light-sensitive materials using the resin (A') containing a methacrylate component substituted with the specific aryl group exhibited better performance.

EXAMPLE V-1

A mixture of 8 g (solid basis) of Resin (A-104), 32 g (solid basis) of Resin (B-101), 200 g of photoconductive zinc oxide, 0.017 g of Methine Dye (V-I) shown below, 0.18 g of phthalic anhydride and 300 g of toluene was dispersed by a homogenizer manufactured by Nippon Seiki K. K.) at a rotation of $6 \times 10^3$ r.p.m. for 7 minutes to prepare a coating composition for a light-sensitive layer. The coating composition was coated on paper, which had been subjected to electrically conductive treatment, by a wire bar at a dry coverage of 25 g/m² followed by drying at 100° C. for 30 seconds The coated material was then allowed to stand in a dark place at 20° C. and 65% RH for 24 hours to prepare an electrophotographic light-sensitive material.

Methine Dye (V-I)

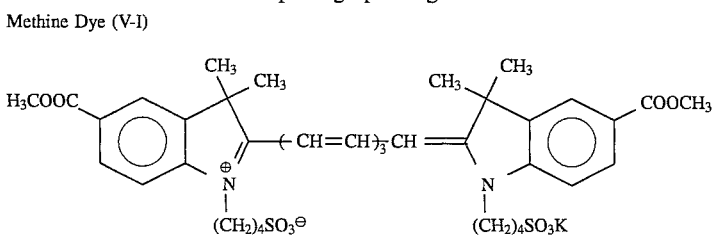

COMPARATIVE EXAMPLE V-1

An electrophotographic light-sensitive material was prepared in the same manner as in Example V-1, except for using 32 g of Resin (R-V-1) shown below in place of 32 g of Resin (B-101) used in Example V-1.

Comparative Resin (R-V-1)

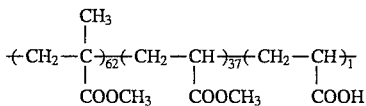

Mw: $8 \times 10^4$ (random copolymer)

COMPARATIVE EXAMPLE V-2

An electrophotographic light-sensitive material was prepared in the same manner as in Example V-1, except for using 32 g of Resin (R-V-2) shown below in place of 32 g of Resin (B-101) used in Example V-1.

Comparative Resin (R-V-2)

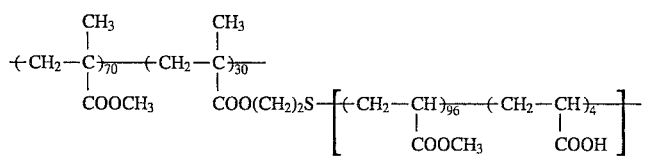

Mw: $6.3 \times 10^4$ (graft copolymer)

COMPARATIVE EXAMPLE V-3

An electrophotographic light-sensitive material was prepared in the same manner as in Example V-1, except for using 32 g of Resin (R-V-3) shown below in place of 32 g of Resin (B-101) used in Example V-1.

Comparative Resin (R-V-3)

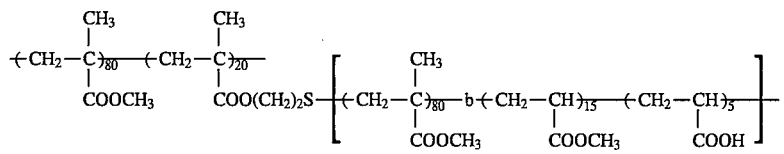

Mw: 6 × 10⁴ (AB block graft copolymer)

With each of the light-sensitive materials thus prepared, mechanical strength of photoconductive layer, electrostatic characteristics and image forming perform- ance were evaluated. The results obtained are shown in Table V-1 below.

Separately, the surface of photoconductive layer was charged to −400 V with a corona discharge and then exposed to light emitted from a gallium-aluminum-arsenic semiconductor laser (oscillation wavelength: 780 nm), and the time required for decay of the surface potential $V_{10}$ to

TABLE V-1

| | | Example V-1 | Comparative Example V-1 | Comparative Example V-2 | Comparative Example V-3 |
|---|---|---|---|---|---|
| Mechanical Strength of photoconductive layer*[1] | | 96% | 74% | 83% | 85% |
| Electrostatic Characteristics*[2] | | | | | |
| $V_{10}$ (−V) | I (20° C., 65% RH) | 780 | 800 | 770 | 785 |
| | II (30° C., 80% RH) | 760 | 770 | 750 | 770 |
| D.R.R. (90 sec value) (%) | | | | | |
| | I (20° C., 65% RH) | 90 | 85 | 89 | 91 |
| | II (30° C., 80% RH) | 87 | 83 | 86 | 87 |
| $E_{1/10}$ (erg/cm²) | I (20° C., 65% RH) | 8.5 | 11.4 | 10.1 | 9.5 |
| | II (30° C., 80% RH) | 8.8 | 10.9 | 9.7 | 9.0 |
| $E_{1/100}$ (erg/cm²) | I (20° C., 65% RH) | 14 | 20 | 17 | 15 |
| | II (30° C., 80% RH) | 15 | 21 | 18 | 17 |
| Image Forming Performance*[3] | | | | | |
| | I (20° C., 65% RH) | Very good | Slight unevenness in half tone area | Good | Good |
| | II (30° C., 80% RH) | Very good half tone area, white spots in image portion, slight scratches of fine lines and letters | Unevenness in half tone area | Unevenness in half tone area | Unevenness in |

The evaluation of each item shown in Table V-1 was conducted in the following manner.

1) Mechanical Strength of Photoconductive Layer

The surface of the light-sensitive material was repeatedly (1500 times) rubbed with emery paper (#1000) under a load of 50 g/cm² using a Heidon 14 Model surface testing/machine manufactured by Shinto Kagaku K. K.). After dusting, the abrasion loss of the photoconductive layer was measured to obtain film retention (%).

*2) Electrostatic Characteristics

The light-sensitive material was charged with a corona discharge to a voltage of −6 kV for 20 seconds in a dark room using a paper analyzer ("Paper Analyzer SP-428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

DRR (%)=($V_{100}/V_{10}$)×100 one-tenth was measured, and the exposure amount $E_{1/10}$ (erg/cm²) was calculated therefrom. Further, in the same manner as described above the time required for decay of the surface potential $V_{10}$ to one-hundredth was measured, and the exposure amount $E_{1/100}$ (erg/cm²) was calculated therefrom. The measurements were conducted under ambient condition of 20° C. and 65% RH (I) or 30° C. and 80% RH (II).

*3) Image Forming Performance

After the light-sensitive material was allowed to stand for one day under the ambient condition shown below, the light-sensitive material was charged to −6 kV and exposed to light emitted from a gallium-aluminum-arsenic semiconductor laser (oscillation wavelength: 780 nm; output: 2.8 mW) at an exposure amount of 64 erg/cm² (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of isoparaffinic solvent Isopar G manufactured by Esso Chemical K. K.) and fixed. The duplicated image obtained was visually evaluated for fog and image quality.

The ambient condition at the time of image formation was 20° C. and 65% RH (I) or 30° C. and 80% RH (II).

As can be seen from the results shown in Table V-1, the light-sensitive material according to the present invention had good electrostatic characteristics. The duplicated image obtained thereon was clear and free from background fog. On the contrary, with the light-sensitive materials of Comparative Examples V-1, V-2 and V-3 the decrease in photosensitivity ($E_{1/10}$ and $E_{1/100}$) occurred, and in the duplicated images the scratches of fine lines and letters were observed and a background fog remained unremoved after the rinse treatment. Further, the occurrence of unevenness in half tone areas of continuous gradation of the original was observed regardless of the electrostatic characteristics.

The value of $E_{1/100}$ is largely different between the light-sensitive material of the present invention and those of the comparative examples. The value of $E_{1/100}$ indicates an electrical potential remaining in the non-image areas after exposure at the practice of image formation. The smaller the value, the less the background fog in the non-image areas. More specifically, it is required that the remaining potential is decreased to −10V or less. Therefore, an amount of exposure necessary to make the remaining potential below −10 V is an important factor. In the scanning exposure system using a semiconductor laser beam, it is quite important to make the remaining potential below −10 V by a small exposure amount in view of a design for an optical system of a duplicator (such as cost of the device, and accuracy of the optical system).

From all these considerations, it is thus clear that an electrophotographic light-sensitive material satisfying both requirements of electrostatic characteristics and image forming performance and being advantageously employed particularly in a scanning exposure system using a semiconductor laser beam can be obtained only using the binder resin according to the present invention.

EXAMPLE V-2

A mixture of 6 g (solid basis) of Resin (A-128), 34 g (solid basis) of Resin (B-102), 200 g of photoconductive zinc oxide, 0.020 g of Methine Dye (V-II) shown below, 0.20 g of N-hydroxymaleinimide and 300 g of toluene was treated in the same manner as described in Example V-1 to prepare an electrophotographic light-sensitive material.

Methine Dye (V-II)

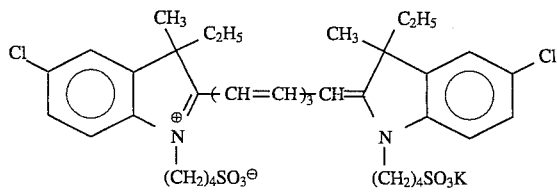

With the light-sensitive material thus-prepared, a film property in terms of surface smoothness, electrostatic characteristics and image forming performance were evaluated. Further, printing property was evaluated when it was used as an electrophotographic lithographic printing plate precursor. The results obtained are shown in Table V-2 below.

TABLE V

|  |  | Example V-2 |
| --- | --- | --- |
| Smoothness of Photoconductive Layer*[4] |  | 310 |
| Electrostatic Characteristics |  |  |
| $V_{10}$ (−V) | I (20° C., 65% RH) | 805 |
|  | II (30° C., 80% RH) | 785 |
| D.R.R. | I (20° C., 65% RH) | 91 |
| (90 sec value) (%) | II (30° C., 80% RH) | 88 |
| $E_{1/10}$ (erg/cm$^2$) | I (20° C., 65% RH) | 9.0 |
|  | II (30° C., 80% RH) | 10.5 |
| $E_{1/100}$ (erg/cm$^2$) | I (20° C., 65% RH) | 15 |
|  | II (30° C., 80% RH) | 18 |
| Image Forming Performance |  |  |
|  | I (20° C., 65% RH) | Very good |
|  | II (30° C., 80% RH) | Very good |
| Contact Angle with Water*[5] | (°) | 0 |
| Printing Durability*[6] |  | 10,000 prints |

The evaluation of each item shown in Table V-2 was conducted in the following manner.

*4) smoothness of Photoconductive Layer

The smoothness (sec/cc) of the light-sensitive material was measured using a Beck's smoothness test machine manufactured by Kumagaya Riko K. K.) under an air volume condition of 1 cc.

*5) Contact Anqle with Water

The light-sensitive material was passed once through an etching processor using a solution prepared by diluting an oil-desensitizing solution ELP-EX (produced by Fuji Photo Film Co., Ltd.) to a two-fold volume with distilled water to conduct oil-desensitization treatment on the surface of the photoconductive layer. On the thus oil-desensitized surface was placed a drop of 2 μl of distilled water, and the contact angle formed between the surface and water was measured using a goniometer.

*6) Printing Durability

The light-sensitive material was subjected to plate making in the same manner as described in *3) above to form toner images, and the surface of the photoconductive layer was subjected to oil-desensitization treatment under the same condition as in *5) above. The resulting lithographic printing plate was mounted on an offset printing machine ("Oliver Model 52",manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table V-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 0° with water. On practical printing using the resulting master plate, 10,000 prints of clear image without background stains were obtained.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES V-3 TO V-20

Each electrophotographic light-sensitive material was prepared in the same manner as described in Example V-2, except for using each of Resins (A) and Resins (B) shown in Table V-3 below in place of Resin (A-128) and Resin (B-102) used in Example V-2, respectively.

TABLE V-3

| Example | Resin (A) | Resin (B) |
|---------|-----------|-----------|
| V-3 | A-103 | B-103 |
| V-4 | A-105 | B-104 |
| V-5 | A-106 | B-105 |
| V-6 | A-108 | B-106 |
| V-7 | A-109 | B-107 |
| V-8 | A-110 | B-108 |
| V-9 | A-111 | B-110 |
| V-10 | A-116 | B-111 |
| V-11 | A-119 | B-113 |
| V-12 | A-120 | B-115 |
| V-13 | A-121 | B-116 |
| V-14 | A-122 | B-118 |
| V-15 | A-124 | B-119 |
| V-16 | A-125 | B-120 |
| V-17 | A-127 | B-122 |
| V-18 | A-129 | 3-126 |
| V-19 | A-130 | B-127 |

TABLE V-3-continued

| Example | Resin (A) | Resin (B) |
|---------|-----------|-----------|
| V-20 | A-133 | B-130 |

The electrostatic characteristics of the resulting light-sensitive materials were evaluated in the same manner as described in Example V-2, and good results were obtained.

As a result of the evaluation on image forming performance of each light-sensitive material, it was found that clear duplicated images having good reproducibility of fine lines and letters and no occurrence of unevenness in half tone areas without the formation of background fog were obtained.

Further, when these electrophotographic light-sensitive materials were employed as offset master plate precursors under the same printing condition as described in Example V-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics and printing property.

EXAMPLES V-21 TO V-24

Each electrophotographic light-sensitive material was prepared in the same manner as described in Example V-1, except for using each of the dye shown in Table V-4 below in place of Methine Dye (V-I) used in Example V-1.

TABLE V-4

| Example | Dye | Chemical Structure of Dye |
|---------|-----|---------------------------|
| V-21 | (V-III) | ![structure] |
| V-22 | (V-IV) | ![structure] |
| V-23 | (V-V) | ![structure] |

TABLE V-4-continued

| Example | Dye | Chemical Structure of Dye |
|---|---|---|
| V-24 | (V-VI) | (structure: naphthalene with NaO$_3$S and SO$_3$Na substituents, C(CH$_3$)$_2$ group, N$^+$–(CH$_2$)$_4$SO$_3^\ominus$, connected via –CH=CH–CH=CH–C(CH$_3$)= to a thiopyran ring with two C$_4$H$_9$(t) groups and S) |

Each of the light-sensitive materials according to the present invention was excellent in charging properties, dark charge retention rate and photosensitivity, and provided clear duplicated images free from background fog even when processed under severe condition of high temperature and high humidity (30° C. and 80% RH).

EXAMPLES V-25 AND V-26

A mixture of 6.5 g of Resin (A-102) (Example V- 25) or Resin (A-132)(Example V-26), 33.5 g of Resin (B- 123), 200 g of zinc oxide, 0.02 g of uranine, 0.035 g of Rose Bengal, 0.025 g of bremophenol blue, 0.18 g of p-hydroxybenzoic acid and 300 g of toluene was dispersed by a homogenizer at a rotation of 7×10$^3$ r.p.m. for 6 minutes to prepare a coating composition for a light-sensitive layer. The coating composition was coated on paper, which had been subjected to electrically conductive treatment, by a wire bar at a dry coverage of 25 g/m$^2$ and dried for 20 seconds at 110° C. Then, the coated material was allowed to stand in a dark place for 24 hours under the conditions of 20° C. and 65% RH to prepare each electrophotographic light-sensitive material.

COMPARATIVE EXAMPLE V-4

An electrophotographic light-sensitive material was prepared in the same manner as in Example V-25, except for using 33.5 g of Comparative Resin (R-V-2) described above in place of 33.5 g of Resin (B-123) used in Example V-25.

With each of the light-sensitive materials thus prepared, various characteristics were evaluated in the same manner as in Example V-2. The results obtained are shown in Table V-5 below.

TABLE V-5

| | | Example V-25 | Example V-26 | Comparative Example V-4 |
|---|---|---|---|---|
| Binder Resin | | (A-102)/(B-123) | (A-132)/(B-123) | (A-102)/(R-V-2) |
| Smoothness of Photoconductive Layer (sec/cc) | | 330 | 340 | 320 |
| Electrostatic Characteristics*[7] | | | | |
| $V_{10}$ (–V) | I (20° C., 65% RH) | 585 | 820 | 565 |
| | II (30° C., 80% RH) | 565 | 795 | 540 |
| D.R.R. (%) | I (20° C., 65% RH) | 89 | 93 | 85 |
| | II (30° C., 80% RH) | 84 | 90 | 79 |
| $E_{1/10}$ (lux/sec) | I (20° C., 65% RH) | 12.5 | 8.8 | 14.3 |
| | II (30° C., 80% RH) | 12.8 | 9.1 | 15.0 |
| $E_{1/100}$ (lux/sec) | I (20° C., 65% RH) | 22 | 14 | 26 |
| | II (30° C., 80% RH) | 23 | 15 | 28 |
| Image Forming*[8] | I (20° C., 65% RH) | Good | Very good | Unevenness in half tone area, slight scratches of fine lines |
| Performance | II (30° C., 80% RH) | Good | Very good | Severe unevenness in half tone area, scratches of fine lines and letters |
| Contact Angle with Water (°) | | 0 | 0 | 0 |
| Printing Durability | | 10,000 prints | 10,000 prints | Unevenness in image portion occurred from the start of printing |

The characteristics were evaluated in the same manner as in Example V-2, except that same electrostatic characteristics and image forming performance were evaluated according to the following test methods.

*[7] Measurement of Electrostatic Characteristics: $E_{1/10}$ and $E_{1/100}$

The surface of the photoconductive layer was charged to –400 V with corona discharge, and then irradiated by visible light of the illuminance of 2.0 lux. Then, the time required for decay of the surface potential ($V_{10}$) to ⅒ or 1/100 thereof was determined, and the exposure amount $E_{1/10}$ or $E_{1/100}$ (lux.sec) was calculated therefrom.

*[8] image Forming Performance

The electrophotographic light-sensitive material was allowed to stand for one day under the ambient condition described below, the light-sensitive material was subjected to plate making by a full-automatic plate making machine (ELP-404V manufactured by Fuji Photo Film Co., Ltd.) using ELP-T as a toner. The duplicated image thus obtained was visually evaluated for fog and image quality. The ambient condition at the time of image formation was 20° C. and 65% RH (I) or 30° C. and 80% RH (II). The original used for the duplication was composed of cuttings of other originals pasted up thereon.

From the results shown above, it can be seen that each light-sensitive material exhibited almost same properties with respect to the surface smoothness and mechanical strength of the photoconductive layer. However, on the electrostatic characteristics, the light-sensitive material of Comparative Example V-4 had the particularly large value of photosensitivity $E_{1/100}$, and this tendency increased under the high temperature and high humidity condition. On the contrary, the electrostatic characteristics of the light-sensitive materials according to the present invention were good. Particularly, those of Example V-26 using the resin (A') were very good. The value of $E_{1/100}$ thereof was particularly small.

With respect to image forming performance, the edge mark of cuttings pasted up was observed as background fog in the non-image areas in the light-sensitive material of Comparative Example V-4. On the contrary, the light-sensitive materials according to the present invention provided clear duplicated images free from background fog.

Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example V-4, the above described edge mark of cuttings pasted up was not removed with the oil-desensitizing treatment and the background stains occurred from the start of printing.

It can be seen from the results described above that only the light-sensitive materials according to the present invention can provide excellent performance.

EXAMPLES V-27 TO V-42

Each electrophotographic light-sensitive material was prepared in the same manner as described in Example V-25, except for using 6.5 g of each of Resin (A) and 33.5 g of each of Resin (B) shown in Table V-6 below in place of 6.5 g of Resin (A-102) and 33.5 g of Resin (B-123) used in Example V-25, respectively.

TABLE V-6

| Example | Resin (A) | Resin (B) |
|---|---|---|
| V-27 | A-101 | B-104 |
| V-28 | A-103 | B-105 |
| V-29 | A-105 | B-106 |
| V-30 | A-106 | B-107 |
| V-31 | A-107 | B-109 |
| V-32 | A-110 | B-110 |
| V-33 | A-113 | B-111 |
| V-34 | A-114 | B-113 |
| V-35 | A-115 | B-115 |
| V-36 | A-117 | B-117 |
| V-37 | A-119 | B-120 |
| V-38 | A-120 | B-121 |
| V-39 | A-121 | B-124 |
| V-40 | A-129 | B-125 |
| V-41 | A-132 | B-128 |
| V-42 | A-125 | B-129 |

Each of the light-sensitive materials according to the present invention was excellent in charging properties, dark charge retention rate and photosensitivity, and provided a clear duplicated image free from background fog even under severe condition of high temperature and high humidity (30° C. and 80% RH). Further, when these materials were employed as offset master plate precursors, more than 10,000 prints of a clear image free from background stains were obtained respectively. Moreover, the light-sensitive materials using the resin (A') containing a methacrylate component substituted with the specific aryl group exhibited better performance.

EXAMPLE VI-1

A mixture of 6 g (solid basis) of Resin (A-1), 34 g (solid basis) of Resin (B-201), 200 g of photoconductive zinc oxide, 0.018 g of Cyanine Dye (VI-I) shown below, 0.15 g of phthalic anhydride and 300 g of toluene was dispersed by a homogenizer manufactured by Nippon Seiki K. K.) at $6 \times 10^3$ r.p.m. for 10 minutes to prepare a coating composition for a light-sensitive layer. The coating composition was coated on paper, which had been subjected to electrically conductive treatment, by a wire bar at a dry coverage of 20 g/m², followed by drying at 110° C. for 10 seconds. The coated material was then allowed to stand in a dark place at 20° C. and 65% RH (relative humidity) for 24 hours to prepare an electrophotographic light-sensitive material.

Cyanine Dye (VI-1)

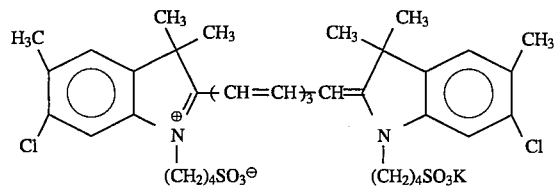

COMPARATIVE EXAMPLE VI-1

An electrophotographic light-sensitive material was prepared in the same manner as in Example VI-1, except for using 34 g of Resin (R-VI-1) shown below in place of 34 g of Resin (B-201) used in Example VI-1.

Comparative Resin (R-VI-1)

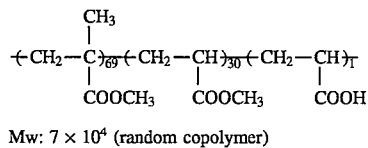

Mw: $7 \times 10^4$ (random copolymer)

COMPARATIVE EXAMPLE VI-2

An electrophotographic light-sensitive material was prepared in the same manner as in Example VI-1, except for using 34 g of Resin (R-VI-2) shown below in place of 34 g of Resin (B-201) used in Example VI-1.

Comparative Resin (R-VI-2)

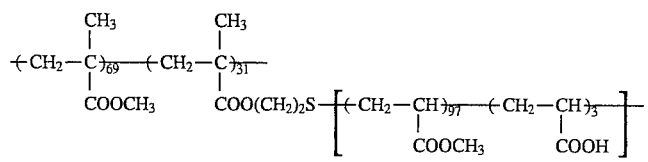

Mw: 7.5 × 10⁴ (graft copolymer)

With each of the light-sensitive materials thus prepared, electrostatic characteristics and image forming performance were evaluated. The results obtained are shown in Table VI-1 below.

*2) Image Forming Performance

After the light-sensitive material was allowed to stand for one day under the ambient condition shown below, the light-sensitive material was charged to −6 kV and exposed

TABLE VI-1

| | | Example VI-1 | Comparative Example VI-1 | Comparative Example VI-2 |
|---|---|---|---|---|
| Electrostatic Characteristics*[1] | | | | |
| $V_{10}$ (−V) | I (20° C., 65% RH) | 590 | 575 | 585 |
| | II (30° C., 80% RH) | 580 | 560 | 575 |
| D.R.R. (%) | I (20° C., 65% RH) | 85 | 83 | 85 |
| | II (30° C., 80% RH) | 80 | 78 | 80 |
| $E_{1/10}$ (lux/sec) | I (20° C., 65% RH) | 28 | 39 | 34 |
| | II (30° C., 80% RH) | 30 | 44 | 38 |
| $E_{1/100}$ (lux/sec) | I (20° C., 65% RH) | 43 | 64 | 55 |
| | II (30° C., 80% RH) | 48 | 73 | 61 |
| Image Forming Performance*[2] | I (20° C., 65% RH) | Very good | Scratches of fine lines and letters unevenness in half tone area | Scratches of fine lines and letters unevenness in half tone area |
| | II (30° C., 80% RH) | Very good | Scratches of fine lines and letters unevenness in half tone area | Scratches of fine lines and letters unevenness in half tone area |

The evaluation of each item shown in Table VI-1 was conducted in the following manner.

1) Electrostatic Characteristics

The light-sensitive material was charged with a corona discharge to a voltage of −6 kV for 20 seconds in a dark room using a paper analyzer ("Paper Analyzer SP-428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

$$DRR\ (\%) = (V_{100}/V_{10}) \times 100$$

Separately, the surface of photoconductive layer was charged to −400 V with a corona discharge and then exposed to light emitted from a gallium-aluminum-arsenic semiconductor laser (oscillation wavelength: 780 nm), and the time required for decay of the surface potential $V_{10}$ to one-tenth were measured, and the exposure amount $E_{1/10}$ (erg/cm²) was calculated therefrom. Further, in the same manner as described above the time required for decay of the surface potential $V_{10}$ to one-hundredth was measured, and the exposure amount $E_{1/100}$ (erg/cm²) was calculated therefrom. The measurements were conducted under ambient condition of 20° C. and 65% RH (I) or 30° C. and 80% RH (II).

to light emitted from a gallium-aluminum-arsenic semiconductor laser (oscillation wavelength: 780 nm; output: 2.8 mW) at an exposure amount of 64 erg/cm² (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of isoparaffinic solvent Isopar G manufactured by Esso Chemical K. K.) and fixed. The duplicated image obtained was visually evaluated for fog and image quality. The ambient condition at the time of image formation was 20° C. and 65% RH (I) or 30° C. and 80% RH (II).

As can be seen from the results shown in Table VI-1, the light-sensitive material according to the present invention had good electrostatic characteristics. The duplicated image obtained thereon was clear and free from background fog. On the contrary, with the light-sensitive materials of Comparative Examples VI-1 and VI-2 the decrease in photosensitivity ($E_{1/10}$ and $E_{1/100}$) occurred, and in the duplicated images the scratches of fine lines and letters were observed and a slight background fog remained without removing after the rinse treatment. Further, the occurrence of unevenness in half tone areas of continuous gradation of the original was observed regardless of the electrostatic characteristics.

The value of $E_{1/100}$ is largely different between the light-sensitive material of the present invention and those of the comparative examples. The value of $E_{1/100}$ indicates an electrical potential remaining in the non-image areas after exposure at the practice of image formation. The smaller the value, the less the background fog in the non-image areas. More specifically, it is required that the remaining potential is decreased to −10 V or less. Therefore, an amount of exposure necessary to make the remaining potential below −10 V is an important factor. In the scanning exposure system using a semiconductor laser beam, it is quite important to make the remaining potential below −10 V by a small exposure amount in view of a design for an optical system of a duplicator (such as cost of the device, and accuracy of the optical system).

From all these considerations, it is thus clear that an electrophotographic light-sensitive material satisfying both requirements of electrostatic characteristics and image forming performance and being advantageously employed particularly in a scanning exposure system using a semiconductor laser beam can be obtained only using the binder resin according to the present invention.

EXAMPLE VI-2

A mixture of 5 g (solid basis) of Resin (A-7), 35 g (solid basis) of Resin (B-202), 200 g of photoconductive zinc oxide, 0.020 g of Methine Dye (VI-II) shown below, 0.20 g of N-hydroxymaleinimide and 300 g of toluene was treated in the same manner as described in Example VI-1 to prepare an electrophotographic light-sensitive material.

Methine Dye (VI-II)

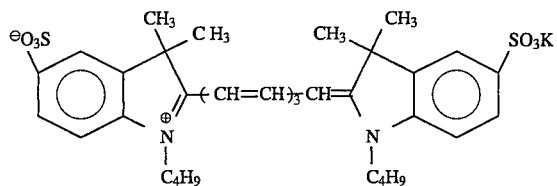

With the light-sensitive material thus-prepared, a film property in terms of surface smoothness, electrostatic characteristics and image forming performance were evaluated. Further, printing property was evaluated when it was used as an electrophotographic lithographic printing plate precursor. The results obtained are shown in Table VI-2 below.

TABLE VI-2

|  |  | Example VI-2 |
|---|---|---|
| Smoothness of Photoconductive Layer*3) (sec/cc) |  | 480 |
| Electrostatic Characteristics |  |  |
| $V_{10}$ (−V) | I (20° C., 65% RH) | 660 |
|  | II (30° C., 80% RH) | 650 |
| D.R.R. (90 sec value) (%) | I (20° C., 65% RH) | 87 |
|  | II (30° C., 80% RH) | 85 |
| $E_{1/10}$ (erg/cm$^2$) | I (20° C., 65% RH) | 19 |
|  | II (30° C., 80% RH) | 20 |
| $E_{1/100}$ (erg/cm$^2$) | I (20° C., 65% RH) | 29 |
|  | II (30° C., 80% RH) | 31 |
| Image Forming Performance |  |  |
|  | I (20° C., 65% RH) | Very good |
|  | II (30° C., 80% RH) | Very good |
| Contact Angle with Water*4) | (°) | 10 or less |
| Printing Durability*5) |  | 10,000 prints |

The evaluation of each item shown in Table VI-2 was conducted in the following manner.

*3) smoothness of Photoconductive Layer

The smoothness (sec/cc) of the light-sensitive material was measured using a Beck's smoothness test machine manufactured by Kumagaya Riko K. K.) under an air volume condition of 1 cc.

*4) Contact Anqle with Water

The light-sensitive material was passed once through an etching processor using a solution prepared by diluting an oil-desensitizing solution ELP-EX (produced by Fuji Photo Film Co., Ltd.) to a two-fold volume with distilled water to conduct oil-desensitization treatment on the surface of the photoconductive layer. On the thus oil-desensitized surface was placed a drop of 2 μl of distilled water, and the contact angle formed between the surface and water was measured using a goniometer.

*5) Printing Durability

The light-sensitive material was subjected to plate making in the same manner as described in *2) above to form toner images, and the surface of the photoconductive layer was subjected to oil-desensitization treatment under the same condition as in *4) above. The resulting lithographic printing plate was mounted on an offset printing machine ("Oliver Model 52",manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table VI-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 10° or less with water. On practical printing using the resulting/master plate, 10,000 prints of clear image without background stains were obtained.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES VI-3 TO VI-18

Each electrophotographic light-sensitive material was prepared in the same manner as described in Example VI-2, except for using each of Resins (A) and Resins (B) shown in Table VI-3 below in place of Resin (A-7) and Resin (B-202) used in Example VI-2, respectively.

The electrostatic characteristics of the resulting light-sensitive materials were evaluated in the same manner as described in Example VI-2. The results obtained are shown in Table VI-3 below.

TABLE VI-3

| Example | Resin (A) | Resin (B) | $V_{10}$ (-V) | D.R.R. (%) | $E_{1/10}$ (erg/cm$^2$) | $E_{1/100}$ (erg/cm$^2$) |
|---|---|---|---|---|---|---|
| VI-3 | A-2 | B-202 | 590 | 80 | 30 | 47 |
| VI-4 | A-3 | B-203 | 670 | 83 | 21 | 32 |
| VI-5 | A-4 | B-204 | 585 | 80 | 31 | 49 |
| VI-6 | A-5 | B-205 | 590 | 81 | 30 | 46 |
| VI-7 | A-6 | B-207 | 660 | 83 | 20 | 30 |
| VI-8 | A-8 | B-208 | 660 | 82 | 19 | 30 |
| VI-9 | A-9 | B-212 | 580 | 79 | 32 | 39 |
| VI-10 | A-12 | B-210 | 580 | 80 | 30 | 44 |
| VI-11 | A-13 | B-207 | 585 | 79 | 34 | 50 |
| VI-12 | A-15 | B-211 | 570 | 78 | 33 | 48 |
| VI-13 | A-17 | B-214 | 600 | 81 | 22 | 34 |
| VI-14 | A-22 | B-216 | 590 | 80 | 29 | 44 |
| VI-15 | A-23 | B-222 | 650 | 82 | 22 | 34 |
| VI-16 | A-26 | B-223 | 560 | 78 | 36 | 49 |
| VI-17 | A-27 | B-224 | 600 | 80 | 28 | 42 |
| VI-18 | A-29 | B-226 | 665 | 83 | 20 | 33 |

The electrostatic characteristics were evaluated under the condition of 30° C. and 80% RH.

As a result of the evaluation on image forming performance of each light-sensitive material, it was found that clear duplicated images having good reproducibility of fine lines and letters and no occurrence of unevenness in half tone areas without the formation of background fog were obtained.

Further, when these electrophotographic light-sensitive materials were employed as offset master plate precursors under the same printing condition as described in Example VI-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics and printing property. Also, it can be seen that the electrostatic characteristics are further improved by the use of the resin (A').

EXAMPLES VI-19 TO VI-22

Each electrophotographic light-sensitive material was prepared in the same manner as described in Example VI-1, except for using each of the dye shown in Table VI-4 below in place of Cyanine Dye (VI-I) used in Example VI-1.

TABLE VI-4

| Example | Dye | Chemical Structure of Dye |
|---|---|---|
| VI-19 | (VI-III) | |
| VI-20 | (VI-IV) | |
| VI-21 | (VI-V) | |

TABLE VI-4-continued

| Example | Dye | Chemical Structure of Dye |
|---|---|---|
| VI-22 | (VI-VI) | (structure shown below) |

[Structure of Dye (VI-VI): a naphtho-indolenine methine dye with NaO₃S and SO₃Na substituents on the naphthalene, N-(CH₂)₄SO₃⁻, connected via –CH=CH–CH=CH– to a thiopyran ring bearing CH₃ and two C₄H₉(t) groups]

Each of the light-sensitive materials according to the present invention was excellent in charging properties, dark charge retention rate and photosensitivity, and provided clear duplicated images free from background fog even when processed under severe condition of high temperature and high humidity (30° C. and 80% RH).

EXAMPLES VI-23 AND VI-24

A mixture of 6.5 g of Resin (A-1) (Example VI-23) or Resin (A-29) (Example VI-24), 33.5 g of Resin (B-217), 200 g of zinc oxide, 0.02 g of uranine, 0.03 g of Methine Dye (VI-VII) shown below, 0.03 g of Methine Dye (VI-VIII) shown below, 0.18 g of p-hydroxybenzoic acid and 300 g of toluene was dispersed by a homogenizer at a rotation of $7 \times 10^3$ r.p.m. for 10 minutes to prepare a coating composition for a light-sensitive layer. The coating composition was coated on paper, which had been subjected to electrically conductive treatment, by a wire bar at a dry coverage of 20 g/m², and dried for 20 seconds at 110° C. Then, the coated material was allowed to stand in a dark place for 24 hours under the conditions of 20° C. and 65% RH to prepare each electrophotographic light-sensitive material.

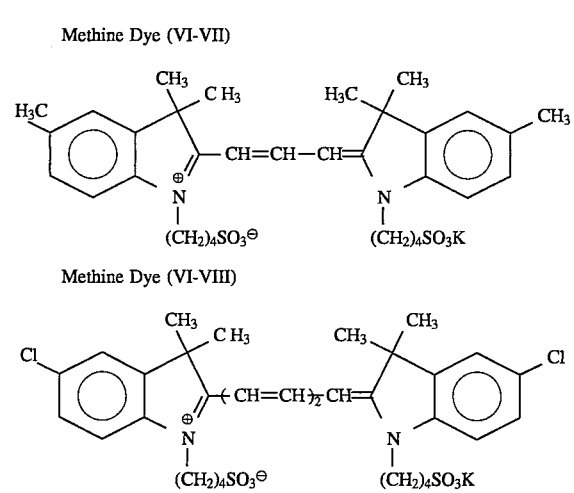

Methine Dye (VI-VII)

Methine Dye (VI-VIII)

COMPARATIVE EXAMPLE VI-3

An electrophotographic light-sensitive material was prepared in the same manner as in Example VI-23, except for using 33.5 g of Resin (R-VI-3) shown below in place of 33.5 g of Resin (B-217) used in Example VI-23.

Comparative Resin (R-VI-3)

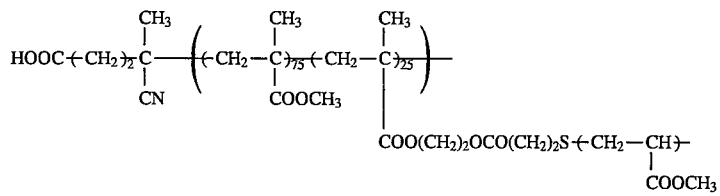

Mw: $7.5 \times 10^4$

With each of the light-sensitive materials thus prepared, various characteristics were evaluated in the same manner as in Example VI-2. The results obtained are shown in Table VI-5 below.

TABLE VI-5

|  | Example VI-23 | Example VI-24 | Comparative Example VI-3 |
|---|---|---|---|
| Binder Resin | (A-1)/(B-217) | (A-29)/(B-217) | (A-1)/(R-VI-3) |
| Smoothness of Photoconductive Layer (sec/cc) | 550 | 600 | 580 |

TABLE VI-5-continued

|  |  | Example VI-23 | Example VI-24 | Comparative Example VI-3 |
|---|---|---|---|---|
| Electrostatic Characteristics*6) | | | | |
| $V_{10}$ (−V) | I (20° C., 65% RH) | 590 | 665 | 590 |
|  | II (30° C., 80% RH) | 580 | 650 | 575 |
| D.R.R. (%) | I (20° C., 65% RH) | 95 | 98 | 94 |
|  | II (30° C., 80% RH) | 92 | 95 | 91 |
| $E_{1/10}$ (lux/sec) | I (20° C., 65% RH) | 11.2 | 8.5 | 12.8 |
|  | II (30° C., 80% RH) | 11.6 | 8.8 | 13.3 |
| $E_{1/100}$ (lux/sec) | I (20° C., 65% RH) | 16 | 12 | 21 |
|  | II (30° C., 80% RH) | 17 | 13 | 23 |
| Image Forming*7) | I (20° C., 65% RH) | Good | Very good | Edge mark of cutting |
| Performance | II (30° C., 80% RH) | Good | Very good | Edge mark of cutting, unevenness in half tone area |
| Contact Angle with Water (°) | | 10 or less | 10 or less | 10 or less |
| Printing Durability | | 10,000 prints | 10,000 prints | Background stain due to edge mark of cutting occurred from the start of printing |

The characteristics were evaluated in the same manner as in Example VI-2, except that same electrostatic characteristics and image forming performance were evaluated according to the following test methods.

*6) Measurement of Electrostatic Characteristics: $E_{1/10}$ and $E_{1/100}$

The surface of the photoconductive layer was charged to −400 V with corona discharge, and then irradiated by visible light of the illuminance of 2.0 lux. Then, the time required for decay of the surface potential ($V_{10}$) to $1/10$ or $1/100$ thereof was determined, and the exposure amount $E_{1/10}$ or $E_{1/100}$ (lux.sec) was calculated therefrom.

*7) image Forming Performance

The electrophotographic light-sensitive material was allowed to stand for one day under the ambient condition described below, the light-sensitive material was subjected to plate making by a full-automatic plate making machine ELP-404V manufactured by Fuji Photo Film Co., Ltd.) using ELP-T as a toner. The duplicated image thus obtained was visually evaluated for fog and image quality. The ambient condition at the time of image formation was 20° C. and 65% RH (I) or 30° C. and 80% RH (II). The original used for the duplication was composed of cuttings of other originals pasted up thereon.

From the results shown above, it can be seen that each light-sensitive material exhibited almost the same properties with respect to the surface smoothness and mechanical strength of the photoconductive layer. However, on the electrostatic characteristics, the light-sensitive material of Comparative Example VI-3 had the particularly large value of photosensitivity $E_{1/100}$, and this tendency increased under the high temperature and high humidity condition. On the contrary, the electrostatic characteristics of the light-sensitive material according to the present invention were good. Further, those of Example VI-24 using the resin (A') were very good. The value of $E_{1/100}$ thereof was particularly small.

With respect to image forming performance, the edge mark of cuttings pasted up was observed as background fog in the non-image area's in the light-sensitive material of Comparative Example VI-3. On the contrary, the light-sensitive materials according to the present invention provided clear duplicated images free from background fog.

Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example VI-3, the above described edge mark of cuttings pasted up was not removed with the oil-desensitizing treatment and the background stains occurred from the start of printing.

It can be seen from the results described above that only the light-sensitive materials according to the present invention can provide excellent performance.

EXAMPLE VI-25

A mixture of 5 g of Resin (A-22), 35 g of Resin (B-222), 200 g of zinc oxide, 0.02 g of uranine, 0.04 g of Rose Bengal, 0.03 g of bremophenol blue, 0.40 g of phthalic anhydride and 300 g of toluene was treated in the same manner as described in Example VI-24 to prepare an electrophotographic light-sensitive material.

As the result of the evaluation of various characteristics in the same manner as described in Example VI-24, it can be seen that the light-sensitive material according to the present invention is excellent in charging properties, dark charge retention rate and photosensitivity, and provides a clear duplicated image free from background fog under severe conditions of high temperature and high humidity (30° C. and 80% RH). Further, when the material was employed as an offset master plate precursor, 10,000 prints of clear image were obtained.

EXAMPLES VI-26 TO VI-37

Each electrophotographic light-sensitive material was prepared in the same manner as described in Example VI-25, except for using 5 g of each of Resin (A) and 35 g of each of Resin (B) shown in Table VI-6 below in place of 5 g of Resin (A-22) and 35 g of Resin (B-222 used in Example VI-25, respectively.

TABLE VI-6

| Example | Resin (A) | Resin (B) |
|---|---|---|
| VI-26 | A-1 | B-206 |
| VI-27 | A-2 | B-209 |
| VI-28 | A-4 | B-210 |
| VI-29 | A-5 | B-212 |
| VI-30 | A-9 | B-213 |
| VI-31 | A-15 | B-215 |
| VI-32 | A-20 | B-217 |
| VI-33 | A-21 | B-218 |
| VI-34 | A-22 | B-219 |

TABLE VI-6-continued

| Example | Resin (A) | Resin (B) |
|---|---|---|
| VI-35 | A-25 | B-221 |
| VI-36 | A-26 | B-225 |
| VI-37 | A-29 | B-209 |

Each of the light-sensitive materials according to the present invention was excellent in charging properties, dark charge retention rate and photosensitivity, and provided a clear duplicated image free from background fog and scratches of fine lines even under severe condition of high temperature and high humidity (30° C. and 80% RH). Further, when these materials were employed as offset master plate precursors, more than 10,000 prints of a clear image free from background stains were obtained respectively.

EXAMPLE VII-1

A mixture of 5 g (solid basis) of Resin (A-106), 35 g (solid basis) of Resin (B-201), 200 g of photoconductive zinc oxide, 0.018 g of Cyanine Dye (VII-I) shown below, 0.45 g of phthalic anhydride and 300 g of toluene was dispersed by a homogenizer manufactured by Nippon Seiki K. K.) at a rotation of 7×10³ r.p.m. for 10 minutes to prepare a coating composition for a light-sensitive layer. The coating composition was coated on paper, which had been subjected to electrically conductive treatment, by a wire bar at a dry coverage of 20 g/m², followed by drying at 110° C. for 10 seconds. The coated material was then allowed to stand in a dark place at 20° C. and 65% RH for 24 hours to prepare an electrophotographic light-sensitive material.

Cyanine Dye (VII-I)

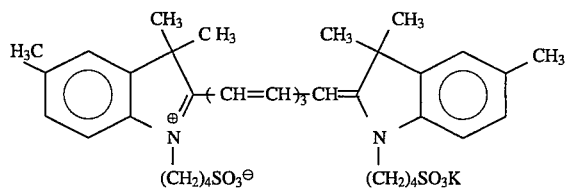

COMPARATIVE EXAMPLE VII-1

An electrophotographic light-sensitive material was prepared in the same manner as in Example VII-1, except for using 35 g of Resin (R-VII-1) shown below in place of 35 g of Resin (B-201) used in Example VII-1.

Comparative Resin (R-VII-1)

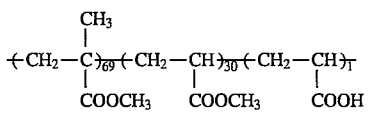

Mw: $7 \times 10^4$ (random copolymer)

COMPARATIVE EXAMPLE VII-2

An electrophotographic light-sensitive material was prepared in the same manner as in Example VII-1, except for using 35 g of Resin (R-VII-2) shown below in place of 35 g of Resin (B-201) used in Example VII-1.

Comparative Resin (R-VII-2)

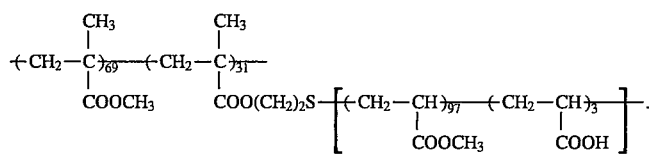

Mw: $7.5 \times 10^4$ (graft copolymer)

With each of the light-sensitive materials thus prepared, electrostatic characteristics and image forming performance were evaluated. The results obtained are shown in Table VII-1 below.

TABLE VII-1

| | Example VII-1 | Comparative Example VII-1 | Comparative Example VII-2 |
|---|---|---|---|
| Electrostatic Characteristics*[1] | | | |
| $V_{10}$ (−V) | | | |
| I (20° C., 65% RH) | 600 | 590 | 595 |
| II (30° C., 80% RH) | 590 | 580 | 580 |
| D.R.R. (90 sec value) (%) | | | |
| I (20° C., 65% RH) | 83 | 80 | 81 |
| II (30° C., 80% RH) | 79 | 75 | 77 |
| $E_{1/10}$ (erg/cm²) | | | |
| I (20° C., 65% RH) | 25 | 30 | 27 |
| II (30° C., 80% RH) | 30 | 35 | 33 |
| $E_{1/100}$ (erg/cm²) | | | |
| I (20° C., 65% RH) | 40 | 50 | 45 |
| II (30° C., 80% RH) | 49 | 59 | 54 |
| Image Forming Performance*[2] | | | |
| I (20° C., 65% RH) | Very good | Scratches of fine lines and letters, unevenness in half tone area | Scratches of fine lines and letters, unevenness in half tone area |
| II (30° C., 80% RH) | Very good | Scratches of fine lines and letters, unevenness in half tone area | Scratches of fine lines and letters, unevenness in half tone area |

The evaluation of each item shown in Table VII-1 was conducted in the following manner.

1) Electrostatic Characteristics

The light-sensitive material was charged with a corona discharge to a voltage of −6 kV for 20 seconds in a dark room using a paper analyzer ("Paper Analyzer SP-428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

$$DRR\ (\%) = (V_{100}/V_{10}) \times 100$$

Separately, the surface of photoconductive layer was charged to −400 V with a corona discharge and then exposed to light emitted from a gallium-aluminum-arsenic semiconductor laser (oscillation wavelength: 780 nm), and the time required for decay of the surface potential $V_{10}$ to one-tenth was measured, and the exposure amount $E_{1/10}$ (erg/cm$^2$) was calculated therefrom. Further, in the same manner as described above the time required for decay of the surface potential $V_{10}$ to one-hundredth was measured, and the exposure amount $E_{1/100}$ (erg/cm$^2$) was calculated therefrom. The measurements were conducted under ambient condition of 20° C. and 65% RH (I) or 30° C. and 80% RH (II).

*2) Image Forming Performance

After the light-sensitive material was allowed to stand for one day under the ambient condition shown below, the light-sensitive material was charged to −6 kV and exposed to light emitted from a gallium-aluminum-arsenic semiconductor laser (oscillation wavelength: 780 nm; output: 2.8 mW) at an exposure amount of 64 erg/cm$^2$ (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of isoparaffinic solvent Isopar G manufactured by Esso Chemical K. K.) and fixed. The duplicated image obtained was visually evaluated for fog and image quality. The ambient condition at the time of image formation was 20° C. and 65% RH (I) or 30° C. and 80% RH (II).

As can be seen from the results shown in Table VII-1, the light-sensitive material according to the present invention had good electrostatic characteristics. The duplicated image obtained thereon was clear and free from background fog. On the contrary, with the light-sensitive materials of Comparative Examples VII-1 and VII-2 the decrease in photosensitivity ($E_{1/10}$ and $E_{1/100}$) occurred, and in the duplicated images the scratches of fine lines and letters were observed and a slight background fog remained without removing after the rinse treatment. Further, the occurrence of unevenness in half tone areas of continuous gradation of the original was observed regardless of the electrostatic characteristics.

The value of $E_{1/100}$ is largely different between the light-sensitive material of the present invention and those of the comparative examples. The value of $E_{1/100}$ indicates an electrical potential remaining in the non-image areas after exposure at the practice of image formation. The smaller the value, the less the background fog in the non-image areas. More specifically, it is required that the remaining potential is decreased to −10 V or less. Therefore, an amount of exposure necessary to make the remaining potential below −10 V is an important factor. In the scanning exposure system using a semiconductor laser beam, it is quite important to make the remaining potential below −10 V by a small exposure amount in view of a design for an optical system of a duplicator (such as cost of the device, and accuracy of the optical system).

From all these considerations, it is thus clear that an electrophotographic light-sensitive material satisfying both requirements of electrostatic characteristics and image forming performance and being advantageously employed particularly in a scanning exposure system using a semiconductor laser beam can be obtained only using the binder resin according to the present invention.

EXAMPLE VII-2

A mixture of 5 g (solid basis) of Resin (A-104), 35 g (solid basis) of Resin (B-202), 200 g of photoconductive zinc oxide, 0,020 g of Methine Dye (VII-II) shown below, 0.20 g of N-hydroxymaleinimide and 300 g of toluene was treated in the same manner as described in Example VII-1 to prepare an electrophotographic lightsensitive material.

Methine Dye (VII-II)

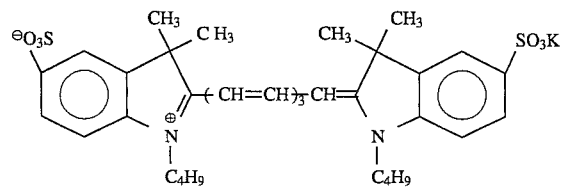

With the light-sensitive material thus-prepared, a film property in terms of surface smoothness, electrostatic characteristics and image forming performance were evaluated. Further, printing property was evaluated when it was used as an electrophotographic lithographic printing plate precursor. The results obtained are shown in Table VII-2 below.

TABLE VII-2

| | | Example VII-2 |
|---|---|---|
| Smoothness of Photoconductive Layer*3) (sec/cc) | | 500 |
| Electrostatic Characteristics | | |
| $V_{10}$ (−V) | I (20° C., 65% RH) | 680 |
| | II (30° C., 80% RH) | 670 |
| D.R.R. | I (20° C., 65% RH) | 90 |
| (90 sec value) (%) | II (30° C., 80% RH) | 87 |
| $E_{1/10}$ (erg/cm$^2$) | I (20° C., 65% RH) | 15 |
| | II (30° C., 80% RH) | 18 |
| $E_{1/100}$ (erg/cm$^2$) | I (20° C., 65% RH) | 23 |
| | II (30° C., 80% RH) | 27 |
| Image Forming Performance | | |
| | I (20° C., 65% RH) | Very good |
| | II (30° C., 80% RH) | Very good |
| Contact Angle with Water*4) (°) | | 10 or less |
| Printing Durability*5) | | 10,000 prints |

The evaluation of each item shown in Table VII-2 was conducted in the following manner.

*3) Smoothness of Photoconductive Layer

The smoothness (sec/cc) of the light-sensitive material was measured using a Beck's smoothness test machine (manufactured by Kumagaya Riko K. K.) under an air volume condition of 1 cc.

*4) Contact Anqle with Water

The light-sensitive material was passed once through an etching processor using a solution prepared by diluting an oil-desensitizing solution ELP-EX (produced by Fuji Photo Film Co., Ltd.) to a two-fold volume with distilled water to conduct oil-desensitization treatment on the surface of the photoconductive layer. On the thus oil-desensitized surface was placed a drop of 2 μl of distilled water, and the contact angle formed between the surface and water was measured using a goniometer.

*5) Printing Durability

The light-sensitive material was subjected to plate making in the same manner as described in *2) above to form toner images, and the surface of the photoconductive layer was subjected to oil-desensitization treatment under the same condition as in *4) above. The resulting lithographic printing plate was mounted on an offset printing machine ("Oliver Model 52" manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table VII-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic, as shown by a small contact angle of 10° or less with water. On practical printing using the resulting master plate, 10,000 prints of clear image without background stains were obtained.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES VII-3 TO VII-18

Each electrophotographic light-sensitive material was prepared in the same manner as described in Example VII-2, except for using each of Resins (A) and Resins (B) shown in Table VII-3 below in place of Resin (A-104) and Resin (B-202) used in Example VII-2, respectively.

The electrostatic characteristics of the resulting light-sensitive materials were evaluated in the same manner as described in Example VII-2. The results obtained are shown in Table VII-3 below.

TABLE VII-3

| Example | Resin (A) | Resin (B) | $V_{10}$ (−V) | D.R.R. (%) | $E_{1/10}$ (erg/cm$^2$) | $E_{1/100}$ (erg/cm$^2$) |
|---|---|---|---|---|---|---|
| VII-3 | A-103 | B-203 | 610 | 82 | 27 | 41 |
| VII-4 | A-105 | B-204 | 665 | 83 | 16 | 25 |
| VII-5 | A-109 | B-205 | 630 | 83 | 18 | 27 |
| VII-6 | A-110 | B-208 | 605 | 81 | 20 | 32 |
| VII-7 | A-111 | B-210 | 600 | 80 | 21 | 33 |
| VII-8 | A-116 | B-211 | 585 | 79 | 26 | 40 |
| VII-9 | A-119 | B-212 | 680 | 84 | 17 | 26 |
| VII-10 | A-120 | B-213 | 590 | 80 | 20 | 31 |
| VII-11 | A-121 | B-215 | 670 | 81 | 18 | 25 |
| VII-12 | A-122 | B-217 | 600 | 80 | 22 | 32 |
| VII-13 | A-125 | B-219 | 645 | 81 | 17 | 24 |
| VII-14 | A-127 | B-221 | 600 | 79 | 28 | 43 |
| VII-15 | A-128 | B-222 | 685 | 84 | 18 | 25 |
| VII-16 | A-130 | B-223 | 625 | 82 | 20 | 30 |
| VII-17 | A-131 | B-224 | 600 | 80 | 21 | 33 |
| VII-18 | A-133 | B-226 | 595 | 80 | 26 | 40 |

The electrostatic characteristics were evaluated under condition of 30° C. and 80% RH.

As a result of the evaluation on image forming performance of each light-sensitive material, it was found that clear duplicated images having good reproducibility of fine lines and letters and no occurrence of unevenness in half tone areas without the formation of background fog were obtained. Further, when these electrophotographic light-sensitive materials were employed as offset master plate precursors under the same printing condition as described in Example VII-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics and printing property. Also, it can be seen that the electrostatic characteristics are further improved by the use of the resin (A').

EXAMPLES VII-19 TO VII-22

Each electrophotographic light-sensitive material was prepared in the same manner as described in Example VII-1, except for using each of the dyes shown in Table VII-4 below in place of Cyanine Dye (VII-I) used in Example VII-1.

TABLE VII-4

| Example | Dye | Chemical Structure of Dye |
|---|---|---|
| VII-19 | (VII-III) | *(structure: bis-indolenine pentamethine dye with central CH$_3$ substituent; left N-(CH$_2$)$_4$SO$_3^\ominus$, right N-(CH$_2$)$_4$SO$_3$K)* |
| VII-20 | (VII-IV) | *(structure: bis-benz[e]indolenine pentamethine dye; left N-(CH$_2$)$_4$SO$_3^\ominus$, right N-(CH$_2$)$_4$SO$_3$Na)* |
| VII-21 | (VII-V) | *(structure: indolenine–thiopyran methine dye; KO$_3$S on indolenine ring, N-(CH$_2$)$_4$SO$_3^\ominus$, thiopyran with two C$_4$H$_9$(t) groups and S)* |
| VII-22 | (VII-VI) | *(structure: benz-indolenine–thiopyran methine dye; NaO$_3$S and SO$_3$Na substituents, N-(CH$_2$)$_4$SO$_3^\ominus$, thiopyran with two C$_4$H$_9$(t) groups and S)* |

Each of the light-sensitive materials according to the present invention was excellent in charging properties, dark charge retention rate and photosensitivity, and provided clear duplicated images free from background fog even when processed under severe condition of high temperature and high humidity (30° C. and 80% RH).

EXAMPLES VII-23 AND VII-24

A mixture of 6.5 g of Resin (A-101) (Example VII-23) or Resin (A-128) (Example VII-24), 33.5 g of Resin (B-217), 200 g of zinc oxide, 0.02 g of uranine, 0.03 g of Methine Dye (VII-VII) shown below, 0.03 g of Methine Dye (VII-VIII) shown below, 0.18 g of p-hydroxybenzoic acid and 300 g of toluene was dispersed by a homogenizer at a rotation of 7×10$^3$ r.p.m. for 10 minutes to prepare a coating composition for a light-sensitive layer. The coating composition was coated on paper, which had been subjected to electrically conductive treatment, by a wire bar at a dry coverage of 20 g/m$^2$, and dried for 20 seconds at 110° C. Then, the coated material was allowed to stand in a dark place for 24 hours under the conditions of 20° C. and 65% RH to prepare each electrophotographic light-sensitive material.

Methine Dye (VII-VII)

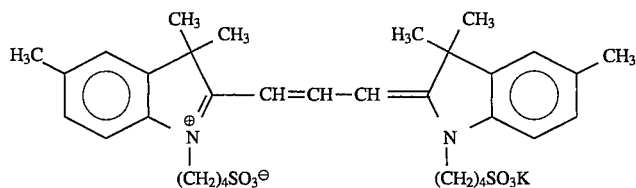

Methine Dye (VII-VIII)

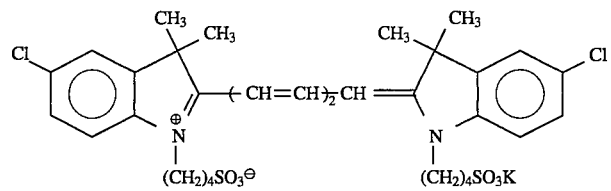

COMPARATIVE EXAMPLE VII-3

An electrophotographic light-sensitive material was prepared in the same manner as in Example VII-23, except for using 33.5 g of Resin (R-VII-3) shown below in place of 33.5 g of Resin (B-217) used in Example VII-23.

Comparative Resin (R-VII-3)

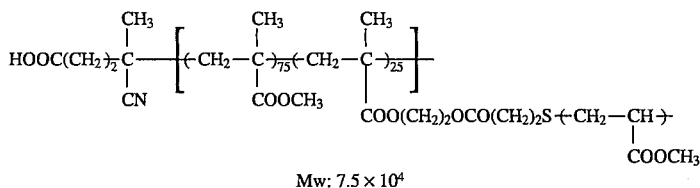

Mw: $7.5 \times 10^4$

With each of the light-sensitive materials thus prepared, various characteristics were evaluated in the same manner as in Example VII-2. The results obtained are shown in Table VII-5 below.

The characteristics were evaluated in the same manner as in Example VII-2, except that some electrostatic characteristics and image forming performance were evaluated according to the following test methods.

*6) Measurement of Electrostatic Characteristics: $E_{1/10}$ and $E_{1/100}$

The surface of the photoconductive layer was charged to −400 V with corona discharge, and then irradiated by visible light of the illuminance of 2.0 lux. Then, the time required

TABLE VII-5

|  |  | Example VII-23 | Example VII-24 | Comparative Example VII-3 |
|---|---|---|---|---|
| Binder Resin | | (A-101)/(B-217) | (A-128)/(B-217) | (A-101)/(R-VII-3) |
| Smoothness of Photoconductive Layer (sec/cc) | | 505 | 510 | 490 |
| Electrostatic Characteristics*6) | | | | |
| $V_{10}$ (−V) | I (20° C., 65% RH) | 615 | 690 | 585 |
| | II (30° C., 80% RH) | 605 | 675 | 570 |
| D.R.R. (%) | I (20° C., 65% RH) | 94 | 97 | 91 |
| | II (30° C., 80% RH) | 91 | 95 | 89 |
| $E_{1/10}$ (lux/sec) | I (20° C., 65% RH) | 9.5 | 7.4 | 11.4 |
| | II (30° C., 80% RH) | 10.1 | 8.0 | 12.0 |
| $E_{1/100}$ (lux/sec) | I (20° C., 65% RH) | 15.2 | 11.5 | 19.0 |
| | II (30° C., 80% RH) | 16.2 | 12.4 | 20.0 |
| Image Forming*7) Performance | I (20° C., 65% RH) | Good | Very good | Edge mark of cutting |
| | II (30° C., 80% RH) | Good | Very good | Edge mark of cutting, unevenness in half tone area |
| Contact Angle with Water (°) | | 10 or less | 10 or less | 10 or less |
| Printing Durability | | 10,000 prints | 10,000 prints | Background stain due to edge mark of cutting occurred from the start of printing | for decay of the surface potential ($V_{10}$) to ⅒ or ¹⁄₁₀₀ thereof was determined, and the exposure amount $E_{1/10}$ or $E_{1/100}$ (lux.sec) was calculated therefrom.

*7) Image Forming Performance

The electrophotographic light-sensitive material was allowed to stand for one day under the ambient condition described below, the light-sensitive material was subjected to plate making by a full-automatic plate making machine ELP-404V (manufactured by Fuji Photo Film Co., Ltd.) using ELP-T as a toner. The duplicated image thus obtained was visually evaluated for fog and image quality. The ambient condition at the time of image formation was 20° C. and 65% RH (I) or 30° C. and 80% RH (II). The original used for the duplication was composed of cuttings of other originals pasted up thereon.

From the results shown above, it can be seen that each light-sensitive material exhibited almost same properties with respect to the surface smoothness and mechanical strength of the photoconductive layer. However, on the electrostatic characteristics, the light-sensitive material of Comparative Example VII-3 had the particularly large value of photosensitivity $E_{1/100}$, and this tendency increased under the high temperature and high humidity condition. On the contrary, the electrostatic characteristics of the light-sensitive material according to the present invention were good. Further, those of Example VII-24 using the resin (A') were very good. The value of $E_{1/100}$ thereof was particularly small.

With respect to image forming performance, the edge mark of cuttings pasted up was observed as background fog in the non-image areas in the light-sensitive material of Comparative Example VII-3. On the contrary, the light-sensitive materials according to the present invention provided clear duplicated images free from background fog.

Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example VII-3, the above described edge mark of cuttings pasted up was not removed with the oil-desensitizing treatment and the background stains occurred from the start of printing.

It can be seen from the results described above that the light-sensitive materials according to the present invention can only have excellent performance.

EXAMPLE VII-25

A mixture of 5 g of Resin (A-122), 35 g of Resin (B-222), 200 g of zinc oxide, 0.02 g of uranine, 0.04 g of Rose Bengali 0.03 g of bromophenol blue, 0.40 g of phthalic anhydride and 300 g of toluene was treated in the same manner as described in Example VII-24 to prepare an electrophotographic light-sensitive material.

As the result of the evaluation of various characteristics in the same manner as described in Example VII-24, it can be seen that the light-sensitive material according to the present invention is excellent in charging properties, dark charge retention rate and photosensitivity, and provides a clear duplicated image free from background fog under severe conditions of high temperature and high humidity (30° C. and 80% RH). Further, when the material was employed as an offset master plate precursor, 10,000 prints of clear image were obtained.

EXAMPLES VII-26 TO VII-49

Each electrophotographic light-sensitive material was prepared in the same manner as described in Example VII-25, except for using 5 g of each of Resin (A) and 35 g of each of Resin (B) shown in Table VII-6 below in place of 5 g of Resin (A-122) and 35 g of Resin (B-222) used in Example VII-25, respectively.

TABLE VII-6

| Example | Resin (A) | Resin (B) |
|---------|-----------|-----------|
| VII-26 | A-101 | B-206 |
| VII-27 | A-102 | B-209 |
| VII-28 | A-104 | B-210 |
| VII-29 | A-105 | B-212 |
| VII-30 | A-109 | B-213 |
| VII-31 | A-115 | B-215 |
| VII-32 | A-120 | B-217 |
| VII-33 | A-121 | B-218 |
| VII-34 | A-122 | B-219 |
| VII-35 | A-125 | B-221 |
| VII-36 | A-126 | B-225 |
| VII-37 | A-129 | B-209 |
| VII-38 | A-103 | B-202 |
| VII-39 | A-104 | B-220 |
| VII-40 | A-107 | B-209 |
| VII-41 | A-108 | B-218 |
| VII-42 | A-112 | B-203 |
| VII-43 | A-113 | B-223 |
| VII-44 | A-114 | B-221 |
| VII-45 | A-115 | B-224 |
| VII-46 | A-126 | B-205 |
| VII-47 | A-130 | B-210 |
| VII-48 | A-132 | B-214 |
| VII-49 | A-124 | B-208 |

Each of the light-sensitive materials according to the present invention was excellent in charging properties, dark charge retention rate and photosensitivity, and provided a clear duplicated image free from background fog and scratches of fine lines even under severe condition of high temperature and high humidity (30° C. and 80% RH). Further, when these materials were employed as offset master plate precursors, more than 10,000 prints of a clear image free from background stains were obtained respectively.

EXAMPLE VIII-1

A mixture of 6 g (solid basis) of Resin (A-203), 34 g (solid basis) of Resin (B-201), 200 g of photoconductive zinc oxide, 0.018 g of Cyanine Dye (VIII-I) shown below, 0.15 g of phthalic anhydride and 300 g of toluene was dispersed by a homogenizer (manufactured by Nippon Seiki K. K.) at a rotation of $6\times10^3$ r.p.m. for 8 minutes to prepare a coating composition for a light-sensitive layer. The coating composition was coated on paper, which had been subjected to electrically conductive treatment, by a wire bar at a dry coverage of 25 g/m², followed by drying at 110° C. for 10 seconds. The coated material was then allowed to stand in a dark place at 20° C. and 65% RH for 24 hours to prepare an electrophotographic light-sensitive material.

Cyanine Dye (VIII-I)

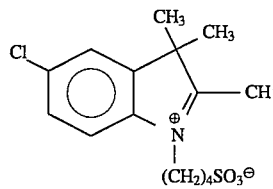 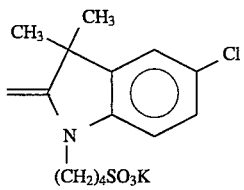

COMPARATIVE EXAMPLE VIII-1

An electrophotographic light-sensitive material was prepared in the same manner as in Example VIII-1, except for using 34 g of Resin (R-VIII-1) shown below in place of 34 g of Resin (B-201) used in Example VIII-1.

Comparative Resin (R-VIII-1)

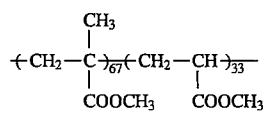

Mw: $1.0 \times 10^5$ (random copolymer)

COMPARATIVE EXAMPLE VIII-2

An electrophotographic light-sensitive material was prepared in the same manner as in Example VIII-1, except for using 34 g of Resin (R-VIII-2) shown below in place of 34 g of Resin (B-201) used in Example VIII-1.

Comparative Resin (R-VIII-2)

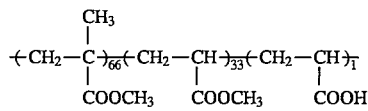

Mw: $9 \times 10^4$ (random copolymer)

With each of the light-sensitive material thus prepared, electrostatic characteristics and image forming performance were evaluated. The results obtained are shown in Table VIII-1 below.

TABLE VIII-1

|  | Example VIII-1 | Comparative Example VIII-1 | Comparative Example VIII-2 |
| --- | --- | --- | --- |
| Electrostatic[1] Characteristics |  |  |  |
| $V_{10}$ (−V) |  |  |  |
| I (20° C., 65% RH) | 780 | 715 | 740 |
| II (30° C., 80% RH) | 765 | 690 | 720 |
| III (15° C., 30% RH) | 785 | 720 | 750 |
| D.R.R. (90 sec value) (%) |  |  |  |
| I (20° C., 65% RH) | 88 | 83 | 86 |
| II (30° C., 80% RH) | 84 | 78 | 84 |
| III (15° C., 30% RH) | 87 | 84 | 86 |
| $E_{1/10}$ erg/cm$^2$) |  |  |  |
| I (20° C., 65% RH) | 22 | 30 | 26 |
| II (30° C., 80% RH) | 20 | 27 | 24 |

TABLE VIII-1-continued

|  | Example VIII-1 | Comparative Example VIII-1 | Comparative Example VIII-2 |
| --- | --- | --- | --- |
| III (15° C., 30% RH) | 28 | 33 | 30 |
| Image Forming[2] Performance |  |  |  |
| I (20° C., 65% RH) | Good | Good | Good |
| II (30° C., 30% RH) | Good | Unevenness in half tone area | Unevenness in half tone area |
| III (15° C., 30% RH) | Good | White spots in image portion, slight unevenness in half tone area | White spots in image portion |

The evaluation of each item shown in Table VIII-1 was conducted in the following manner.
1) Electrostatic Characteristics The light-sensitive material was charged with a corona discharge to a voltage of −6 kV for 20 seconds in a dark room using a paper analyzer ("Paper Analyzer SP- 428" manufactured by Kawaguchi Denki K. K.). Ten seconds after the corona discharge, the surface potential $V_{10}$ was measured. The sample was then allowed to stand in the dark for an additional 90 seconds, and the potential $V_{100}$ was measured. The dark decay retention rate (DRR; %), i.e., percent retention of potential after dark decay for 90 seconds, was calculated from the following equation:

$$DRR\ (\%) = (V_{100}/V_{10}) \times 100$$

Separately, the surface of photoconductive layer was charged to −400 V with a corona discharge and then exposed to light emitted from a gallium-aluminum-arsenic semiconductor laser (oscillation wavelength: 780 nm), and the time required for decay of the surface potential $V_{10}$ to one-tenth was measured, and the exposure amount $E_{1/10}$ (erg/cm$^2$) was calculated therefrom. The measurements were conducted under ambient condition of 20° C. and 65% RH (I), 30° C. and 80% RH (II) or 15° C. and 30% RH (III).
*2) Image Forminq Performance After the light-sensitive material was allowed to stand for one day under the ambient condition shown below, the light-sensitive material was charged to −6 kV and exposed to light emitted from a gallium-aluminum-arsenic semiconductor laser (oscillation wavelength: 780 nm; output: 2.8 mW) at an exposure amount of 64 erg/cm$^2$ (on the surface of the photoconductive layer) at a pitch of 25 μm and a scanning speed of 300 m/sec. The thus formed electrostatic latent image was developed with a liquid developer ELP-T (produced by Fuji Photo Film Co., Ltd.), washed with a rinse solution of isoparaffinic solvent Isopar G (manufactured by Esso Chemical K. K.) and fixed. The duplicated image obtained was visually evaluated for fog and image quality. The ambient condition at the time of image formation was 20° C. and 65% RH (I), 30° C. and 80% RH (II) or 15° C. and 30% RH (III).

As can be seen from the results shown in Table VIII-1, the light-sensitive material according to the present invention exhibited good electrostatic characteristics and provided duplicated image which was clear and free from background fog, even when the ambient condition was fluctuated. On the contrary, while the light-sensitive materials of Comparative Examples VIII-1 and VIII-2 exhibited good image forming performance under the ambient condition of normal temperature and normal humidity (I), the occurrence of unevenness of density was observed in the highly accurate image portions, in particular, half tone areas of continuous gradation under the ambient condition of high temperature and high humidity (II) regardless of the electrostatic characteristics. Also a slight background fog remained without removing after the rinse treatment. Further, the occurrence of unevenness of small white spots at random in the image portion was observed under the ambient condition of low temperature and low temperature (III).

From all these considerations, it is thus clear that an electrophotographic light-sensitive material satisfying both requirements of electrostatic characteristics and image forming performance (in particular, for highly accurate image) and being advantageously employed particularly in a scanning exposure system using a semiconductor laser beam can be obtained only using the binder resin according to the present invention.

EXAMPLE VIII-2

A mixture of 5 g (solid basis) of Resin (A-221), 35 g (solid basis) of Resin (B-202), 200 g of photoconductive zinc oxide, 0,020 g of Methine Dye (VIII-II) shown below, 0.20 g of N-hydroxymaleinimide and 300 g of toluene was treated in the same manner as described in Example VIII-1 to prepare an electrophotographic light-sensitive material.

Methine Dye (VIII-II)

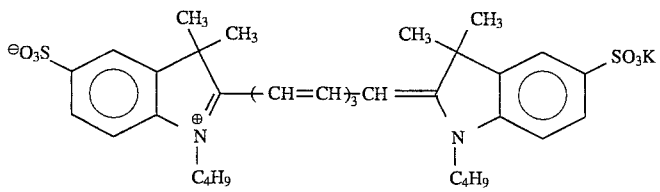

COMPARATIVE EXAMPLE VIII-3

An electrophotographic light-sensitive material was prepared in the same manner as in Example VIII-2, except for using 35 g of Resin (R-VIII-3) shown below in place of 35 g of Resin (B-202) used in Example VIII-2.

Comparative Resin (R-VIII-3)

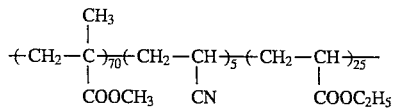

Mw: $9.8 \times 10^4$ (random copolymer)

COMPARATIVE EXAMPLE VIII-4

An electrophotographic light-sensitive material was prepared in the same manner as in Example VIII-2, except for using 35 g of Resin (R-VIII-4) shown below in place of 35 g of Resin (B-202) used in Example VIII-2.

Comparative Resin (R-VIII-4)

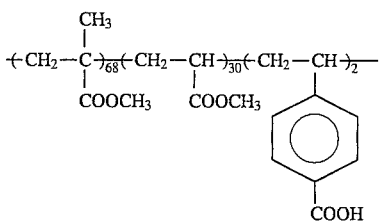

Mw: $8.5 \times 10^4$ (random copolymer)

With each of the light-sensitive materials thus-prepared, a film property in terms of surface smoothness, mechanical strength, electrostatic characteristics and image forming performance were evaluated. Further, printing property was evaluated when it was used as an electrophotographic lithographic printing plate precursor. The results obtained are shown in Table VIII-2 below.

TABLE VIII-2

| | | Example VIII-2 | Comparative Example VIII-3 | Comparative Example VIII-4 |
|---|---|---|---|---|
| Smoothness of Photoconductive*[3] Layer (sec/cc) | | 400 | 330 | 405 |
| Mechanical Strength of*[4] Photoconductive Layer (%) | | 93 | 75 | 86 |
| Electrostatic Characteristics | | | | |
| $V_{10}$ (−V) | I (20° C., 65% RH) | 765 | 725 | 745 |
| | II (30° C., 80% RH) | 750 | 700 | 720 |
| | III (15° C., 30% RH) | 770 | 730 | 745 |
| D.R.R. (%) | I (20° C., 65% RH) | 89 | 85 | 87 |
| (90 sec value) | II (30° C., 80% RH) | 84 | 80 | 82 |
| | III (15° C., 30% RH) | 88 | 86 | 86 |
| $E_{1/10}$ (erg/cm$^2$) | I (20° C., 65% RH) | 26 | 36 | 30 |
| | II (30° C., 80% RH) | 24 | 33 | 26 |
| | III (15° C., 30% RH) | 31 | 40 | 35 |
| Image Forming Performance | I (20° C., 65% RH) | Good | Good | Good |
| | II (30° C., 80% RH) | Good | Unevenness in half tone area | Unevenness in half tone area |
| | III (15° C., 30% RH) | Good | White spots in image portion, unevenness in half tone area | White spots in image portion |
| Water Retentivity of*[5] Light-Sensitive Material | | Good | Slight background stain | Background stain |
| Printing Durability*[6] | | 10,000 prints | 4,000 prints | 5,000 prints |

The evaluation of each item shown in Table VIII-2 was conducted in the following manner.

*3) Smoothness of Photoconductive Layer

The smoothness (sec/cc) of the light-sensitive material was measured using a Beck's smoothness test machine (manufactured by Kumagaya Riko K. K.) under an air volume condition of 1 cc.

*4) Mechanical Strength of Photoconductive Layer

The surface of the light-sensitive material was repeatedly (1000 times) rubbed with emery paper (#1000) under a load of 75 g/cm$^2$ using a Heidon 14 Model surface testing machine (manufactured by Shinto Kagaku K. K.). After dusting, the abrasion loss of the photoconductive layer was measured to obtain film retention (%).

*5) Water Retentivity of Light-Sensitive Material

A light-sensitive material without subjecting to plate making was passed twice through an etching processor using an aqueous solution obtained by diluting an oil-desensitizing solution ELP-EX (produced by Fuji Photo Film Co., Ltd.) to a five-fold volume with distilled water to conduct an oil-desensitizing treatment of the surface of the photoconductive layer. The material thus-treated was mounted on an offset printing machine ("611XLA-II Model" manufactured by Hamada Printing Machine Manufacturing Co.) and printing was conducted using distilled water as dampening water. The extent of background stain occurred on the 50th print was visually evaluated. This testing method corresponds to evaluation of water retentivity after oil-desensitizing treatment of the light-sensitive material under the forced condition.

*6) Printing Durability

The light-sensitive material was subjected to plate making in the same manner as described in *2) above to form toner images, and the surface of the photoconductive layer was subjected to oil-desensitization treatment by passing twice through an etching processor using ELP-EX. The resulting lithographic printing plate was mounted on an offset printing machine ("Oliver Model 52", manufactured by Sakurai Seisakusho K. K.), and printing was carried out on paper. The number of prints obtained until background stains in the non-image areas appeared or the quality of the image areas was deteriorated was taken as the printing durability. The larger the number of the prints, the higher the printing durability.

As can be seen from the results shown in Table VIII-2, the light-sensitive material according to the present invention had good surface smoothness, film strength and electrostatic characteristics of the photoconductive layer. The duplicated image obtained was clear and free from background fog in the non-image area. These results appear to be due to sufficient adsorption of the binder resin onto the photoconductive substance and sufficient covering of the surface of the particles with the binder resin. For the same reason, when it was used as an offset master plate precursor, oil-desensitization of the offset master plate precursor with an oil-desensitizing solution was sufficient to render the non-image areas satisfactorily hydrophilic and adhesion of ink was not observed at all as a result of the evaluation of water retentivity under the forced condition. On practical printing using the resulting master plate, 10,000 prints of clear image without background stains were obtained.

On the contrary, with the light-sensitive materials of Comparative Examples VIII-3 and VIII-4, the occurrence of slight background stain in non-image area, unevenness in highly accurate image of continuous gradation and unevenness of white spots in image portion was observed when the image formation was conducted under severe conditions. Further, as a result of the test on water retentivity of these light-sensitive materials to make offset master plates, the adhesion of ink was observed. The printing durability thereof was at most from 4,000 to 5,000 prints.

From these results it is believed that the resin (A) and the resin (B) according to the present invention suitably interacts with zinc oxide particles to form the condition under which an oil-desensitizing reaction proceeds easily and sufficiently with an oil-desensitizing solution and that the remarkable improvement in film strength is achieved by the action of the resin (B).

EXAMPLES VIII-3 TO VIII-22

Each electrophotographic light-sensitive material was prepared in the same manner as described in Example VIII-2, except for using each of Resins (A) and Resins (B) shown in Table VIII-3 below in place of Resin (A-221) and Resin (B-202) used in Example VIII-2, respectively.

TABLE VIII-3

| Example | Resin (A) | Resin (B) |
|---|---|---|
| VIII-3 | A-205 | B-203 |
| VIII-4 | A-206 | B-204 |
| VIII-5 | A-207 | B-205 |
| VIII-6 | A-208 | B-206 |
| VIII-7 | A-209 | B-208 |
| VIII-8 | A-210 | B-209 |
| VIII-9 | A-211 | B-211 |
| VIII-10 | A-213 | B-212 |
| VIII-11 | A-214 | B-216 |
| VIII-12 | A-215 | B-219 |
| VIII-13 | A-216 | B-220 |
| VIII-14 | A-218 | B-221 |
| VIII-15 | A-221 | B-222 |
| VIII-16 | A-222 | B-223 |
| VIII-17 | A-223 | B-224 |
| VIII-18 | A-221 | B-225 |
| VIII-19 | A-211 | B-226 |
| VIII-20 | A-207 | B-215 |
| VIII-21 | A-204 | B-214 |
| VIII-22 | A-214 | B-218 |

The electrostatic characteristics and image forming performance of each of the light-sensitive materials were determined in the same manner as described in Example VIII-1. Each light-sensitive material exhibited good electrostatic characteristics. As a result of the evaluation on image forming performance of each light-sensitive material, it was found that clear duplicated images having good reproducibility of fine lines and letters and no occurrence of unevenness in half tone areas without the formation of background fog were obtained.

Further, when these electrophotographic light-sensitive materials were employed as offset master plate precursors under the same printing condition as described in Example VIII-2, more than 10,000 good prints were obtained respectively.

It can be seen from the results described above that each of the light-sensitive materials according to the present invention was satisfactory in all aspects of the surface smoothness and film strength of the photoconductive layer, electrostatic characteristics and printing property.

EXAMPLES VIII-23 TO VIII-26

Each electrophotographic light-sensitive material was prepared in the same manner as described in Example VIII-1, except for using each of the dyes shown in Table VIII-4 below in place of Cyanine Dye (VIII-I) used in Example VIII-1.

TABLE VIII-4

| Example | Dye | Chemical Structure of Dye |
|---|---|---|
| VIII-23 | (VIII-III) | 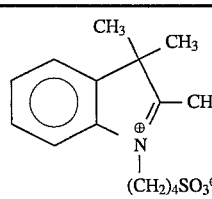 |
| VIII-24 | (VII-IV) | 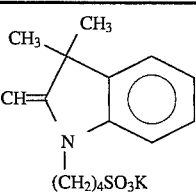 |
| VIII-25 | (VIII-V) | 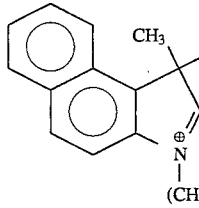 |

TABLE VIII-4-continued

| Example | Dye | Chemical Structure of Dye |
|---|---|---|
| VIII-26 | (VIII-VI) | |

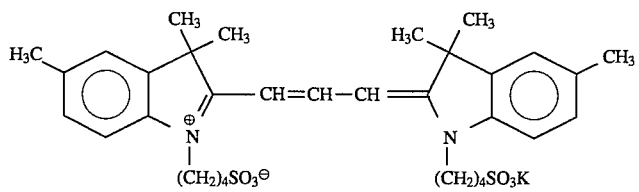

Each of the light-sensitive materials according to the present invention was excellent in charging properties, dark charge retention rate and photosensitivity, and provided clear duplicated images free from background fog even when processed under severe conditions of high temperature and high humidity (30° C. and 80% RH) and low temperature and low humidity (15° C. and 30% RH).

EXAMPLES VIII-27 AND VIII-28

A mixture of 6.5 g of Resin (A-201) (Example VIII-27) or Resin (A-207) (Example VIII-28), 33.5 g of Resin (B-223), 200 g of zinc oxide, 0.02 g of uranine, 0.03 g of Methine Dye (VIII-VII) shown below, 0.03 g of Methine Dye (VIII-VIII) shown below, 0.18 g of p-hydroxybenzoic acid and 300 g of toluene was dispersed by a homogenizer at a rotation of $7\times10^3$ r.p.m. for 6 minutes to prepare a coating composition for a light-sensitive layer. The coating composition was coated on paper, which had been subjected to electrically conductive treatment, by a wire bar at a dry coverage of 25 g/m², and dried for 20 seconds at 110° C. Then, the coated material was allowed to stand in a dark place for 24 hours under the conditions of 20° C. and 65% RH to prepare each electrophotographic light-sensitive material.

Example VIII-2 in place of 33.5 g of Resin (B-223) used in Example VIII-27.

With each of the light-sensitive materials thus prepared, various characteristics were evaluated in the same manner as in Example VIII-2. The results obtained are shown in Table VIII-5 below.

Methine Dye (VIII-VII)

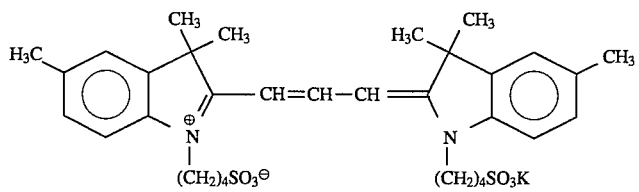

Methine Dye (VIII-VIII)

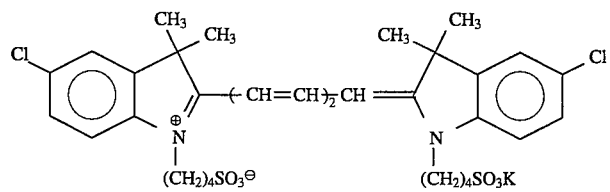

COMPARATIVE EXAMPLE VIII-5

An electrophotographic light-sensitive material was prepared in the same manner as in Example VIII-27, except for using 33.5 g of Resin (R-VIII-2) used in Comparative

TABLE VIII-5

|  |  | Example VIII-27 | Example VIII-28 | Comparative Example VIII-5 |
| --- | --- | --- | --- | --- |
| Binder Resin | | (A-201)/(B-223) | (A-207)/(B-223) | (A-201)/(R-VIII-2) |
| Smoothness of Photoconductive Layer (sec/cc) | | 380 | 400 | 385 |
| Mechanical Strength of Photoconductive Layer (%) | | 93 | 94 | 87 |
| Electrostatic Characteristics*[7] | | | | |
| $V_{10}$ (−V) | I (20° C., 65% RH) | 580 | 740 | 550 |
| | II (30° C., 80% RH) | 565 | 725 | 540 |
| | III (15° C., 30% RH) | 585 | 740 | 550 |
| D.R.R. (%) | I (20° C., 65% RH) | 88 | 95 | 83 |
| | II (30° C., 80% RH) | 85 | 93 | 80 |
| | III (15° C., 30% RH) | 89 | 95 | 84 |
| $E_{1/10}$ (lux/sec) | I (20° C., 65% RH) | 13.3 | 8.9 | 14.5 |
| | II (30° C., 80% RH) | 13.5 | 8.5 | 13.7 |
| | III (15° C., 30% RH) | 14.2 | 9.6 | 14.9 |
| Image Forming*[8] Performance | I (20° C., 65% RH) | Good | Very good | Edge mark of cutting |
| | II (30° C., 80% RH) | Good | Very good | Unevenness in half tone area |
| | III (15° C., 30% RH) | Good | Very good | White spots in image portion, unevenness in half tone area |
| Water Retentivity of Light-Sensitive Material | | Good | Good | Slight background stain |
| Printing Durability | | 10,000 prints | 10,000 prints | 4,000 prints |

The characteristics were evaluated in the same manner as in Example VIII-2, except that some electrostatic characteristics and image forming performance were evaluated according to the following test methods.

*7) Electrostatic Characteristics: $E_{1/10}$

The surface of the photoconductive layer was charged to −400 V with corona discharge, and then irradiated by visible light of the illuminance of 2.0 lux. Then, the time required for decay of the surface potential ($V_{10}$) to 1/10 thereof was determined, and the exposure amount $E_{1/10}$ (lux.sec) was calculated therefrom.

*8) Image Forming Performance

The electrophotographic light-sensitive material was allowed to stand for one day under the ambient condition described below, the light-sensitive material was subjected to plate making by a full-automatic plate making machine ELP-404V (manufactured by Fuji Photo Film Co., Ltd.) using ELP-T as a toner. The duplicated image thus obtained was visually evaluated for fog and image quality. The ambient condition at the time of image formation was 20° C. and 65% RH (I), 30° C. and 80% RH (II) or 15° C. and 30% RH (III). The original used for the duplication was composed of cuttings of other originals pasted up thereon.

From the results, it can be seen that each of the light-sensitive materials according to the present invention exhibited good mechanical strength of the photoconductive layer. On the contrary, with the light-sensitive material of Comparative Example VIII-5 the value of mechanical strength was lower than them, and the value of $E_{1/10}$ of electrostatic characteristics degraded particularly under the ambient condition of low temperature and low humidity (III), while they were good under the ambient condition of normal temperature and normal humidity (I). On the other hand, the electrostatic characteristics of the light-sensitive materials according to the present invention were good. Particularly, those of Example VIII-28 using the resin (A') were very good. The value of $E_{1/100}$ thereof was particularly small.

With respect to image forming performance, the edge mark of cuttings pasted up was observed as background fog in the non-image areas in the light-sensitive material of Comparative Example VIII-5. Also the occurrence of unevenness in half tone area of continuous gradation and unevenness of small white spots in image portion was observed on the duplicated image when the ambient conditions at the time of the image formation were high temperature and high humidity (II) and low temperature and low humidity (III). On the contrary, the light-sensitive material according to the present invention provided clear images free from background fog.

Further, each of these light-sensitive materials was subjected to the oil-desensitizing treatment to prepare an offset printing plate and using the resulting plate printing was conducted. The plates according to the present invention provided 10,000 prints of clear image without background stains. However, with the plate of Comparative Example VIII-5, the above described edge mark of cuttings pasted up was not removed with the oil-desensitizing treatment and the background stains occurred from the start of printing.

It can be seen from the results described above that the light-sensitive materials according to the present invention was satisfactory in all aspects of the surface smoothness and film strength of the photoconductive layer, electrostatic characteristics and printing property. Further, it can be seen that the electrostatic characteristics are further improved by the use of the resin (A').

EXAMPLE VIII-29

A mixture of 5 g of Resin (A-223), 35 g of Resin (B-222), 200 g of zinc oxide, 0.02 g of uranine, 0.04 g of Rose Bengal, 0.03 g of bromophenol blue, 0.40 g of phthalic anhydride and 300 g of toluene was treated in the same manner as described in Example VIII-27 to prepare an electrophotographic light-sensitive material.

As the result of the evaluation of various characteristics in the same manner as described in Example VIII-27, it can be seen that the light-sensitive material according to the present invention is excellent in charging properties, dark charge retention rate and photosensitivity, and provides a clear duplicated image free from background fog under severe conditions of high temperature and high humidity (30° C. and 80% RH) and low temperature and low humidity (15° C. and 30% RH). Further, when the material was employed as an offset master plate precursor, 10,000 prints of clear image were obtained.

EXAMPLES VIII-30 TO VIII-53

Each electrophotographic light-sensitive material was prepared in the same manner as described in Example VIII-29, except for using 5 g of each of Resin (A) and 35 g of each of Resin (B) shown in Table VIII-6 below in place of 5 g of Resin (A-223) and 35 g of Resin (B-222) used in Example VIII-29, respectively.

TABLE VIII-6

| Example | Resin (A) | Resin (B) |
|---|---|---|
| VIII-30 | A-202 | B-206 |
| VIII-31 | A-203 | B-207 |
| VIII-32 | A-204 | B-208 |
| VIII-33 | A-205 | B-209 |
| VIII-34 | A-206 | B-211 |
| VIII-35 | A-207 | B-212 |
| VIII-36 | A-208 | B-213 |
| VIII-37 | A-209 | B-214 |
| VIII-38 | A-210 | B-215 |
| VIII-39 | A-211 | B-216 |
| VIII-40 | A-212 | B-218 |
| VIII-41 | A-213 | B-217 |
| VIII-42 | A-214 | B-220 |
| VIII-43 | A-215 | B-221 |
| VIII-44 | A-216 | B-222 |
| VIII-45 | A-217 | B-223 |
| VIII-46 | A-218 | B-224 |
| VIII-47 | A-219 | B-226 |
| VIII-48 | A-220 | B-222 |
| VIII-49 | A-221 | B-222 |
| VIII-50 | A-222 | B-204 |
| VIII-51 | A-218 | B-205 |
| VIII-52 | A-223 | B-203 |
| VIII-53 | A-223 | B-223 |

Each of the light-sensitive materials according to the present invention was excellent in charging properties, dark charge retention rate and photosensitivity, and provided a clear duplicated image free from background fog and scratches of fine lines even under severe conditions of high temperature and high humidity (30° C. and 80% RH) and low temperature and low humidity (15° C. and 30% RH). Further, when these materials were employed as offset master plate precursors, 10,000 prints of a clear image free from background stains were obtained respectively.

POSSIBILITY OF UTILIZATION IN INDUSTRY

In accordance with the present invention, an electrophotographic light-sensitive material which exhibits excellent electrostatic characteristics (particularly, under severe conditions) and mechanical strength and provides clear images of good quality can be obtained. The electrophotographic light-sensitive material according to the present invention is particularly useful in the scanning exposure system using a semiconductor laser beam. The electrostatic characteristics are further improved by using the resin according to the present invention which contains a repeating unit having the specific methacrylate component.

What is claimed is:

1. An electrophotographic light-sensitive material having a photoconductive layer containing at least an inorganic photoconductive substance, a spectral sensitizing dye, and a binder resin, wherein the binder resin comprises at least one resin (A) shown below and at least one resin (B) shown below:

Resin (A):

a resin having a weight average molecular weight of from $1 \times 10^3$ to $2 \times 10^4$ and containing not less than 30% by weight of a polymer component corresponding to a repeating unit represented by the general formula (I) described below and from 0.5 to 15% by weight of a polymer component containing at least one polar group selected from the group consisting of $-PO_3H_2$, $-SO_3H$, $-COOH$,

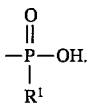

wherein $R^1$ represents a hydrocarbon group or $-OR^2$, and wherein $R^2$ represents a hydrocarbon group, and a cyclic acid anhydride-containing group;

Formula (I):

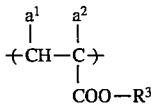

wherein $a^1$ and $a^2$ each represents a hydrogen atom, a halogen atom, a cyano group, a hydrocarbon group, $-COOR^4$ or $-COOR^4$ bonded via a hydrocarbon group, wherein $R^4$ represents a hydrocarbon group, and $R^3$ represents a hydrocarbon group;

Resin (B):

a linear AB block copolymer having a weight average molecular weight of from $3 \times 10^4$ to $1 \times 10^6$ and comprising an A block comprising a polymer component containing at least one polar group selected from the group consisting of specific polar groups as described in the resin (A) above and a B block comprising a polymer component represented by the general formula (I) as described in the resin (A) above, wherein the A block contains the polymer component containing the polar group in an amount of from 0.05 to 10% by weight based on the copolymer and the B block contains the polymer component represented by the general formula (I) in an amount not less than 30% by weight based on the copolymer.

2. An electrophotographic light-sensitive material as claimed in claim 1, wherein the resin (A) contains, as the polymer component represented by the general formula (I), at least one methacrylate component having an aryl group represented by at least one of the following general formulae (Ia) and (Ib):

Formula (Ia)

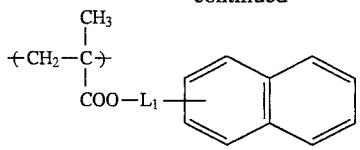

Formula (Ib)

wherein $T_1$ and $T_2$ each represents a hydrogen atom, a halogen atom, a hydrocarbon group having from 1 to 10 carbon atoms, —$COR_a$ or —$COOR_a$ wherein $R_a$ represents a hydrocarbon group having from 1 to 10 carbon atoms; and $L_1$ and $L_2$ each represents a mere bond or a linking group containing from 1 to 4 linking atoms, which connects —COO— and the benzene ring.

3. An electrophotographic light-sensitive material as claimed in claim 1, wherein the total amount of the specific polar group-containing polymer component contained in the resin (B) is from 10 to 50% by weight based on the total amount of the specific polar group-containing polymer component present in the resin (A).

4. An electrophotographic light-sensitive material as claimed in claim 1, wherein the polar group-containing polymer component is present in the polymer chain of the resin (A).

5. An electrophotographic light-sensitive material as claimed in claim 4, wherein the polar group-containing polymer component is present at random in the resin (A).

6. An electrophotographic light-sensitive material as claimed in claim 4, wherein the polar group-containing polymer component is present in the form of a block in the resin (A).

7. An electrophotographic light-sensitive material as claimed in claim 1, wherein the polar group-containing polymer component is present at one terminal of the polymer chain of the resin (A).

8. An electrophotographic light-sensitive material as claimed in claim 1, wherein the polar group-containing polymer component is present both in the polymer chain and at the terminal of the polymer chain of the resin (A).

9. An electrophotographic light-sensitive material as claimed in claim 1, wherein the resin (B) is an AB block copolymer wherein the A block and the B blocks are bonded to each other as follows: (A block)-b-(B block), wherein b represents a bond connecting two blocks present on both sides.

10. An electrophotographic light-sensitive material as claimed in claim 1, wherein the resin (B) is an AB block copolymer wherein the polar group-containing polymer component is bonded at one terminal of the A block and the opposite terminal of the A block is bonded to the B block as follows: (Polar Group)-(A block)—b—(B block), wherein b represents a bond connecting two blocks present on both sides.

11. An electrophotographic light-sensitive material as claimed in claim 1, wherein the resin (B) is an AB block copolymer wherein a B block is bonded at one terminal of the A block and another B block is bonded at the other terminal of the A block as follows: (B block)—b—(A block)—b—(B block), wherein b represents a bond connecting two blocks present on both sides.

\* \* \* \* \*